United States Patent [19]

Wyschogrod et al.

[11] Patent Number: 5,374,932
[45] Date of Patent: Dec. 20, 1994

[54] AIRPORT SURFACE SURVEILLANCE SYSTEM

[75] Inventors: Daniel Wyschogrod, Brookline; Loren Wood, Lexington; James L. Sturdy, Leominster; Hayden B. Schultz, Maynard; Richard J. Sasiela, Sudbury; Douglas V. Marquis, Framingham; William H. Harman, III, Westford; James R. Eggert, Bedford; Peter M. Daly, Natick, all of Mass.

[73] Assignee: Massachusetts Institute of Technology, Cambridge, Mass.

[21] Appl. No.: 101,448

[22] Filed: Aug. 2, 1993

[51] Int. Cl.5 .................. G01S 13/56; G01S 13/66; G01S 13/93

[52] U.S. Cl. ........................ 342/36; 342/29; 342/39; 342/455; 342/456

[58] Field of Search .................. 342/29, 36, 37, 39, 342/41, 455, 456, 457

[56] References Cited

U.S. PATENT DOCUMENTS

| | | | |
|---|---|---|---|
| 3,330,944 | 7/1967 | Inderhees | 364/439 |
| 3,668,403 | 6/1972 | Meilander | 235/150.23 |
| 3,775,767 | 11/1973 | Fielding | 343/6.5 R |
| 4,122,522 | 10/1978 | Smith | 364/427 |
| 4,151,595 | 4/1979 | Pressiat | 364/439 |
| 4,163,972 | 8/1979 | Lapy et al. | 342/41 |
| 4,196,474 | 4/1980 | Buchanan et al. | 364/461 |
| 4,197,536 | 4/1980 | Levine | 342/37 |
| 4,316,252 | 2/1982 | Cooper | 364/428 |
| 4,319,243 | 3/1982 | Vachenauer et al. | 342/37 |
| 4,418,349 | 11/1983 | Hofgen et al. | 342/454 |
| 4,516,125 | 5/1985 | Schwab et al. | 343/7.7 |
| 4,706,198 | 11/1987 | Thurman | 364/439 |
| 4,823,272 | 4/1989 | Inselberg | 364/461 |
| 4,827,418 | 5/1989 | Gerstenfeld | 364/439 |
| 4,845,629 | 7/1989 | Murga | 364/439 |
| 4,866,785 | 9/1989 | Shibano | 382/49 |
| 4,928,313 | 5/1990 | Leonard et al. | 382/8 |

(List continued on next page.)

OTHER PUBLICATIONS

"Airport Surface Traffic Automation" by Ervin F. Lyon, The Lincoln Laboratory Journal, vol. 4, No. 2, 1991, pp. 151-188.

Primary Examiner—John B. Sotomayor
Attorney, Agent, or Firm—Testa, Hurwitz & Thibeault

[57] ABSTRACT

An airport surface traffic surveillance and automation system addresses a wide variety of airport surface conflict scenarios using a combination of runway-status lights, controller alerts, and enhanced controller displays. Runway-status lights, composed of runway-entrance lights and takeoff-hold lights, provide alerts directly to pilots and vehicle operators, to prevent runway incursions before they happen. Controller alerts are used to direct a controller's attention to existing conflicts between aircraft on or near the runways. Enhanced displays present symbology to describe aircraft position, size, direction and speed of motion, altitude, aircraft flight number, and equipment type. Aircraft on approach to runways are also depicted on the displays. The invention features an airport surveillance system, having a radar data interface for receiving radar data from a radar source at a first data rate and for outputting radar data at a second data rate less than the first data rate, and a radar target processor coupled to the radar data interface. The radar target processor includes a clutter rejecter for generating a clutter map of the clutter signals in the radar data, and for substantially removing the clutter signals from the radar data using the clutter map, a morphological processor to receive radar data from the clutter rejecter and for detecting from the radar data target objects using the morphology of the target object, a multipath processor to receive radar data from the morphological processor and for detecting and removing from the radar data false targets resulting from multipath radar reflections, and a target tracker to receive radar data from the multipath processor and for tracking the path of target objects on or near the airport surface.

1 Claim, 19 Drawing Sheets

U.S. PATENT DOCUMENTS

| | | | |
|---|---|---|---|
| 4,972,493 | 11/1990 | Chemaly | 382/8 |
| 5,018,211 | 5/1991 | Jaffe et al. | 382/8 |
| 5,063,448 | 11/1991 | Jaffray et al. | 358/160 |
| 5,111,400 | 5/1992 | Yoder | 364/424.01 |
| 5,142,478 | 8/1992 | Crook | 364/428 |
| 5,170,193 | 12/1992 | McMillan et al. | 351/212 |
| 5,200,902 | 4/1993 | Pilley | 364/439 |
| 5,201,011 | 4/1993 | Bloomberg et al. | 382/9 |
| 5,245,432 | 9/1993 | Jaffray et al. | 358/160 |
| 5,245,589 | 9/1993 | Abel et al. | 367/136 |
| 5,268,698 | 12/1993 | Smith, Sr. et al. | 342/450 |
| 5,268,967 | 12/1993 | Jang et al. | 382/6 |
| 5,300,933 | 4/1994 | Discenza et al. | 342/36 |

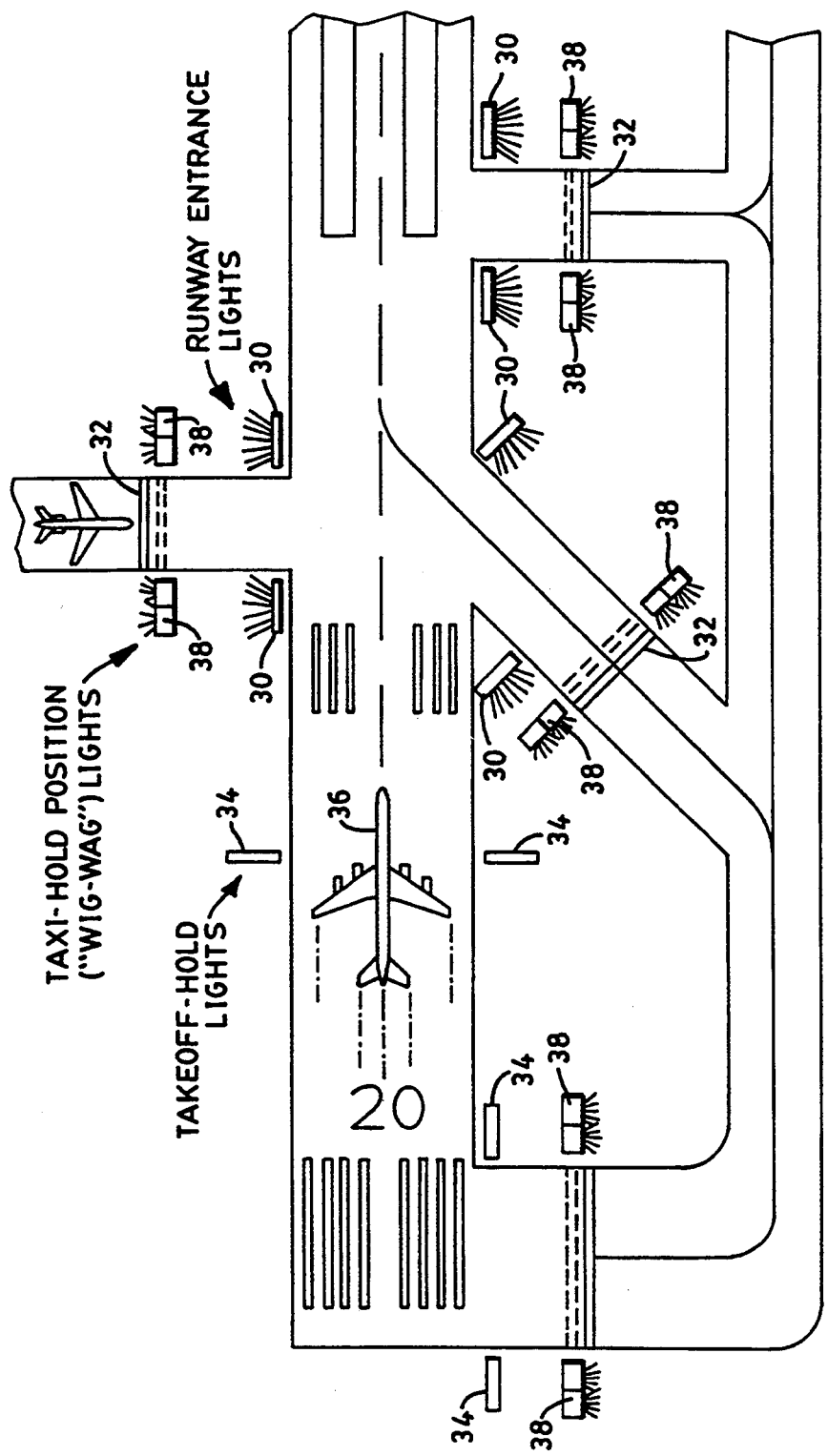

AIRPORT SURFACE SURVEILLANCE SYSTEM

This invention was made with government support under Contract Number F19628-90-C-0002 awarded by the Air Force. The government has certain rights in the invention.

BACKGROUND OF THE INVENTION

The present invention relates to airport traffic detection and control.

Airport surface traffic control at busy airports is typically handled by human controllers, sometimes with the aid of a surface radar system. Controllers typically do not rely on surface radar in times of good visibility. A surface radar by itself does not offer conflict identification or prevention information to the controller. Also, the surveillance information is not directly available to the aircraft pilots and vehicle operators on the airport surface. An automated system that provides aids to the controllers and surface status information to the pilots can significantly enhance the safety of airport operations.

Progress toward such automation and the prevention of surface accidents requires an understanding of the basic nature of the surface traffic problem. The surface traffic problem can be placed into three increasingly encompassing classes: accidents, high-hazard incidents, and runway incursions.

Accidents, though great in consequence, are relatively few in number, so an analysis of airport surface accidents benefits greatly by the statistical analysis of high-hazard incidents. High-hazard incidents denote those where at least one aircraft was at high speed, and where the minimum separation was 50 feet or less.

Runway incursions represent a larger class of events than accidents and high-hazard incidents. A runway incursion can be defined as any occurrence at an airport involving an aircraft, vehicle, person, or object on the ground that creates a collision hazard or results in loss of separation with an aircraft taking off, intending to take off, landing or intending to land. Clearly, preventing runway incursions is an effective way to prevent airport surface accidents, and to do that a good airport surface traffic automation system must also be effective at reducing runway incursions.

SUMMARY OF THE INVENTION

The present invention provides an airport surface traffic surveillance and automation system for addressing a wide variety of airport surface conflict scenarios using a combination of runway-status lights, controller alerts, and enhanced controller displays. Runway-status lights, composed of runway-entrance lights and takeoff-hold lights, provide status directly to pilots and vehicle operators, to prevent runway incursions before they happen. Controller alerts are used to direct a controller's attention to existing or potential conflicts between aircraft on or near the runways. Because runway-status lights do not address some of the major accident and incident scenarios, and because controller alerts often do not provide sufficient time for controllers and pilots to correct a situation once it has developed, a combination of lights and alerts is needed. Enhanced displays present symbology to describe aircraft position, size, direction and speed of motion, altitude, aircraft flight number, and equipment type. In addition to airport surface traffic, aircraft on approach to runways are also depicted on the displays.

The Runway Status Light System (RSLS) provides several display enhancements to a surface radar or ASDE display. An ASDE-3 display contains radar video with blanking to reduce visible clutter, and line graphics to depict runway and taxiway edges and building outlines. RSLS provides iconic depiction of tracked traffic, symbolic tags for each icon, approach bars for aircraft inside the outer marker, depiction of runway-status-light state, and some special markings for aircraft identified as being in conflict.

In general, in one aspect, the invention features an airport surveillance system, having a radar data interface for receiving radar data from a radar source at a first data rate and for outputting radar data at a second data rate less than the first data rate, and a radar target processor coupled to the radar data interface. The radar target processor includes a clutter rejecter for generating a clutter map of the clutter signals in the radar data, and for substantially removing the clutter signals from the radar data using the clutter map, a morphological processor to receive radar data from the clutter rejecter and for detecting from the radar data target objects using the morphology of the target object, a multipath processor to receive radar data from the morphological processor and for detecting and removing from the radar data false targets resulting from multipath radar reflections, and a target tracker to receive radar data from the multipath processor and for tracking the path of target objects on or near the airport surface.

BRIEF DESCRIPTION OF THE DRAWINGS

The foregoing and other objects, features and advantages of the invention will be apparent from the following more particular description of embodiments of the invention, as illustrated in the accompanying drawings in which like referenced characters refer to the same parts throughout the different views. The drawings are not necessarily to scale, emphasis instead being placed upon illustrating the principles of the invention.

FIG. 3 is a diagram of an airport surface including runway-entrance lights and takeoff-hold lights in accordance with the invention.

DESCRIPTION OF THE INVENTION

Figure 1A:
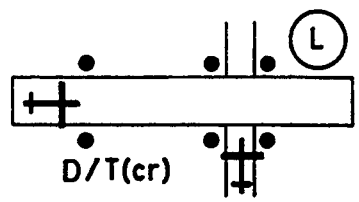
FIGS. 1A–1H are depictions of eight airport surface conflict scenarios.
Figure 1B:
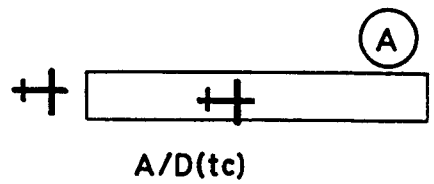
Figure 1C:
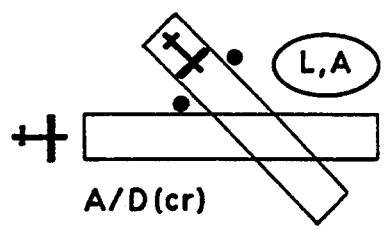
Figure 1D:
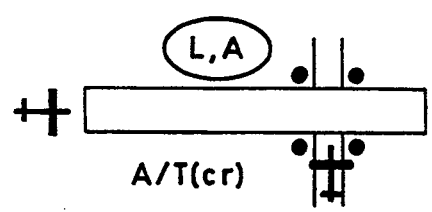
Figure 1E:
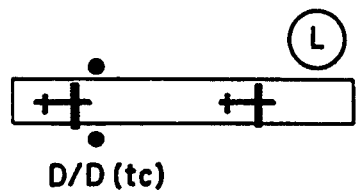
Figure 1F:
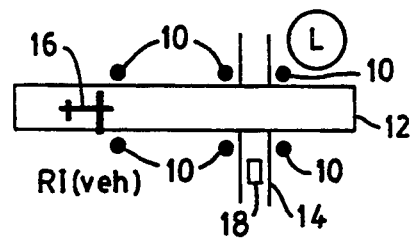
Figure 1G:
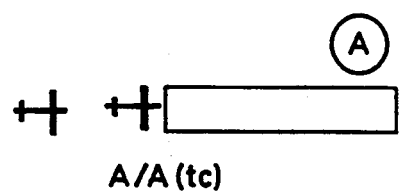
Figure 1H:
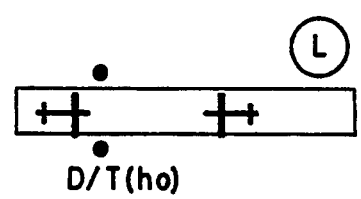

1. THE RSLS DEMONSTRATION SYSTEM ARCHITECTURE 1.1. Introduction

The Runway Status Light System (RSLS) Logan Demonstration System was developed by the Massachusetts Institute of Technology (MIT), Lincoln Laboratory, under an interagency agreement between the Department of Transportation, Federal Aviation Administration (FAA) and the United States Air Force (USAF). The goal of the RSLS Demonstration System is to use automatic processing of surface primary and approach secondary radar data to drive simulated runway-status lights. This goal has been accomplished.

This document presents a description of the design motivation, methodology, and implementation for the RSLS Demonstration System, and presents an analysis of the system performance. This system architecture section provides an overview of the entire system on a functional block scale; detailed descriptions of the various subsystems are presented in individual sections.

1.2. Motivation

In the past twenty years, there have been eight fatal and two major non-fatal airport surface accidents in the United States. In a thirteen-month period in 1990 and 1991, airport surface accidents occurred at Atlanta, Detroit, and Los Angeles, which together resulted in the loss of 43 lives. With domestic air traffic predicted to increase by 3% annually over the next decade, and with little airport construction envisioned in the near future, it is clear that the airport surface traffic control problem must be addressed if future aviation accidents are to be prevented.

A first step towards addressing surface traffic control is better surveillance. Indeed, the FAA is presently engaged in the procurement of 33 ASDE-3 (Airport Surface Detection Equipment) radars, which will provide improved surface surveillance with higher resolution, reduced clutter, and better performance in rain than the older ASDE-2 radars now in operational use.

Better surveillance by itself, however, will not address the whole problem. Controllers typically do not rely on surface radar in times of good visibility. A surface radar by itself does not offer conflict identification or prevention information to the controller. Also, the surveillance information is not directly available to the aircraft pilots and vehicle operators on the airport surface. What is needed is an automation system that provides aids to the controllers and surface status to the pilots.

Progress towards the design of such automation and the prevention of surface accidents requires an understanding of the basic nature of the surface traffic problem. The surface traffic problem can be placed into three increasingly encompassing classes: accidents, high-hazard incidents, and runway incursions. Accidents, though great in consequence, are relatively few in number, so an analysis of airport surface accidents benefits greatly by the statistical inclusion of high-hazard incidents. High-hazard incidents denote those where at least one aircraft was at high speed, and where the minimum separation was 50 feet or less. Eight airport surface conflict scenario geometries are depicted in FIGS. 1A–1H. These figures depict, using FIG. 1F as an example, runway-status lights 10, runways 12, roads 14, aircraft 16, and non-aircraft objects 18. These eight conflict scenarios represent more than 90% of the accidents and incidents which typically occur on airport surfaces. Any surface traffic safety system must address these eight scenarios to be effective.

In FIGS. 1A–1H, "D" means departure, "A" means arrival, "T" means taxi, "veh" means a non-aircraft object such as a vehicle, "cr" means crossing, "tc" means tail-chase, and "ho" means head-on. Also, "L" means lights address the scenario whereas "A" means controller alerts address the scenario. Data used as the basis for FIGS. 1A–1H represents all U.S. airport fatal and major non-fatal accidents occurring in the period 1972–1992 as well as U.S. airport high hazard incidents from 1985–1992.

Runway incursions represent a larger class of events than accidents and high-hazard incidents. A runway incursion is defined as any occurrence at an airport involving an aircraft, vehicle, person, or object on the ground that creates a collision hazard or results in loss of separation with an aircraft taking off, intending to take off, landing or intending to land. Clearly, preventing runway incursions is an effective way to prevent airport surface accidents, and a good airport surface traffic automation system must also be effective at reducing runway incursions.

1.3 Approach

A complete airport surface traffic safety system should include three products that together will address all of the eight airport surface conflict scenarios depicted in FIGS. 1A–1H. These three products are (i) runway-status lights, (ii) controller alerts, and (iii) enhanced controller displays. Runway-status lights are for providing current runway status information to pilots and vehicle operators, and for preventing runway incursions before they happen. Controller alerts are for directing controllers' attention to existing conflicts between aircraft on or near the runways. Because runway-status lights do not address some of the accident and incident scenarios of FIGS. 1A–1H, and because controller alerts do not always provide sufficient time for controllers and pilots to correct a situation once it has developed, only a combination of lights and alerts will address all eight of the most common scenarios. The FAA has contracted for the development of an operational controller alerting system, known as the Airport Movement Area Safety System (AMASS). Enhanced ASDE (Airport Surface Detection Equipment) displays will present symbology to describe aircraft position, size, direction and speed of motion, altitude, aircraft flight number, and equipment type. In addition to airport surface traffic, aircraft on approach to runways will also be depicted on the ASDE displays.

The RSLS Demonstration System incorporates only simulated runway-status lights and enhanced controller displays, and does not include a complete controller alert system. Runway-status lights, composed of runway-entrance lights and takeoff-hold lights, provide the greatest part of the protection afforded by the safety system, for several reasons. First, in any time-critical conflict scenario, the most effective safety system product is one that is directly accessible by the pilots. That direct access is allowed by runway-status lights, but not by controller alerts. Second, runway-status lights act to prevent runway incursions before they happen, whereas controller alerts only occur after a conflict has been identified. Third, runway-status lights are effective in a greater fraction of the accident and incident scenarios (FIG. 1A–1H) than are controller alerts. Therefore, for a combination of reasons, including maximizing system effectiveness in the face of developmental schedule constraints, and reducing the duplication of research efforts, the RSLS Demonstration System does not include controller alerts except for demonstration purposes.

1.3.1 RSLS Runway-status Lights

There are two types of RSLS runway-status lights: runway-entrance lights and takeoff-hold lights. The two types of lights are driven in concert by a single "safety logic", and operate together to prevent runway incursions and accidents. The runway-status lights function fully automatically in response to real-time surveillance.

The runway-status lights have two states: on (red) and off. The runway-status lights indicate runway status only; they do not indicate clearance. A green state was specifically avoided to prevent any false impression of clearance. Clearance is to remain the sole responsibility of the air traffic controller, and is not to be provided or implied by the runway-status-light system. An amber state was also avoided, because in the case of runway-entrance lights it could tend to be confused with the amber color of the ICAO wigwag taxi-hold (wigwag) lights. The lights are designed to be as conspicuous as possible while minimizing the possibility of confusion with other light systems.

Runway-status lights are designed to be generally invisible to pilots of aircraft at high speed. This design decision was made so that red lights, especially lights that suddenly turn red, will not be shown to pilots whose aircraft speed precludes them from making sudden maneuvers. Runway-entrance lights are hooded so as not to be visible to pilots of aircraft on the runway. Runway-entrance lights are not generally active at runway-runway intersections. Takeoff-hold lights are also hooded, and require that an aircraft be in position for takeoff to be illuminated. The design of the fixtures and light logic thus generally prevents pilots of aircraft at high speed from seeing red runway-status lights.

Figure 2A:
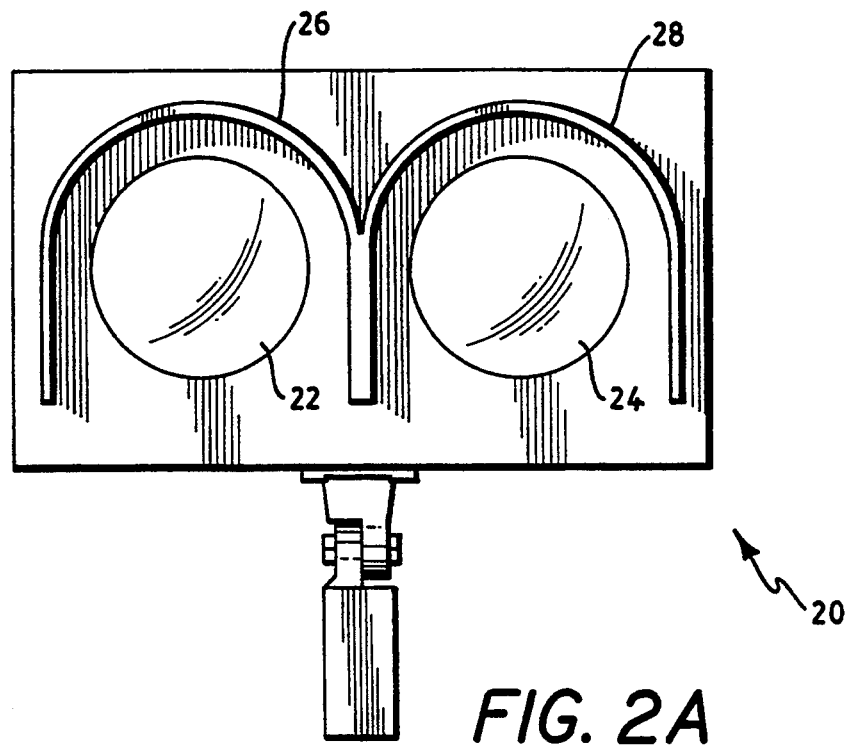
FIGS. 2A and 2B are front and side views of one embodiment of a runway-status light fixture.
Figure 2B:
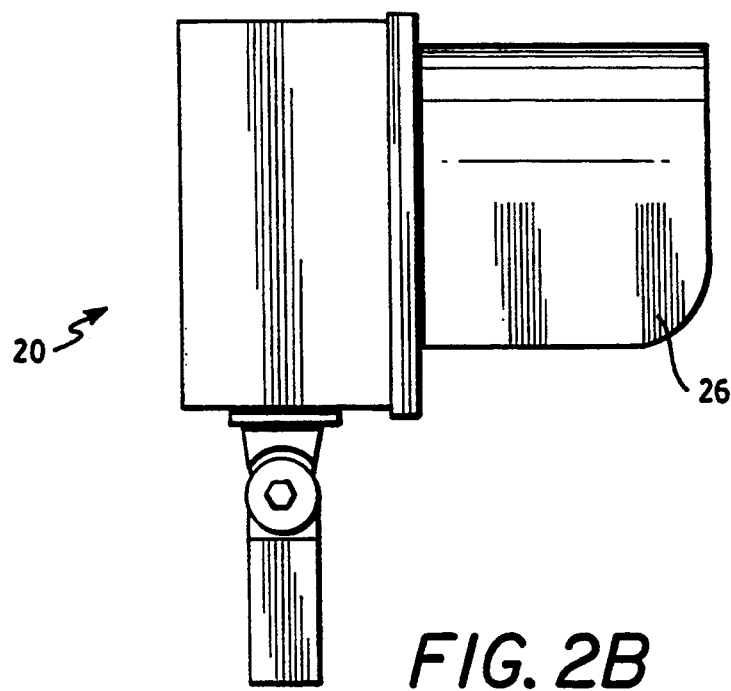

Referring to FIGS. 2A and 2B, a suggested fixture 20 for the runway-status lights would be the standard fixture used for the ICAO wigwag lights, with the amber lenses replaced by red lenses 22, 24, and the lamps upgraded to 75 W bulbs. These fixtures have hoods 26, 28 and use redundant light bulbs and other electrical components to minimize the impact of single-component failures on the operation of the system. They are also in current production, allowing off-the-shelf delivery. The RSLS Demonstration System does not in fact incorporate an actual field lighting system, but simulates the runway-status lights by the use of a model board and computer-driven displays.

Referring to FIG. 3, runway-entrance lights 30 (RELs) will be located at the taxiway entrances to runways and will be positioned on either side of the taxiway, near the runway edge and well beyond the hold lines 32. RELs will also be located at runway-runway intersections, though they will not always be implemented or actuated there. RELs will be illuminated to indicate to aircraft pilots and vehicle operators that the runway is "hot", i.e., that it is being used for a high-speed operation (e.g., takeoff or landing), and that the runway is presently unsafe to enter at that intersection. RELs will be extinguished when the runway is no longer unsafe to enter at that intersection.

Takeoff-hold lights 34 (THLs) will be located at takeoff-hold positions and positioned on either side of the runway near the runway edge. THLs will indicate to aircraft pilots that the runway is "dirty," i.e., that it is presently occupied or is about to be occupied, and that the runway is presently unsafe for departure from that takeoff-hold position. THLs will be extinguished when the runway is clear, or when the takeoff-hold position is empty. In FIG. 3, RELs 30 are on, THLs 34 are off, and an aircraft 36 is taking off. Also, wigwag lights 38 are shown.

1.3.2 ASDE Display Enhancements

The RSLS system provides several display enhancements to a surface radar or ASDE display. An ASDE-3 display contains radar video with blanking to reduce visible clutter, and line graphics to depict runway and taxiway edges and building outlines. RSLS provides iconic depiction of tracked traffic, symbolic tags for each icon, approach bars for aircraft inside the outer marker, depiction of runway-status-light state, and special markings for aircraft identified as being in conflict. For demonstration and debugging purposes, some additional safety logic internal information can also be displayed. The RSLS Demonstration System supports both monochrome and color ASDE displays.

The RSLS Demonstration System does not include radar video on its display. This was done to reduce development time and equipment expenses. This omission is not envisioned for a complete RSLS system.

All tracked traffic that is considered to be reliable is displayed as icons on the ASDE display.

An icon represents the position and direction of motion of the track, and, for tracks with ASDE image information, is drawn with a size proportional to the area of the ASDE image.

Figure 4:
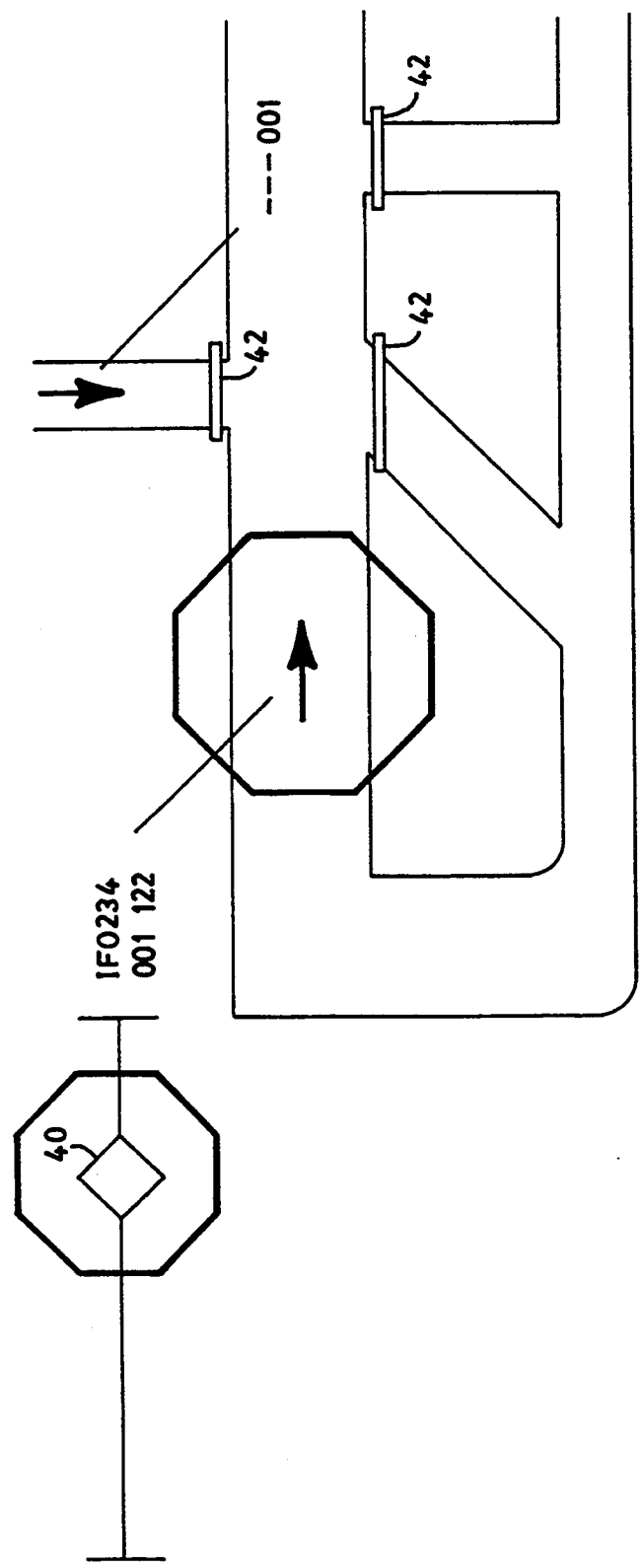
FIG. 4 is an example of an Airport Surface Detection Equipment display.

Referring to FIG. 4, each displayed track has a symbolic tag, connected to the icon with a leader line. The display software selects the leader line direction to eliminate possible overlapping tags and crossing leader lines. The tag can be displayed in two formats. The primary format shows aircraft altitude in hundreds of feet, and track velocity in knots. When available, this format also shows aircraft flight code and equipment type, the latter alternating with the velocity field. The secondary format is meant primarily for system debugging, and shows internal track numbers, track surveillance source or sources, altitude in feet, velocity in knots, and aircraft flight code when available. Aircraft on approach to runways and inside the outer marker are displayed on approach bars. An approach bar is a short line segment drawn near the approach end of the runway. It is drawn at a different scale and represents the approximately five nautical mile distance from the outer marker to the runway threshold. Aircraft identified as being on approach to a runway are shown as a diamond 40 on the approach bar. When the aircraft is near enough to the runway to appear on the scale of the ASDE display, it disappears from the approach bar and appears as a normally displayed target.

Runway-status-light state information is also rendered to the enhanced ASDE display. It can be drawn in two different symbologies. An illuminated REL can be represented by a bar 42 across the intersecting taxiway and THLs as a bar across the runway. Alternatively, RELs and THLs can be drawn as acute triangles on either side of the taxiway or runway, oriented to depict the directionality of the actual lights. A variety of other representations are also possible.

If the RSLS safety logic identifies targets as being in conflict, this information can be drawn to the ASDE display. The targets are circled, and remain so until the conflict is resolved.

Additional RSLS internal information can also be shown on the ASDE display. This information includes the target state identification (taxi, stopped, arrival, etc.), the range of predicted target positions produced by the safety logic, and artificial target (sprite) positions and control information.

The ASDE display enhancements also allow the possibility that future tower displays may be in color. The color displays show, for example, the runway, taxiway, and building outlines and approach bars in green, target icons and tags in yellow, illuminated runway-status lights in red, and conflict alert circles in white. The use of color in an ASDE display is extremely useful in enhancing its visibility to controllers, and thus the rate and efficiency of information comprehension by controllers.

1.3.3 Controller Alerts

The RSLS Demonstration System has an architecture which supports a complete controller alerting system. One conflict that can be detected is between an arriving or landing aircraft and a stopped target on the arrival runway. When a conflict is detected, the conflicting targets are circled on the ASDE display, and a synthesized voice alert is generated. The voice alert gives a warning signal and then the location and type of the conflict. A complete controller alerting system includes the capability of detecting perhaps a dozen general conflict types.

1.4 RSLS Demonstration Methodology

An objective of the RSLS Demonstration System is to develop a surface safety system that is capable of preventing most runway incursions and of identifying impending surface conflicts. This objective required the development of several significant capabilities:

An ASDE surface radar to provide radar images with sufficient resolution and scan frequency for tracking surface traffic.

A surface radar processing system to process automatically information from the ASDE, performing clutter rejection, target morphological processing, and scan-to-scan association.

An interface to the Automated Radar Terminal System (ARTS) computer to provide surveillance data for aircraft on approach to the runways.

A sensor fusion process to merge automatically tracks from the ASDE processing system with tracks from the ARTS computer, and perform multipath rejection.

A safety logic system to classify and predict aircraft behavior, identify surface conflicts, and drive runway-status lights and controller alerts.

A display system to allow basic evaluation and demonstration of the entire system.

A performance analysis suite to allow a detailed evaluation of the runway-status-light-system operation.

Figure 5:
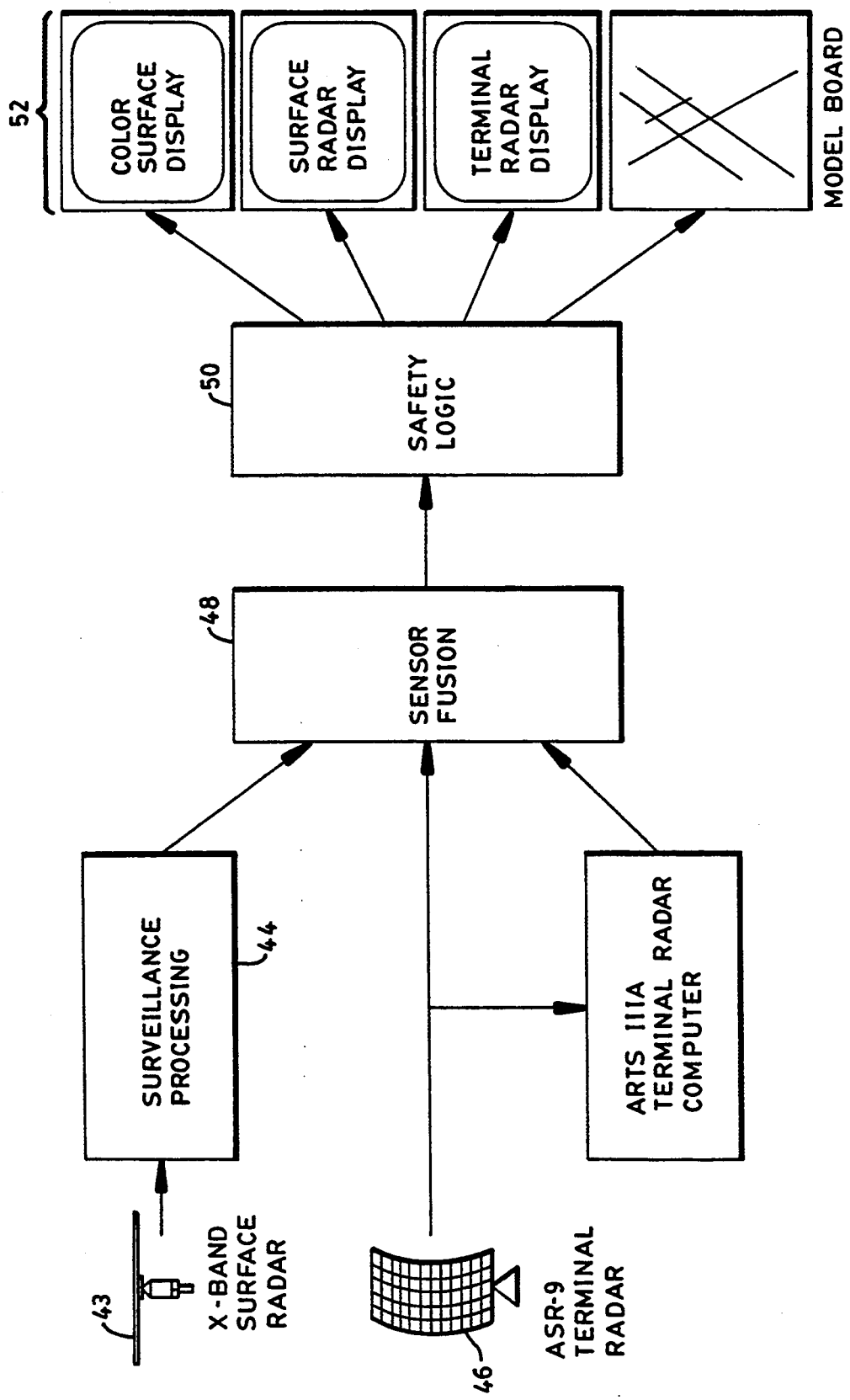
FIG. 5 is a diagram of a runway status light system (RSLS) according to the invention.

An overview of the system architecture is shown in FIG. 5. ASDE surface radar 43 analog signals are digitized and processed in a radar processing system 44. Its tracks, and those derived from ASR surveillance 46 using the ARTS tap, are passed on to a sensor fusion system 48. The output of sensor fusion is a single set of tracks presenting a coherent view of the surface and approach traffic to a safety logic system 50. Safety logic identifies aircraft states, predicts future target positions, determines runway-status-light states, and generates alert commands. The system output is shown on one or more displays 52.

Several system requirements resulted in basic engineering design choices. These include the following:

Dec. 1992 demonstration
Off-line, non-interfering demonstration
Real-time response to live traffic
Minimal system response time
Minimal hardware design time
Adequate design flexibility.

The development schedule for the RSLS Demonstration System did not provide for the use of the ASDE-3 radar at Logan, because that radar was not expected to be operational in sufficient time. Thus, a Raytheon Pathfinder X-band marine radar was installed on the roof of the old control tower building at Logan for use as the surface radar system in development and demonstration of the system. This radar is called the ASDE-X.

The Demonstration System was required to have no operational impact. Thus there are no actual runway-status lights, there is no RSLS presence in the control tower cab, and RSLS does not interfere with normal FAA or aircraft operations. All demonstration displays and system control screens are located in a demonstration room on the 16th floor of the Boston Logan tower, or in other non-interfering areas. All demonstration equipment operates on a non-interfering basis; a failure in any demonstration subsystem can not result in operational interference.

The real-time nature of the application mandates sufficient processing throughput to keep up with peak data loads. For the case of surface radar processing, this requires the use of a fairly powerful computer. Most of the subsystems operate on separate computer platforms to spread the computation load and to reduce the system impact of a single-point failure.

A real-time safety system must take into account that time-critical situations can occur where processing delays would be intolerable. Several design choices, most notably the order of operation in the ASDE clutter rejection process, and the design of a dual tap to the ARTS computer, were a result of this consideration.

Because the RSLS Demonstration System development overlapped design and implementation, it was clear that design changes along the way would be inevitable. This lead to the requirement that the use of custom hardware would be avoided wherever possible, and as much of the system functionality would be performed in software using commercial off-the-shelf (COTS) equipment. This proved to be of great benefit throughout the system design, and was made possible by the explosion in computer system performance in the past few years. In the case of the radar interface and certain required improvements to the marine radar, however, some custom hardware was required.

1.5. RSLS Demonstration Description

The RSLS Demonstration System is installed at Boston's Logan Airport. The demonstration room is on the 16th floor of the Logan control tower, in the Massport conference room. This room provides a clear view of most of the airport's runways and taxiways, allowing a good means to check the operation of the system. This room has several displays showing various aspects of the system operation. A Raytheon Pathfinder radar display shows a one-bit digitized image of the raw radar surveillance. Two monochrome high-brightness displays (manufactured by Orwin Associates) simulate an enhanced ASDE display and a DBRITE display. A third high-brightness display uses backlit active-matrix liquid crystal color technology to show how a color display could be possible in a high ambient light environment.

An airport model board includes architectural models of the terminal buildings, depictions of the runways and taxiways, and a variety of actively controlled field lighting systems. The field lighting systems are simulated using fiber optics, and include the RSLS runway-status lights, runway-centerline and edge lights, taxiway-edge lights, approach lights, taxi-hold lights, stopbars, and so on. These systems are driven actively by an integrated lighting control system, which is interfaced to the rest of the RSLS Demonstration System using an RS-232 interface. Transition from an off-line demonstration of the runway-status lights using the model board to a real field lighting system can be performed by, for example, unplugging the model board and plugging in the field lighting controller.

A DECTalk digital voice synthesizer system is used to generate audible voice alerts in response to the alert commands from safety logic. The DECTalk voice quality is probably insufficient for a real tower alerting system, but it is adequate for a demonstration system.

The Demonstration System also has two control displays located in the demonstration room. These are the control displays for the surveillance processing computer and for the sensor fusion and safety logic workstation. The former can also be used to display real-time radar images either before or after clutter rejection. The latter display functions as an additional color ASDE display, although it is not a high-brightness display, and is used to generate and control artificial targets.

The other components of the RSLS Demonstration System are located outside the demonstration room itself. The ASDE radar is located on the roof of the old control tower building of Logan Airport, and its associated electronics are located nearby and on the fifteenth floor of the new tower. The ARTS interface hardware is located in the ARTS equipment rooms on the sixth and seventh floors of the old control tower building. The computers used to drive the two high-brightness monochrome displays and to receive the information from the ARTS interface are located on the fifteenth floor of the new tower.

Normal system operation includes a startup procedure that takes about five minutes. Thereafter the system is completely functional, and normally functions without operator interaction.

1.6 Future Improvements

The performance of the RSLS Demonstration System can be improved by modification of the system architecture and by modifying the various components of the system. Improvements in the various system components are discussed in this document in the respective chapters. Certain system capabilities that might improve reliability include redundant hardware, automatic built-in test procedures, and real-time performance logging. Those of ordinary skill in the art will realize that other improvements are also possible.

For example, system-level improvements for future incorporation into the Demonstration System can center on greater information sharing between the various system components. As an example, the ASDE processing component could better initiate new tracks for arriving aircraft if it were given information about these aircraft derived from the ARTS interface. Also, sensor fusion could better fuse tracks through surveillance gaps if it were given the arrival runway predictions computed by safety logic.

Another way of improving the performance of the RSLS system is through improved surveillance. On the system level this would be accomplished by incorporating new surveillance technologies such as ADS-Mode S, Mode S multilateration, or multiple ASDEs.

2. GROUND SURVEILLANCE RADAR

This chapter describes the equipment that RSLS uses to monitor surface traffic. This equipment includes a harbor radar that was modified to satisfy the requirements of the safety system, and a recording system that enables one to digitize, censor, and record radar data. Part of the recording system serves as the interface to the radar surveillance processing system 44 (FIG. 5). This recorded data during play back has the same characteristics as the real-time data, and it allows development and verification of detection and tracking processes. The radar modifications and their justification are described in this chapter.

2.1 Radar Equipment

The surface detection radar used in this project is a modified Raytheon Pathfinder harbor radar, which operates at the X-band. The radar center frequency is 9.375 GHz. We refer to this radar as ASDE-X. The radar is incoherent and relies on short pulses for range resolution. It has neither monopulse nor Doppler capability, and it relies on a narrow antenna beam to obtain azimuthal resolution.

The transmitter and receiver are located on the top floor and the antenna is located on the roof of the old control tower building at Boston's Logan Airport. The video signal from the receiver is sent along 450 feet of frequency-compensated cable to the Raytheon display processor, which is located on the fifteenth floor of the new control tower building. Lines representing the edges of runways are generated by the standard display.

2.1.1 Radar Characteristics

This radar is typically used in harbors to detect ships, obstructions, and channel markers. While it is suitable for that task, it is not used for precision measurements. It was found that the original radar had deficiencies that would have prevented it from providing surveillance good enough to operate the safety system so that it did not have an excessive number of false alarms and missed detections.

Consequently a series of modifications was implemented to make the radar suitable for our purposes. For example, we increased the scan rate to increase the surveillance rate; we changed the shaft encoder to make the firing point of the transmitter reproducible from scan to scan; we added range-sensitive attenuation to increase the useful dynamic range of the receiver; we modified the receiver to reduce saturation effects; we shortened the transmitted pulse width to increase the range resolution; and we added test equipment to monitor the radar's status. These changes are described in detail in the next section.

Figure 6:
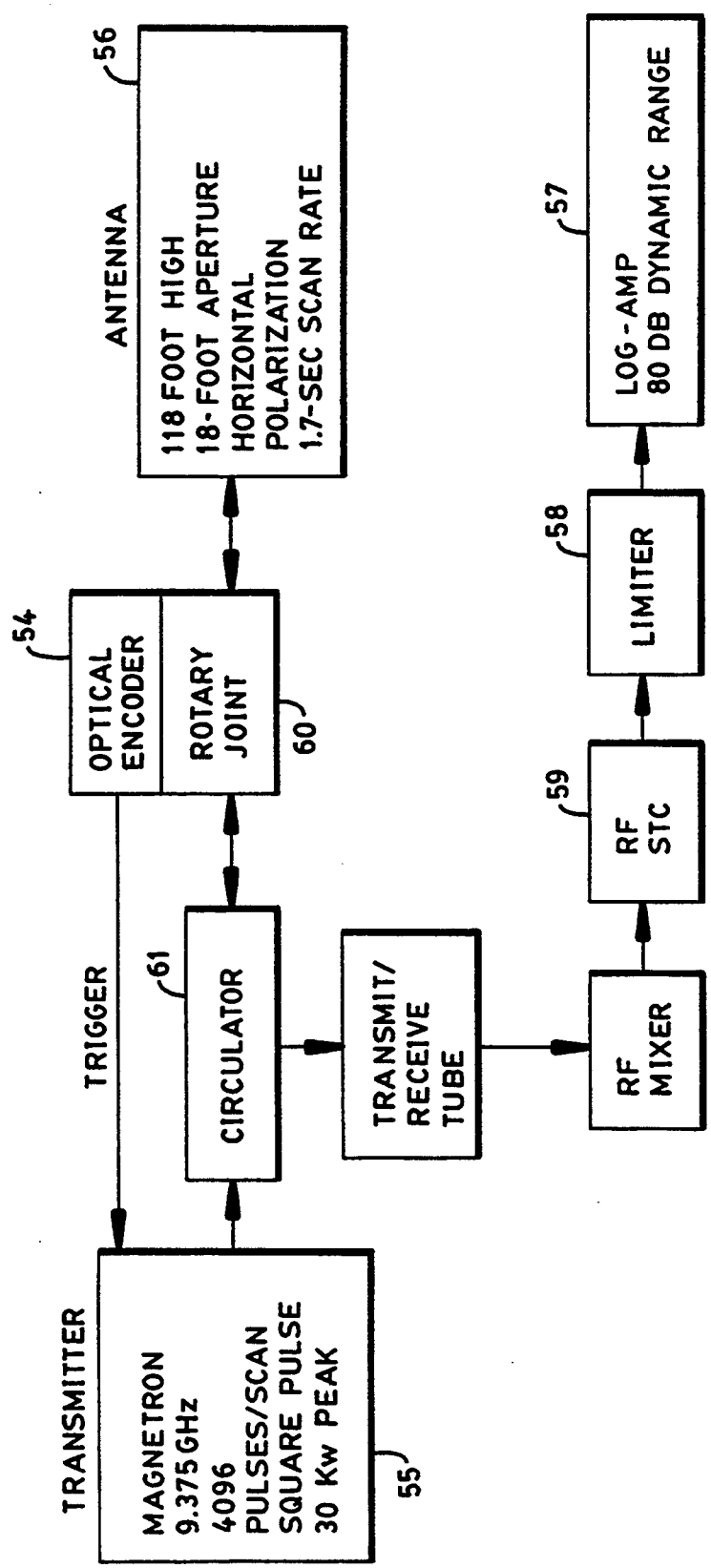
FIG. 6 is a block diagram of a front-end radar system according to the invention.

These changes were made to the radar so that it did not compromise the performance of the safety system. Each of these changes can be incorporated into the design of a new marine radar without significantly increasing the cost of a standard marine radar. Our experience in working with this radar gives us confidence to say that a reliable well-performing ground safety system can be built using an inexpensive radar as the front end. A block diagram of the radar subsystems is given in FIG. 6. Table 2.1 below gives the configuration of the ASDE-X X-band radar used in the RSLS demonstration system.

TABLE 2.1

Characteristics of the modified Raytheon harbor radar installed at Logan airport

| | |
|---|---|
| Antenna height | 118 feet |
| Power transmitted | 30 kW peak |
| Power source | Magnetron |
| Frequency | 9.375 GHz |
| Waveform | CW rectangular pulse |
| Pulse width | 40 nsec |
| Scan time | 1.7 sec |
| Pulses/scan | 4096 |
| Antenna height above airport surface | 118 feet |
| Polarization | Electrical field horizontal |
| Horizontal beamwidth to the ± 3 dB points | 0.45° one way |
| Vertical beamwidth to the ± 3 dB points | 19° one way |
| Peak antenna gain | 34 dB |
| First sidelobe level | −25 dB down from the main lobe |
| Far out sidelobes | <−40 dB down from the main lobe |
| Noise figure | 20 dB |
| Sensitivity | 17 dB S/N for 3 m² target at 10,000 feet |

There are several significant differences between this radar and the ASDE-3, which is the surface detection radar that is currently being installed at the larger airports in the United States. The ASDE-3 operates at the higher frequency of 15.5 GHz. This makes it more sensitive to rain; however, it has frequency diversity and circular polarization to allow the rain clutter to be reduced. The horizontal beamwidth of the ASDE-3 is 0.25°, which enables it to separate close objects at 12,000 feet. The vertical beam profile of the ASDE-3 is narrower than our radar and is shaped to give a return that is almost constant with range. This characteristic also makes the ASDE-3 less sensitive to rain. The ASDE-3 has four times the number of pulses per scan, which enables more pulse averaging, thereby further decreasing the effect of rain clutter.

The ASDE-3 at Logan is located on top of the control tower at a height of 275 feet, which makes it less susceptible to the multipath and shadowing effects that are serious problems with the 118-foot height of the ASDE-X. These problems are described later.

2.1.2 Radar Modifications

To work successfully in the RSLS system, several improvements were made to the Raytheon marine radar. These changes and their rationale are as follows.

1) A typical marine-radar antenna has a maximum width of 12 feet. Our system uses an 18-foot harbor antenna to obtain a narrower beamwidth of 0.45 degrees.

2) The original scan period was 2.8 seconds. To provide more frequent surveillance updates, the scan rate was increased to once per 1.7 seconds.

3) To eliminate clutter to the greatest extent possible by using a stored high-resolution clutter map, the pixel areas that are illuminated by the radar in successive scans should be as identical as possible. To ensure this, the analog resolver, which had jitter in the measurement of azimuth position, was replaced by an optical shaft encoder 54 with a digital readout. The ACP (Azimuth Change Pulse), which is used to trigger the transmitter 55, is derived from this signal. Because of wind loading on the exposed linear antenna 56, the PRI can vary by 5% during a scan, yet the azimuth position at which the transmitter fires is the same for each scan. The digital encoder also eliminated azimuthal nonlinearities that initially caused the runways to appear curved.

4) With a digital encoder it is most convenient to make the number of pulses per scan a power of two. To accomplish this, the PRF (Pulse Repetition Frequency) was changed to about 2,400/sec (exactly 4096/scan).

5) There were several deficiencies in the receiver. With the 70 dB dynamic range of the receiver, it is impossible to avoid receiver saturation from the specular returns of objects on the airport surface. The original log-amplifier, which has a slow overload recovery time, saturated before the receiver sections preceding it, resulting in greatly stretched pulses for large targets. This resulted in inaccurate estimates of the centroid position. A buffered tap 58 was placed in the Raytheon receiver before the log amplifier 59, and a new receiver section added to this tap that corrected this deficiency. Presently, the receiver saturates before the log amplifier. Even though the log-amplifier did not saturate, its bandwidth was such that there was still some stretching of targets due to the time it would take to change levels. A log-amplifier 57 with faster recovery characteristics was installed. This has greatly reduced pulse stretching, thus reducing errors in measuring the centroid of objects.

6) An object of a given size produces a much more intense return as it gets closer to the radar. The original receiver had STC (Sensitivity Time Control) to reduce the return level of closer targets (hundreds of feet). A new STC 59 was added that gives a nearly constant receiver output for a constant cross-section target in the area of most interest, which is the range from 1250 to 5000 feet, This prevents targets of average cross section close to the radar from saturating the receiver, increases the useful dynamic range, and provides more flexibility in designing the various processes.

7) A two-way directional coupler 61 was added in the microwave section that allows us to determine the match to the antenna, from which signal one can assess the health of the rotary joint 60 and the antenna. We can also insert test signals in the other directional coupler port to measure the receiver characteristics to calibrate the system.

8) The display processing unit was moved to the new tower to be closer to the processing equipment and the FAA radar displays. The Raytheon radar is being used as an interim ASDE while the ASDE-2 is replaced by an ASDE-3. The increase in distance between the transmitter and the display processor required the addition of buffer amplifiers and frequency-compensation networks to preserve the pulse shape.

9) The transmitted pulse length was shortened from 60 to 40 nsec to improve the range resolution to 20 feet, which is the same as that in the ASDE-3.

2.2 Radar Performance

2.2.1 Calculated Performance

A computer program was developed to predict the performance of the radar at various rain rates. This code calculates the interference level that is a sum of system noise and rain clutter and compares it to the predicted target return. The rain clutter in a given pixel is determined by calculating the rain clutter of any rain that is at the range of the pixel. This return is multiplied by the rain attenuation and antenna gain to that volume. The rain return is the sum of the returns from four combinations of outgoing and incoming paths: the direct path in both directions, the direct outgoing path and the incoming path that bounces off the ground, the bounced outgoing path and the direct incoming path, and the bounced outgoing and incoming paths. Only the direct paths are used to determine the target return since the ground bounce may be obscured by buildings or other targets in the foreground. For this reason the calculated signal-to-clutter plus noise ratio is a conservative estimate. On average when the target is in the clear, the ratio is six times higher.

Figure 7:
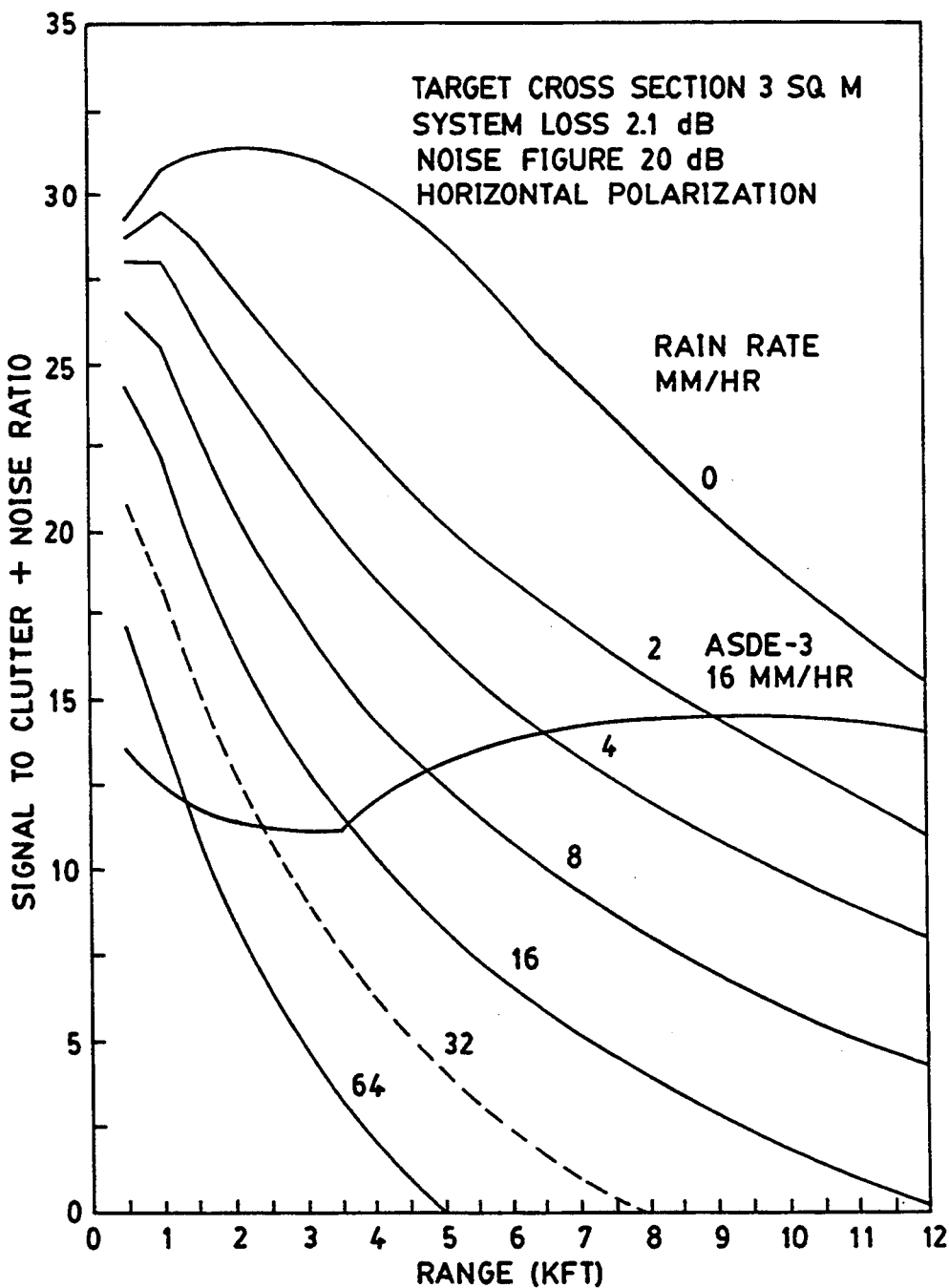
FIG. 7 shows plots of signal-to-clutter plus noise ratios of the front end radar of FIG. 6 for various rain rates for a target with a cross-section of about three square meters.

FIG. 7 shows plots of the signal-to-clutter plus noise ratios of the X-band radar for various rain rates for a target that has a cross section of 3 square meters. Also plotted on this graph is the performance of the ASDE-3 system for the same cross section when the rain rate is 16 mm/hr. The ASDE-3 has a significantly higher signal-to-clutter plus noise ratio than the ASDE-X at longer ranges. For real targets the difference is not as marked because the cross section of a complicated target is about 5 dB less in circular polarization than in horizontal polarization. The major cause of the difference in performance is the circular polarization system of the ASDE-3 radar; the rain return is at the incorrect circular polarization for the receiver. This reduces the rain return by the 17 dB cancellation ratio of the receiver.

The signal-to-clutter plus noise ratio is not the only important consideration in evaluating system performance; one must also determine what ratio is required to detect the target. Because the ASDE-3 has frequency diversity and the beamwidth and scan rate are such that one obtains returns from 12 adjacent PRIs from a point target, adjacent PRIs can be averaged to reduce the noise variance. With no averaging, one requires for a detection of a single pixel a 21 dB signal-to-clutter plus noise ratio to obtain a 0.9 probability of detection with a false alarm rate of $10^{-6}$. With the averaging across the beam in the ASDE-3, this ratio only has to be about 8 dB. Because the ASDE-X does not have frequency diversity, it has an additional 13 dB performance disadvantage in detecting a point target in a single PRI. Fortunately this is not the way the system is operated. In the system the threshold is set low to achieve a high probability of detection. However, this incurs a high false detection rate. The subsequent processes of discarding detections unless they also occur in adjacent PRIs at the same range, discarding targets unless they are above a certain size, and requiring tracks to be correlated from scan to scan reduces the false detections. The net result is that the required signal-to-clutter plus noise ratio for comparable detection statistics on airplanes is about the same in the ASDE-X as in the ASDE-3.

2.2.2 Disturbances in the Radar Data

In looking at a radar display shown on the modified Raytheon display, one is immediately struck by the large amount of clutter that is present. Since this data was taken in clear weather, this clutter is not due to rain as the clutter described in the last section. Most of the clutter is due to ground, water, and building returns. The amplitude of the clutter changes from scan-to-scan and has significant spatial in-homogeneity, thus giving the appearance of speckle. The radar returns have additional deficiencies, which are as follows: Radial streaks that exist for one PRI are caused by other marine radars that are operating on the same frequency. There can be several of these radial streaks each scan.

Since the radar is not very high, objects can cast a long shadow that is radially outrange. This shadowing effect can significantly decrease their return amplitude from an object by either obscuring the direct return from the object or by shielding one of the ground bounces that comprise the normal return. This problem is particularly noticeable for planes that are moving in a line on radial taxiways, runways, and run-up pads.

Planes that are far from the radar on taxiways can appear to merge because of the finite azimuthal beam width. This is particularly troublesome because these plans can move onto the runway in a short time.

Some planes such as the MD-80 have large returns from the nose and tail areas and very little from their midsection. These planes appear as two distinct objects, and the surveillance system has to declare them as a single object in order for the safety system to work correctly.

Aside from real vehicles in the movement areas, there are false returns of significant amplitude caused by multipath. Each of these erroneous returns is caused by a specular reflection off the real object that is then specularly reflected from a second object back towards the original object. This signal is then reflected back towards the radar and appears as a target that is radially outbound from the real object. The low height of the antenna exacerbates the problem. The number of these false images often exceeds the number of real objects. These false objects can have movement characteristics similar to real objects. Eliminating these objects is a significant challenge. We have identified several places where there are buildings at right angles to each other that form a corner reflector for the radar signals. These cause some of the multipath signals, and they can be eliminated by calculating the expected position of the multipath return. Unfortunately, a significant number of these false targets are caused by vehicles in-range of the range of closest surveillance, and these cannot be eliminated by using a fixed stored file of multipath reflectors. Because specular reflections are necessary to get a significant multipath return, the objects typically cannot move much before the multipath amplitude is greatly reduced. This observation is the basis for the most effective processes that are implemented to eliminate multipath.

The lights and their supports for the approach lighting on the extended runways have a very large cross section that can obscure all or part of the return from an airplane.

2.3 Data Recording and Play Back Equipment

Figure 8:
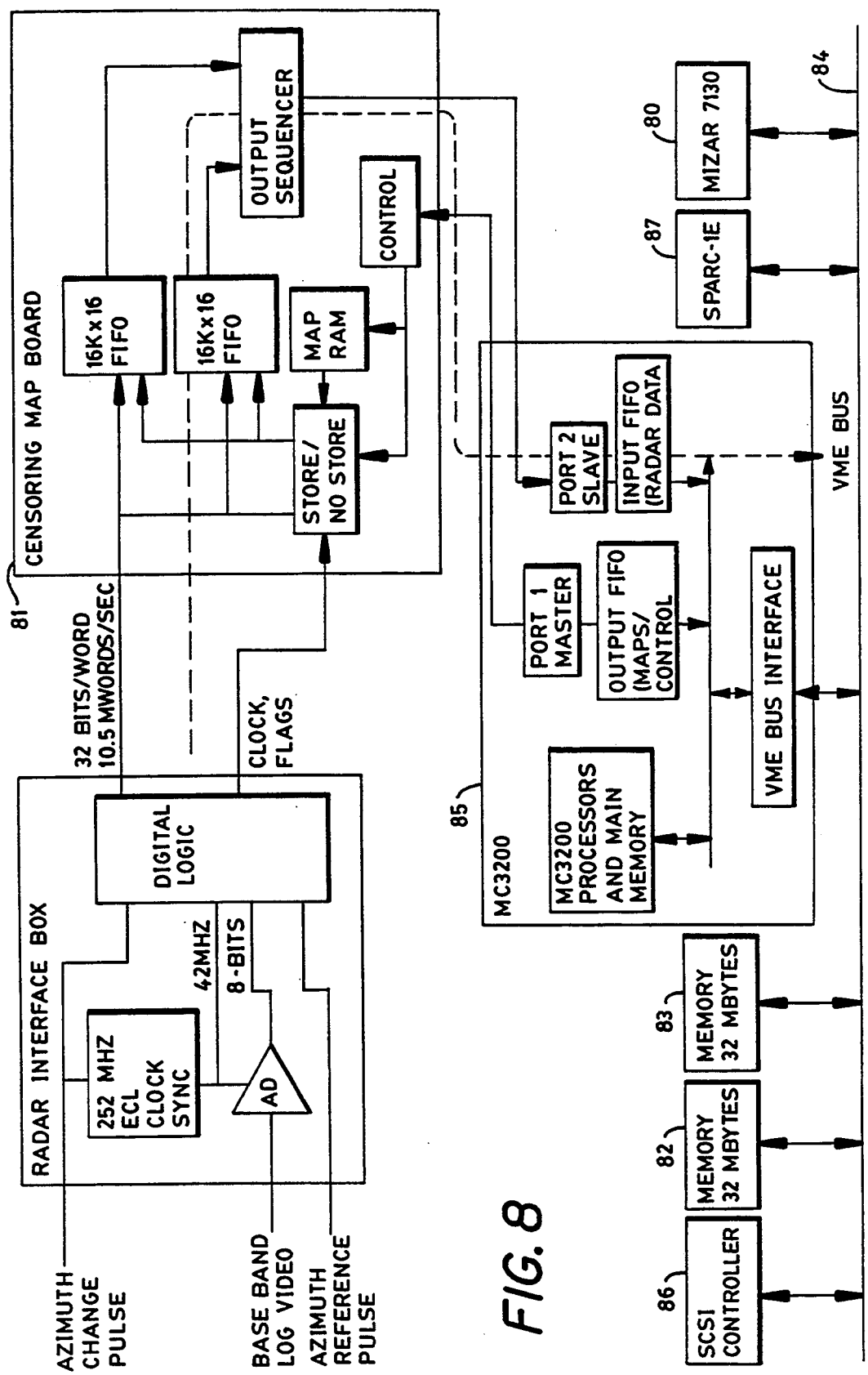
FIG. 8 is a block diagram of a recording system, known as Lincoln ASDE Recording System (LARS), according to the invention.

The radar returns are detected with a receiver that has a logarithmic amplifier to compress the difference in output voltage between returns of different amplitudes. The receiver output is digitized with an 8-bit A/D converter that samples the signal at 42 MHz. A capability to record this data and to play it back at real-time rates through the SGI (Silicon Graphics Inc.) multiprocessor has been developed. This capability facilitates the development of processes and their debugging, and allows on to store interesting scenarios. A block diagram of the recording system, which is called LARS (Lincoln ASDE Recording System), is given in FIG. 8.

LARS is controlled by a Sun workstation board 87 by a menu-driven program, which provides an easily learned interface to control data recording. Operator-selected options are downloaded to the Mizar 7130 computer 80, which controls the details of the recording process. Most of the digitized data is of no interest to the ground surveillance system. The transmitter fires 2,400 times a second thus giving an ambiguous range of about 35 nmi. The major interest is with data that is within 1.5 nmi of the radar; therefore, a major reduction in the average data rate can be achieved by discarding most data at longer ranges. An exception is the data from the area several thousand feet along the runway approaches; this ASDE data allows earlier fusion with the ARTS data. The 42-MHz data rate is reduced by a Lincoln-Laboratory-built censoring-map board 81 that selects sections of this steady stream of digital data, formats it, and adds time stamps.

The censoring reduces the data rate by eliminating data from areas of little interest. A censoring map must be developed for individual airports. Such a map has been developed for Logan Airport. Some areas around the airport and in the infield areas within the airport confines are not recorded or processed. The censored data is put into two 32-MByte ping-pong memories 82, 83 on a VME bus 84 by a Mercury MC3200 processor 85. When the Mizar 7130 computer on this bus detects that a buffer is full, it initiates a data transfer to tape using a Ciprico SCSI (Small Computer System Interface) controller card 86, which is also located on the VME bus. This scheme is used to reduce the original 42 MByte/sec data stream at Logan airport to one that is 660 kByte/sec, which is below the 2.2 MByte/sec recording limit of our SCSI-interfaced Honeywell VLDS tape system and the processing capability of our real-time system.

This censoring board is duplicated in the VME bus of the SGI multiprocessor to allow radar data to be accessed at real-time rates. This real-time censored data can be handled by the real-time processor, which is a multi-processor. The processing system has the flexibility to access data supplied at real-time rates either directly from the radar after having the data rate reduced by the process described above or by playing back data stored on the VLDS tape.

In addition, we have developed a capability to play back data at reduced rates. The data on the VLDS tape can be transcribed onto Exabyte tapes that can be played back at rates up to 500 Kbytes/sec. These units are used because the tapes can be played back many times without deteriorating, the units are inexpensive, and they are easily controlled by the Sun workstations used in software development.

2.4 Possible Radar Improvements

The performance of the radar system can be improved by changes that should not add significantly to the cost. As pointed out in Section 2.2.1, shadowing is particularly troublesome on radial runways. If the radar were sited so that it was higher and did not look radially along a runway or taxiway, then this problem would be greatly reduced. The low height of the antenna also contributes to the multipath problem. A higher siting or a location where there are not many objects to reflect the signals would alleviate this somewhat.

As pointed out above, because of processing that occurs after detection, the radar can work with about an eight dB signal-to-noise plus clutter ratio and still have good detection statistics. This can be improved if PRI averaging is implemented. This requires that the clutter in adjacent PRIs be uncorrelated. For rain this can be achieved by frequency diversity and by range staggering.

An even more significant increase in performance can be achieved by using an antenna with vertical polarization rather than the horizontal polarization of the present system. The rain clutter is particularly troublesome because with the small vertical antenna aperture the beam is wide vertically. Rain clutter comes in from many angles. Since reflections from the ground at significant angles change the sense of the circular polarization, a circularly polarized system would not have a significant advantage over the present system. However, vertical polarization has a null in the ground reflection at the Brewster's angle, which significantly reduces the rain clutter. A vertically polarized system with the same antenna gains as the present system can achieve significant improvement in rain performance due to improved noise performance and vertical polarization.

Decreasing the pulse width to 40 nanoseconds required us to increase the bandwidth of the receiver. The intermediate frequency of the receiver is at 45 MHz. We did not change this because of the requirement to be compatible with the Raytheon display system. Because the desired bandwidth of 25 MHz is a significant fraction of the intermediate frequency, it was not possible to obtain a log amplifier with ideal characteristics. In a new radar we would want to increase the bandwidth of the entire receiver chain.

3. SURVEILLANCE PROCESSING

In the last chapter the processes of detecting, digitizing, and censoring the ASDE radar data were described. This censored data is entered into a buffer memory and is read out at a reduced rate into a multiprocessor computer. an eight-processor SGI (Silicon Graphics Inc.) computer. Here, in a combination of parallel and serial architecture, the surveillance processes of rejecting clutter and interference, eliminating false objects, and grouping returns from the same object are performed. Also, by correlating returns from scan to scan, tracks and other object features are calculated and sent to the sensor fusion. This chapter describes the hardware and processes used to accomplish these tasks.

3.1 Overview of the Surveillance Processes

Among the most difficult tasks in developing the surveillance system have been generating and refining suitable processes and in implementing them in a real-time system. We have tried to keep the number of airport-specific parameters to a minimum to make the code easily portable. To move to a new airport one would have to input the location of certain types of areas. Thus, there would be very little tuning of parameters in this process.

The tasks of rejecting clutter and establishing tracks are complicated because of the severe clutter environment found at Logan airport. The object of surveillance processing is to achieve a high probability of detection while maintaining a low probability of false detection. To do this we take the approach of using a low threshold to detect radar returns. This results in a very high probability of detection and a high probability of false detection in the initial clutter-rejection stage.

The false objects are eliminated by a series of processing steps each of which decreases the probability of a false detection without significantly affecting the probability of a correct detection. The false-detection rate is reduced by requiring some overlap of the pixels contained within the threshold crossings between adjacent PRIs, by morphological processing, by using size criteria, by correlating tracks with those from previous scans, and by using the location of a detection and its amount of movement.

Figure 9:
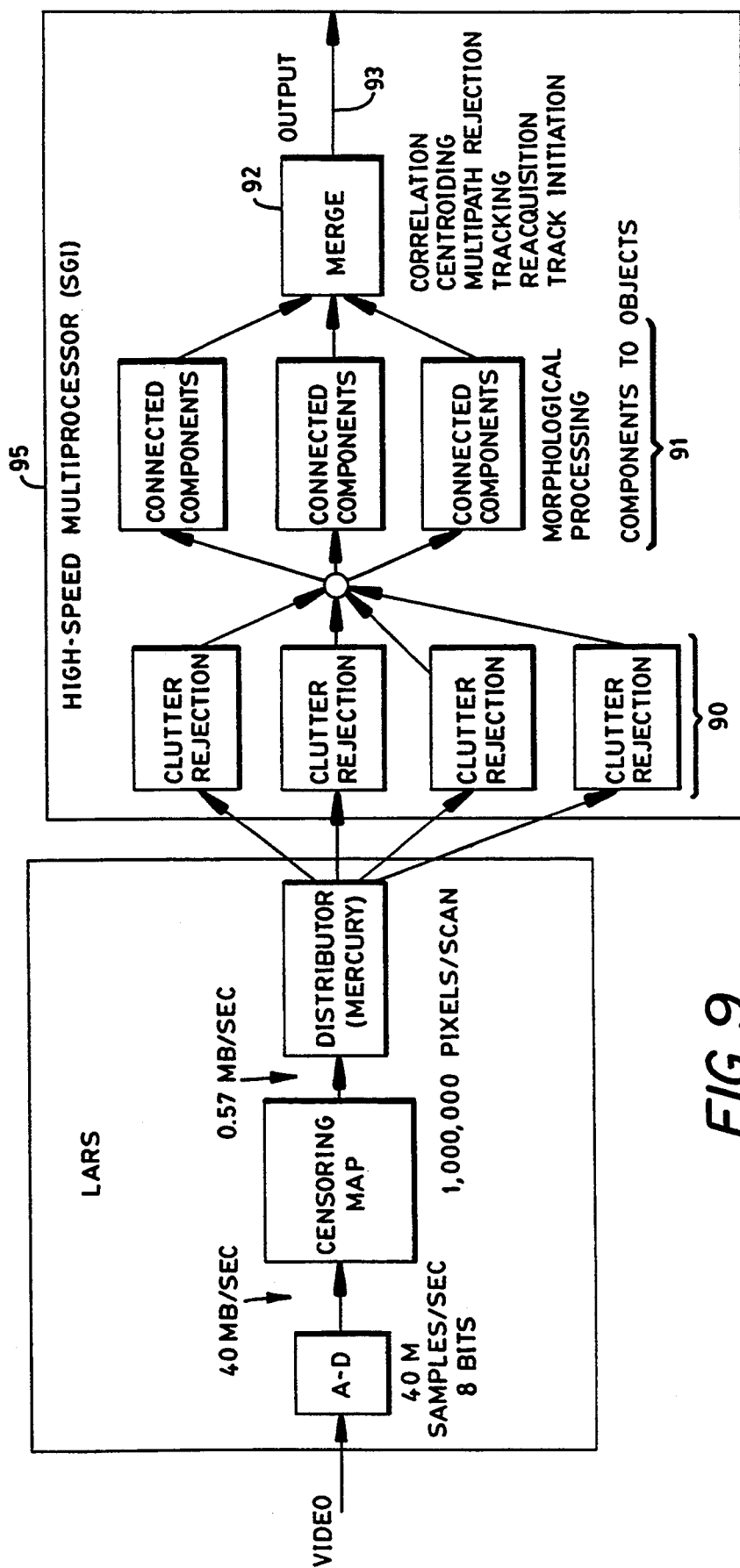
FIG. 9 is a block diagram of a surveillance processing system, such a system is shown as a single box in FIG. 5.

In this chapter, the steps for each of the surveillance processes are first listed, and then some details of their implementation are described. Greater detail is provided in the chapter on system software. FIG. 9 shows a block diagram of the processes and the processors assigned to them.

Most radar clutter is removed in the initial clutter rejection processing. Radar interference and random noise are eliminated in the PRI correlation processing that occurs in the clutter-rejection processors 90. Out of this process come threshold crossings. A contiguous group of pixels from several PRIs within the threshold crossings is referred to as a component. The process of connected components 91 identifies regions that belong to the same component. The morphological or shape processing eliminates small components, cleans up images, and associates components that are part of the same object. Scan-to-scan correlation 92 associates objects with those present in previous scans. This enables tracks to be updated and new ones to be generated. These files and other object features are sent 93 to the safety system.

Since both the clutter-rejection and the connected-components modules each use more than one processor, each of which processes part of the airport surface, special care is necessary to merge components that are close to the processing boundaries. This requires special treatment of the areas that are close to the surface wedge boundaries.

3.2 Processing Software and Equipment

The surveillance software is written mainly in the object-oriented language C++, and the interprocessor communication software is written in both C++ and C. The capability to develop the software on many platforms and to test it with real data reduced the developmental time. This environment enabled us to evaluate the performance of the various processes and to develop the links between the software modules.

For surveillance processing we have two SGI multiprocessor chassis each of which can hold two, four, six, or eight R-3000 processors. Eight processors, which have a maximum processing capability of 286 MIPS, are used for the Logan demonstration. Two processors in a chassis and the Indigo workstations are retained at Lincoln Laboratory for additional software development, debugging, and non real-time data processing. We have four HP computers, one is at Logan; the other three are located at Lincoln Laboratory. The SGI and HP computers at each of the two locations are linked by Ethernet. The two locations communicate via a high-speed modem link that can transfer software between computers, thereby allowing tight configuration control and remote control of the processors.

The Logan-airport system can be operated to run either in real time or to use recorded data. We have recorded data when the airport was in different runway configurations, when there were periods of light, medium, and heavy traffic, and when it was raining and snowing to assess system performance in these conditions.

To operate in real time, the surveillance code has to run on eight processors, which required careful attention to interprocessor communications. An existing interprocessor communications protocol, which had been developed for other projects, was modified to transfer information between the various processors.

As shown in FIG. 9, there are three sets of processors 90, 91, 92 to apply the surveillance processes to the radar data. When data is transferred from one set of processors to another set, it is first converted from the internal object-oriented format to a serial format. This process, which can be computationally expensive, is called flattening. When data is received by the succeeding processors, it undergoes an unflattening operation that puts it back into an object-oriented format.

An existing interprocessor communications package was chosen to control the transfer of data between processors. It was modified for this application and it comprises a protocol, server-client, and C++ layers. At run time, the user specifies the channel and ports for data transfer. The package can use shared memory, Ethernet, files, etc. It efficiently handles all details of the transfer in a real-time environment. It operates on both the SGI and Sun computer systems. The C++ layer does the flattening and unflattening operations.

3.3 Surveillance Processes

The radar data undergoes a series of processes to produce tracks and object features for the safety system. This section describes these processes

3.3.1 Clutter Rejection

This initial stage of processing rejects most of the clutter in the radar return and forms a binary image. Censored raw radar data is processed. The return amplitude for each pixel is compared to a stored threshold value for that pixel. The value in the binary image is set to zero if the radar return does not exceed the threshold and to unity if the threshold is exceeded. The thresholds are set fairly low so that many pixels exceed it. The processes that are performed by the clutter-rejection process are as follows:

1) Initialize the values in the clutter map during the initial scans when the system is first turned on.

2) Determine the threshold level for each pixel from the stored clutter values. The threshold is set to the mean plus some constant times the standard deviation.
3) Compare the radar data that is returned from a transmitted pulse to these levels and record the radial position both at which the data first exceeds the threshold and when it drops below the threshold. These two values constitute a run. The list of the positions of the threshold crossings is called a run-length table.
4) Examine the runs in adjacent PRIs. If no adjacent run has some of the same range values, discard the run.
5) Pass the remaining threshold crossings in the form of a run-length table to the next processing stage.
6) Update the statistics in the clutter map at the airport positions where a run does not exist.

The motivation and details of the implementation of this clutter-rejection process are now described. The implementation in this system is different from that of the ASDE-3. The clutter has been found to vary greatly with position on the airport surface. In the ASDE-3 there are constant threshold values for different regions of the airport surface, where each region comprises many pixels. If the clutter is non-uniform in a region, not only does some clutter break through, but also the probability of detection is reduced in some areas. Since the ASDE-3 was designed, memory and computational costs have decreased significantly to the point that one can reduce the size of the clutter region that has the same stored clutter level to a single pixel without incurring a significant cost. That has been done in the RSLS system.

When the system is turned on, the clutter means and mean sum squares are determined by using a decaying memory filter. The threshold is initially set at the maximum value for non-movement areas and at a level well above the clutter and noise values on the movement areas but well below the maximum value. Training of the clutter statistics takes place for those pixels that do not exceed the threshold. The decaying memory filter has a weight of 1/6 for new information and 5/6 for old information. After 35 scans, which takes about a minute, the clutter statistics have converged to the correct values for areas in which no objects are present. The clutter statistics of those values are updated for a long enough period of time so that most vehicles have moved from the spot they occupied at the start of the initiation process. This is done to ensure that correct clutter values are obtained for the runway movement areas and for regions that may have been shadowed by these objects.

If an object does not move until after the training period, then at the time of movement the clutter statistics will train to the correct value. It should be noted that if an object stops on the airport surface, it will always exceed the threshold. Training is suppressed for areas that are above the threshold; therefore, the track of an object will not be dropped no matter how long the object remains stationary.

From the stored mean and variance in the clutter map a threshold value is calculated for each pixel. The threshold value is Threshold=Mean+($K\sigma$) where $\sigma$ is the standard deviation, and K is a constant which is presently set to 5. There are maximum and minimum values for $K\sigma$ used in this formula; they are stored parameters. The parameters to determine the threshold value has yet to be fully optimized.

The incoming data is compared to the threshold value and if it is exceeded, a run is started. The run ends when the threshold is no longer exceeded. Only the starting and ending positions of the runs are stored. Runs are used because they are a compact representation of the data, and more importantly, because many of the processes that operate on the data are very efficiently implemented with this data representation. The thresholds are set fairly low, which results in a large number of detections per scan. This low threshold ensures us of a high probability of detecting a real object. The many false objects detected by this process are eliminated in the subsequent processing. The process of clutter rejection removes clutter such as the clutter shown in FIG. 7.

To operate in real time one must be concerned with load balancing and processing latency. The processing described above is the same for each pixel and repeats every scan. Four processors are assigned to clutter rejection. Because of the repeatability, specific parts of the airport are assigned to a given processor. The data is fed into each processor in a data block of 128 contiguous PRIs. Each of these blocks corresponds to a surface wedge on the runway surface. Because for part of the scan the radar looks at areas not associated with the airport surface and approaches, only 22 of these radial surface wedges are required to perform surveillance for the airport. Each surface wedge is time stamped with the time the radar illuminated that surface wedge.

The next processing step rejects isolated noise spikes and interference from other radars whose PRI is typically different from our 415 microseconds PRI. The azimuthal beamwidth, scan rate, and PRI are such that a point object that exceeds the threshold by at least three dB is detected in five contiguous PRIs. If a run does not have a run from an adjacent PRI on either side that overlaps in range, it is discarded since it does not have the characteristic of a real object. This process is performed here for computational efficiency since the first stage in the morphological processing would also reject these pixels. The remaining runs are sent to the connected-components processors.

The clutter means and mean sum squares are updated with data from the most recent scan by using a decaying memory filter. The time constant to update the clutter values is short and currently is six scans. For the data examined so far, the time constant is short enough so that when it starts raining the stored clutter values can rise fast enough to keep the detection statistics almost the same, even with the raised clutter values.

3.3.2 Connected Components

The runs remaining after interference rejection are passed to the connected-components processors. The images now have a binary amplitude. Some morphological processing is used in this module since it is an efficient way to eliminate small objects and to control processor loading. The processes that are performed during the connected-components process are as follows:

1) Read the runs from the clutter-rejection module.
2) Perform the morphological opening operation.
3) Form a chain code of the outline of a component from the clustered adjacent runs.
4) Subtract the runs corresponding to that component from the global set of runs.

5) Repeat the process until all runs are assigned to individual components.
6) Calculate features such as the area and centroid.

Having the data above threshold in the form of runs lowers the data transfer requirements between processors. In addition, there are efficient processes available to perform morphological operations on the data.

Small components are eliminated by performing an opening. An opening is a morphological operation composed of an erosion followed by a dilation. Each non-boundary pixel is surrounded by eight pixels. In an erosion, any black pixel that touches a white pixel even at a corner is turned white. This decreases the size of the object, smoothes the contour, and eliminates small objects. In a one-pixel dilation any white pixel that has an edge or corner in common with a black pixel is turned black. These operations are not inverses of each other. For instance, if the component was a two-by-two array of pixels, then the erosion would eliminate the object. The dilation does not bring it back into existence. Aside from eliminating small components, this operation smoothes the boundaries of components. Larger objects can be eliminated by doing an opening in which there are several erosions followed by the same number of dilations.

The number of objects to be processed in a given part of the airport can vary from scan to scan and with changes in runway use. For this reason fixed parts of the airport cannot be assigned to individual processors without incurring excessive latency in certain situations. To overcome this problem, a dynamic load balancing scheme is used. Data from the 22 surface wedges that has been processed by the clutter-rejection processors is put in a cue. When a connected-component process is free, then the time stamp is examined. The data in the oldest surface wedge is assigned to that processor.

The number of runs that needs to be processed for a scan is determined. If this number gets too high, the processors can fall behind. To prevent this from occurring, when the number exceeds a stored value, the opening operation is changed to one in which two erosions are performed followed by two dilations. This will eliminate components that are larger than those with a single-pixel opening, thus reducing the number of components that must be processed.

After this operation, adjacent runs are combined to form a component. In this process, a chain code, which contains the ordered position of pixels on the periphery of the component, is formed. The chain code can be used to calculate the perimeter of the component; however, perimeter is not calculated in the current RSLS implementation.

After a component is extracted from the total set of runs, the runs associated with it are subtracted from the data in the surface wedge. The process of finding a component is repeated until there is no more data present. The result of the processes in this section is a table of associated runs corresponding to individual components whose sizes are more than a certain area 3.3.3 Components to Objects Several individual components may be associated with the same object. In this stage of processing, close components are grouped to form an object. In addition, components that are at the surface wedge boundary are marked for additional processing in the merge processor. The processes that are performed in this process are as follows:

1) Combine close components to form objects,
2) Determine the features of the objects,
3) Mark components that are at the surface wedge boundary, and
4) Send the objects to the next processing stage.

We want to use a distance criterion to associate components with each other. It is computationally expensive to calculate the distance between components, and a different method is used to approximate the desired process.

Each component is surrounded by an enclosing wedge that is padded in distance so that there is at least a five-meter separation between the enclosing wedge and the component. Enclosing wedges that overlap are noted. The components in two enclosing wedges that overlap are dilated by a given distance radially. The same number of pixels are dilated in the azimuth direction. The number of objects in the overlapping enclosing wedges is now examined. If it is one, the components are considered to be part of the same object, and if it is two, they are declared separate objects. If they are part of the same object, an enclosing wedge is generated for the new object. This process is performed for each pair of overlapping wedges.

Next, one determines if the objects are close enough to the surface wedge boundary so that one must see if objects in the adjacent surface wedge are part of the same object. This is done by enclosing the object in an enclosing wedge with padding. If this enclosing wedge overlaps the surface wedge boundary, it is considered to be touching the surface wedge boundary. If none of the components that correspond to an object touch the surface wedge boundary, the object is put into a table listing completed objects, and its centroid and area are calculated. The centroid is the center of gravity of the object. If a component touches a wedge boundary, it is put onto a list of incomplete objects. This processing is performed for each of the 22 surface wedges. The amount of data at this stage has been greatly reduced from that in the raw radar image.

3.3.4 Merging

The tables of complete and incomplete objects and the calculated features are passed to the merge processor. Here the incomplete objects are compared to incomplete objects in adjoining surface wedges, and they are combined into single objects when appropriate. The processes that this process performs are as follows:

1) Read in the data from the connected components processors,
2) Examine incomplete objects that are in adjoining surface wedges whose enclosing wedges overlap,
3) Declare the combined object to be a single object if dilations result in a single object and separate objects otherwise,
4) Put this combined object in the complete table if the resulting object does not touch a surface wedge boundary,
5) Repeat steps 2 and 3 if the combined object touches a surface wedge boundary, and
6) Calculate features of the complete objects.

The two lists of complete and incomplete objects from the last processing stage are unflattened. The distances of incomplete objects are compared to objects in adjoining surface wedges using enclosing wedges with padding. As before, if the enclosing wedges overlap, dilations are performed to see if they should be considered a single object. If they are not, the same process is performed for other objects whose enclosing wedges overlap. If the object remains a complete object in all the tests, it is put on the list of complete objects. If the components are part of a single object, it is determined if this object is close to another surface wedge boundary. If it is not, it is added to the list of complete objects. If it is close to a surface wedge boundary, the above process is repeated again and again with successive surface wedges until it is declared a complete object.

The result of this process is a list of objects, that includes their centroid, area, and enclosing wedge.

3.3.5 Scan-to-Scan Correlation

In this last stage of surveillance processing, tracks are formed and updated, and this information is sent to the safety system. The logic is complicated because one needs to achieve both a low probability that tracks will be dropped on real objects, and a low probability that they will be initiated on false objects. This is accomplished by projecting tracks from a previous scan to the present scan. A best-fit correlation based on the distance of the objects near the projected track is made. If a correlation is found, then the track is updated. If there is no projected track close to a detected object, or if another object is even closer to the projected track, a new track is started. Tracks are classified as being of low and high confidence. Because of the presence of multipath and object fading, a track can be temporarily lost. Special software has been implemented to reacquire tracks of objects rapidly that we have high confidence should still be on the movement area. Such a track loss is referred to as a "bad track drop."

Track association and lost-track recovery require additional information about the object. An aspect graph contains this information, which is unique for each type of object. Currently, it contains the area of the object as a function of both the range and the angle between a vector from the radar to the object and the main axis of the object as determined by its velocity vector. This is calculated in real time.

The processes the scan-to-scan correlation process performs are as follows:

1) Correlate the centroid position of objects from this scan to the projected positions of tracks from previous scans. Select the object to correlate with based on a priority list.
2) Initiate tracks on uncorrelated objects.
3) If track is lost on a high-confidence object, use the rapid reacquisition process to reacquire it.
4) Update the tracks based on the positions of the objects in this scan.
5) For objects in track, pass to the sensor fusion the position, estimated error in the position, area, object extent about the centroid, time, and confidence that the object is real.
6) For objects in track calculate entries for the aspect graph.

The centroid, velocity, and the area of each object are stored in the tracks. The positions of objects from previous scans are projected to this scan and compared to the positions of the centroid of objects. The correlation is first performed for high-confidence tracks, then for "bad track drops," then for low-confidence tracks, and then for new tracks. If a projection is within a user-set distance of an object in the present scan, then the same track number is assigned to the new detection. If the present positions of several objects are within this user-selected distance of the projected track, then the track number is assigned to the object that is closest to the projected track position. Conversely, if several tracks project to within the user-selected distance from an object, then the track that is associated with the object is the one that projects closest to the object. The position, velocity, and the aspect graph of the objects in track are updated.

To minimize latency in transferring tracks to the sensor fusion, the best-fit match of objects is accomplished in stages. In doing the correlation, if an object is within the user-set distance when the correlation is performed, that information is immediately used to update the track, and it is sent to the sensor fusion. If a subsequent object has a smaller difference in position between the projected track, the track is corrected based on this new position, and this information is sent to the sensor fusion.

The track number can be transferred to another object if the return from the real object fades and there are other returns nearby that don't associate with the correct object, or there is a significant error in projecting the position of the object. The centroid jitter has a value of 1.3 m rms for objects moving in straight line. Because the image area of a turning object can rapidly change, the projection error is sometimes larger in that case. Because the centroid error is so small, the present system has a small probability of dropping or transferring track.

If an object in the present scan does not correlate with an object from previous scans, a new track is initiated. The track has a confidence level associated with it that expresses one's confidence that the object is indeed a real object and not clutter or multipath. The confidence level is determined by how far it has traveled since it was first observed. Presently the confidence level is binary, and its value is zero for a new track.

Multipath can lead to false track initiation. The most common cause of multipath is a specular reflection between two objects. Typically, a small relative movement between the objects greatly reduces the amplitude of the return. We have found that requiring an apparent track to move a certain distance (presently 200 meters), called the lead-in distance, before declaring it to be a high-confidence track is a very effective filter to reduce greatly the potential of declaring a high-confidence track on multipath returns. Before it moves this distance, it is declared a low-confidence track. After it has moved this distance it is declared a high-confidence track.

This lead-in distance does not significantly affect the ability to have an initial track on an object when needed since we have a guard zone around most of the surveillance region and secondary surveillance for aircraft on approach. This zone has a width corresponding to the distance required for a track to move before it is reported as a high-confidence track. Therefore, most real objects are in high-confidence track before they enter the required surveillance region. The lead-in process does, however, have a significant detrimental impact on the display of traffic on the inner taxiway, ramp, and gate areas.

Even though the use of a lead-in does not adversely affect initial track acquisition, it can adversely affect reacquisition of tracks that are lost for one or several scans. Tracks can be lost because of shadowing, object breakup, or because the track is associated with a nearby multipath object. In a majority of cases this multipath object disappears after a scan or two, in which case the track does not associate with any nearby object. To recover from this situation, a special process has been implemented. If an object is in high-confidence track and is moving less than 50 m/sec, and was seen in the movement area in two out of the last three scans, and is not correlated with any object from the present scan, a "bad track drop" is declared. When this occurs the following steps are taken to reacquire the object:

1) The user-set distance over which a correlation is sought is changed to the distance the target at its last reported velocity would move in 15 scans,
2) The object within this correlation distance that most closely matches the last cell observed of the object's aspect graph and does not associate with any high-confidence track is chosen as the new track position, and
3) A correlation is sought for 20 scans, after which the track is dropped.

At the ends of several runways there are piers that support the approach lights. The combination of piers and lights has a high radar cross section and either partially or totally obscure airplanes that pass over them To reduce the probability of track loss in these areas, the tracking filter is modified so that the object coasts in the direction of the runway centerline if it is not detected. For some scans this essentially allows the track to coast through the difficult areas.

All these operations help to reduce the false-detection rate while having a very minor effect on the probability of detection of real objects. The tracks, containing size and position are passed to the sensor fusion with a binary estimate of the confidence that the object is real.

3.4 Possible Surveillance Processing Improvements

This chapter has described the processes as currently implemented in the RSLS system. We have identified the following additional enhancements to improve performance:

Many system parameters have not been fully optimized. A suite of analytical and graphical tools would greatly aid this optimization and allow us to debug more easily and software changes or additional processes.

Amplitude information is currently not passed to the connected-components process. The clutter-rejection module passes only binary amplitude information. Amplitude information would help to eliminate false objects since many multipath objects have amplitudes that are significantly less than those of airplanes.

ARTS information including aircraft type is used by sensor fusion and is presently not sent to the surveillance logic. If available to the surveillance logic, one could use the ARTS tracks and airplane identification to help prevent the initiation of false tracks and to help prevent the dropping of real tracks.

The physical distance corresponding to a pixel are different in range and in azimuth. The distance extent of an azimuth pixel is a function of range. The performance of the components to object morphological operation in the connected-components processors would improve if it took that into account.

The aspect graph currently only has object area. It would produce a more accurate identification if it contained perimeter and gray-scale information. Also, the current graph has values uniformly distributed in angle. A non-uniform distribution with more values in regions in which the values in the aspect graph table are rapidly changing would be better.

The aspect graph is currently generated in real time for a object on the airport surface. When the object is turning, which is the time that track is most likely to be lost, values in the aspect graph at these angles may not be a available. If one knew the aircraft type and had a stored high-resolution aspect graph for that object, then one would do a better job of maintaining and reestablishing track.

We know the position of several fixed objects and often the position of moving objects that contribute to multipath. Currently, we do not use this information. With known multipath reflectors one can predict where multipath objects will appear, which would allow them to be discarded.

By using the details of the amplitude distribution statistics of clutter and various airplanes, which are radically different, one could do a better job of association from scan to scan.

The clutter map is not stored from one session to the next. Doing this would allow one to initialize the system more rapidly.

4. ARTS INTERFACE

The RSLS Logan Demonstration System requires data from the Automated Radar Terminal System (ARTS-IIIA) to provide surveillance information and aircraft data tags for aircraft on approach. The purpose of this chapter is to outline the ARTS interface requirements, to present the interface design, and to describe the interface hardware implementation. Details of the software implementation can be found in the system software chapter of this report.

4.1 Requirements

The ARTS data required by the Logan Demonstration System include aircraft position (range, azimuth, altitude) and the information stored in data tags (including aircraft identification or ACID, and equipment type). Not all the aircraft visible to the ARTS system are important to RSLS; only data from those aircraft which are on or near the airport surface (including departures, arrivals, and other operations such as missed approaches, go-arounds, or touch-and-goes) will be required. To minimize the potential coverage gap or maximize the coverage overlap between the ASR terminal area radar data and X-band surface radar data, the ARTS data should provide information down to the lowest ranges and altitudes available, without being subjected to any unnecessary surveillance mask. All data should be provided in a timely fashion; for aircraft on final approach, any unnecessary delay in the availability of surveillance data is not acceptable.

Further requirements on the ARTS interface were mandated by the development schedule for the Logan Demonstration System. Because of the short schedule, it was not possible to make any basic changes to the operational ARTS system at Logan. No ARTS program changes were allowed, no dedicated input or output ports were available, and no interference with operations could be accepted. There was insufficient time for any significant hardware development effort. Thus the ARTS interface was required to be a passive, listen-only interface that could derive all needed data from ports already in use, and would use commercial off-the-shelf equipment.

There is no single ARTS port or data stream which carries surveillance data which are both timely and close-in, and are tagged. The surveillance data are made available to the ARTS input-output processor (IOP) via the serial communications interface processor (SCIP) port from the ASR-9. The SCIP surveillance data do not include data tags; only position, altitude, transponder code, and secondary information such as validity flags. The SCIP tap provides timely and unmasked surveillance, but does not provide the needed aircraft data tags.

The flight plan information, which is the source of the ACID and equipment type, is provided separately to the ARTS IOP via the interfacility communications (IFC) port. The ARTS computer matches the surveillance information with the flight plan information to produce, after some processing delay and a range/azimuth filter, track reports which include aircraft identification, position, and velocity. Estimates of the ARTS processing delay range from 0.7 to 2.4 seconds. The ARTS display data is available in two places: at the ARTS-MDBM (multiple display buffer memory) interface, or at the MDBM-DEDS (digital electronic display system) interface. The function of the MDBM is to allow connecting four DEDS to a single ARTS output port, while reducing the 30 Hz data refresh requirement of the DEDS to a requirement that the data be updated only when modified. The ARTS-MDBM interface thus offers the simultaneous advantages of providing access to data going to four DEDS at once and reducing the amount of data that must be processed by the ARTS tap. It has the minor disadvantage that the information at this interface does not represent complete display messages, but only changes to display buffer memory. Thus the IOP-MDBM interface was chosen as the data source. The ARTS output data available on the IOP-MDBM port provides the needed aircraft data tags, but is neither timely nor unmasked.

The need for timely and unmasked data, including surveillance and data tags, thus requires a combination of the SCIP and MDBM data. Both the SCIP-IOP and the IOP-MDBM communications links are doubly redundant. The ARTS tap must take this redundancy into account. The information required by the RSLS Logan Demonstration System must be made available in a convenient format.

4.2 ADIDS design

Figure 10:
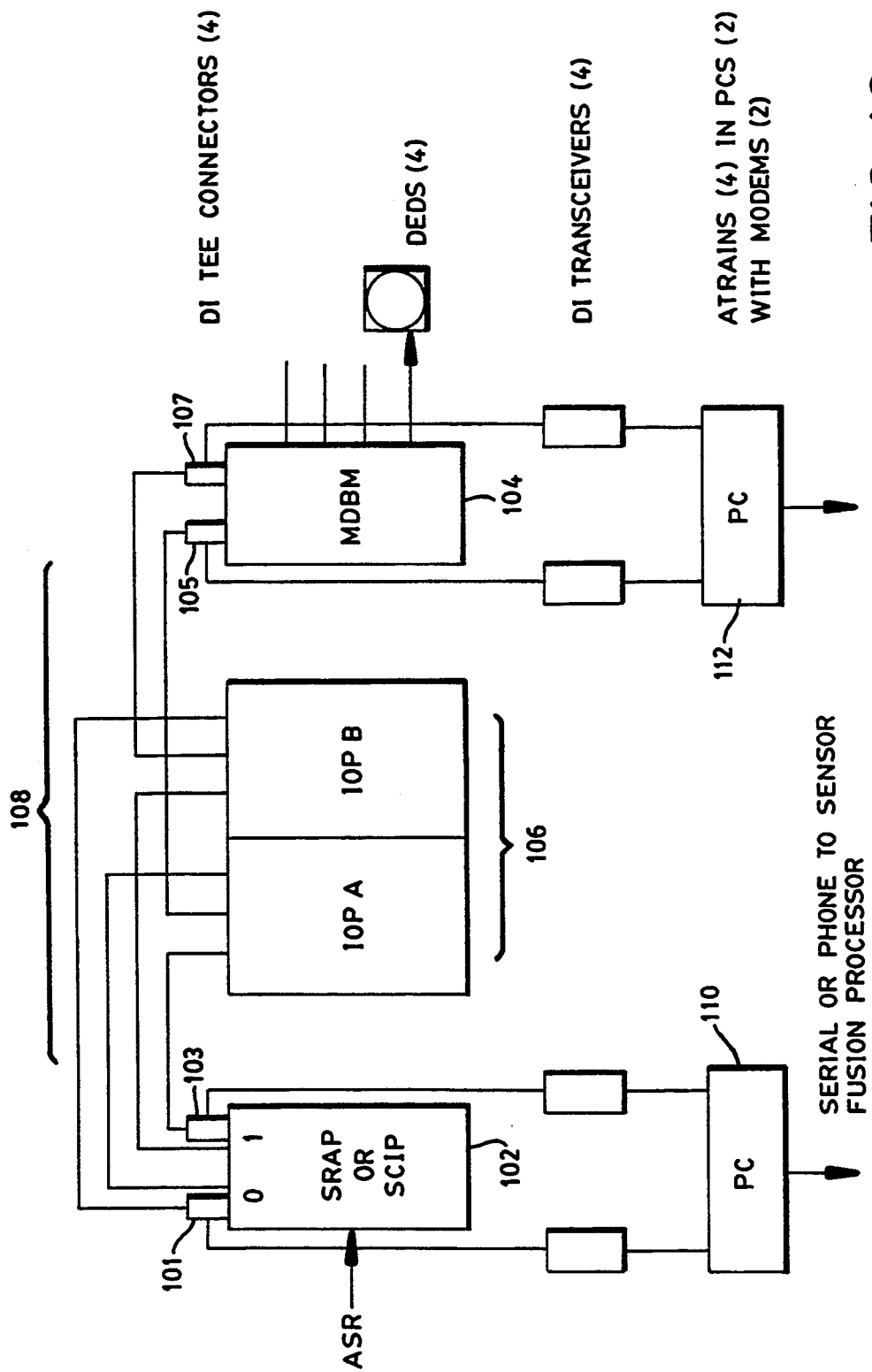
FIG. 10 is a diagram of a data interface and distribution system (termed ADIDS, which is short for Automated Radar Terminal System Data Interface and Distribution System) according to the invention.

The ARTS interface which meets the above requirements is termed the ARTS Data Interface and Distribution System (ADIDS). FIG. 10 shows the ADIDS architecture. ADIDS consists of two independent subsystems, ADIDS-SCIP 102 and ADIDS-MDBM 104. These two subsystems are electronically very similar, but use different software to produce the different functionality required at the two ports. Each is coupled to an ARTS IOP 106. Each listens to the data available on its ARTS data stream, reformats and filters the data as necessary, and retransmits the data an external interface. No data recording capability is built into ADIDS.

The SCIP-IOP and IOP-MDBM data paths 108 are 30-bit wide parallel connections. To make the data easily accessible to a variety of computers, ADIDS reformats the data into an 8-bit wide external format. To control the amount of data to be reformatted and distributed, area filtering of the data is performed by ADIDS. The design of the area filter allows for the possibility of an ASR displaced from the region of interest. Area filter parameter upload and some program control can be effected via the external interface.

4.2.1 ADIDS-SCIP

A summary of the data available at the SCIP input of the ARTS is shown in Tables 4.1a–4.1d. Because the surveillance data at this interface are in cylindrical coordinates, the ADIDS-SCIP volume filter is also expressed in cylindrical coordinates. The data messages from the SCIP interface are essentially self-contained, so no particular sophistication is required to perform the distribution of these data. The ADIDS-SCIP subsystem will work without modification for an ARTS-IIIA site using an ASR-7 with a sensor receiver and processor (SRAP) interface.

4.2.2 ADIDS-MDBM

A summary of the data provided by the ADIDS-MDBM subsystem is shown in Tables 4.2a–4.2d. The messages at the IOP-MDBM interface reflect the use of the MDBM as a display buffer memory. These messages are display memory update messages, rather than complete surveillance messages. Thus, making the display information available in a simple format requires the emulation of the MDBM, to reconstitute the display memory update information into complete display item messages. This is done in the ADIDS-MDBM subsystem.

The MDBM emulation performed by the ADIDS-MDBM subsystem consists of two parts. The first part is to maintain the MDBM memory in accordance with the memory update messages received from the IOP. When the ADIDS-MDBM subsystem is initialized, its emulated memory map will not properly reflect the state of the MDBM internal memory map. As memory update messages are received, more and more of the emulated memory map will contain the correct information, and after a period of time the entire emulated memory map will be correct. The normal operating procedure of the ADIDS-MDBM subsystem is to leave it turned on, constantly maintaining its emulated memory map, so initialization is not normally an issue.

The second part of the MDBM emulation is the interpretation and retransmission of the types of display data presented in Tables 4.2a–4.2d. Because the positions of the various data types in the MDBM memory can vary between ARTS sites, and also between ARTS system software revision levels, the interpretation of the MDBM display data is specific to a particular site and software revision. There are five parameters used to describe the positions of the various data types which must be modified to account for this specificity. The surveillance data at this interface are in Cartesian coordinates, so the ADIDS-MDBM area filter is also expressed in Cartesian coordinates.

4.3 Hardware implementation

ADIDS uses ATRAIN (ARTS IIIA/TRACS Interface) hardware available from Dimensions International ("ARTS III A/TRACS Interface System Instruction Book" prepared for DOT/FAA under contract DTFA03-89C-00053) for its electrical connection to the ARTS system. This hardware was originally developed by Dimensions International to allow the recording of SRAP or SCIP data in Transportable Radar Analysis Computer System (TRACS) format. The ATRAIN system consists of three components: four devices 101, 103, 105, 107, a signal repeater assembly, and a personal computer (PC) resident parallel interface board. The ATRAIN system allows sufficient isolation and fault tolerance for use on an operational ARTS system. The ATRAIN interface is a passive, listen-only device. The ARTS channels monitored by the ATRAIN interface are not relayed; they continue operation in their normal manner. The ARTS data undergoes no modification, diminution, augmentation, or delay on either of the monitored interfaces. There is no impact on the controller displays or interfaces. Test NCP approval was required and obtained for installation on the Boston ARTS-IIIA system.

There are two ATRAIN systems for each ADIDS-SCIP and ADIDS-MDBM subsystem. This allows the monitoring of either of the doubly redundant SCIP-IOP and IOP-MDBM interfaces. In normal operation, both of the SCIP-IOP interfaces are active at the same time, transmitting identical data, so either can be monitored. In case one of the SCIP-IOP interfaces becomes inactive, the ADIDS-SCIP subsystem automatically switches over to the other interface. In normal operation, only one of the IOP-MDBM interfaces is active at a time, but the chosen interface can switch back and forth aperiodically. Thus the ADIDS-MDBM subsystem monitors both IOP-MDBM interfaces at all times.

The data received by the ATRAIN interface boards is reformatted by the two ADIDS PCs 110, 112 and made available for transmission across an RS-232 interface, or via a v.32bis v.42bis modem and telephone lines to the RSLS ADIDS data client.

TABLE 4.1a

SCIP Sector message date

| Datum | Bits | Range | MSB | LSB |
|---|---|---|---|---|
| parity | 2 | 0–3 | upper parity | lower parity |
| ID | 6 | 0×0D | | |
| sector | 5 | 0–31 | 16 sectors | 1 sector |

TABLE 4.1b

SCIP Alarm message data

| Datum | Bits | Range | MSB | LSB |
|---|---|---|---|---|
| parity | 2 | 0–3 | upper parity | lower parity |
| ID | 6 | 0×36 | | |
| SCIP alarm | 1 | 0–1 | | |

TABLE 4.1c

SCIP Primary radar message data

| Datum | Bits | Range | MSB | LSB |
|---|---|---|---|---|
| parity | 2 | 0–3 | upper parity | lower parity |
| ID | 6 | 0×0A | | |
| range | 14 | 0–255.984 nmi | 128 nmi | 1/64 nmi |
| azimuth | 12 | 0–4095 ACPs | 2048 ACPs | 1 ACP |
| RTQC/Test | 1 | 0–1 | | |
| ARTS quality | 3 | 0–7 | | |

TABLE 4.1d

SCIP Beacon radar message data

| Datum | Bits | Range | MSB | LSB |
|---|---|---|---|---|
| parity | 2 | 0–3 | upper parity | lower parity |
| ID | 6 | 0×16 | | |
| range | 14 | 0–255.984 nmi | 128 nmi | 1/64 nmi |
| azimuth | 12 | 0–4095 ACPs | 2048 ACPs | 1 ACP |
| RTQC/Test | 1 | 0–1 | | |
| ARTS quality | 3 | 0–7 | | |
| Mode 3/A code | 12 | 0–4095 | | |
| radar reinforce | 1 | 0–1 | | |
| Mode C altitude | 10+sign | −102300–102300 ft | 51200 ft | 100 ft |
| beacon | 5 | 0–31 | | |

TABLE 4.1d-continued

SCIP Beacon radar message data

| Datum | Bits | Range | MSB | LSB |
|---|---|---|---|---|
| hit count ring indicator | 1 | 0–1 | | |
| 3x indent indicator | 1 | 0–1 | | |
| | 1 | 0–1 | | |
| Mode C validity | 2 | 0–3 | | |
| Mode 3/A validity | 2 | 0–3 | | |

TABLE 4.2a

ADIDS-MDBM A-Word data

| Datum | Bits | Range | MSB | LSB |
|---|---|---|---|---|
| parity | 2 | 0–3 | upper parity | lower parity |
| line type | 2 | solid, dashed, dotted, dash-dot | | |
| refresh | 1 | 0–1 | | |
| display/radar coord | 1 | 0–1 | | |
| brightness | 2 | 0–3 | | |
| blink | 1 | 0–1 | | |
| force | 1 | 0–1 | | |
| leader direction | 2 | N/NE, E/SE, S/SW, W/NW | | |
| mode | 2 | single symbol, data block, tabular data, vector mode | | |
| no process | 1 | 0–1 | | |

TABLE 4.2b

ADIDS-MDBM B-Word data

| Datum | Bits | Range | MSB | LSB |
|---|---|---|---|---|
| parity | 2 | 0–3 | upper parity | lower parity |
| Y coordinate | 10+sign | −63.94–63.94 nmi | 32 nmi | 1/16 nmi |
| X coordinate | 10+sign | −63.94–63.94 nmi | 32 nmi | 1/16 nmi |
| blink indicator | 1 | 0–1 | | |
| symbol TI code | 6/char | 0–63 | | |

TABLE 4.2c

ADIDS-MDBM C-Word data

| Datum | Bits | Range | MSB | LSB |
|---|---|---|---|---|
| parity | 2 | 0–3 | upper parity | lower parity |
| blink indicator | 1 | 0–1 | | |
| symbol 1 TI code | 6 | 0–63 | | |
| symbol 2 TI code | 6 | 0–63 | | |
| symbol 3 TI code | 6 | 0–63 | | |
| symbol 4 TI code | 6 | 0–63 | | |
| symbol 5 TI code | 6 | 0–63 | | |

TABLE 4.2d

| ADIDS-MDBM data block format | |
| --- | --- |
| Full Data Block | A B C C C C |
| Altitude (Limited) Data Block | A B C C |
| MSAW Data Block | A B C C C C C C |
| Single Symbol Data Block | B |

5.1 Sensor Fusion Overview

For the RSLS Logan Demonstration, as shown in FIG. 5, surveillance data is derived from both an X-band airport surface detection equipment (ASDE-X) radar, and the ASR-9/ATCBI airport surveillance radar via a dual tap to the automated radar terminal system (ARTS IIIA) computer. The two surveillance radars produce data independently, yet feed into a common safety and display logic. The surveillance information from these two radars must be processed to form a single coherent picture of the traffic on and near the airport surface. Forming this single view of airport traffic is the responsibility of the sensor fusion system (FIG. 5).

Some major tasks of sensor fusion include:
Data input from two radars via three channels (ASDE, ARTS-MDBM, and ARTS-SCIP) and from a target simulator (sprites),
Coordinate transformation to a common coordinate system,
Time translation to common clock,
Track parameter estimation (velocity, acceleration),
Altitude pressure correction,
Beacon multipath rejection (SCIP data),
ASDE multipath rejection,
ASDE-ARTS track fusion and unfusion,
Aircraft data tag transfer,
Unreliable track rejection,
Track coasting,
Artificial target handling,
Data output to safety logic and any other client.

The design of sensor fusion had to allow some measure of generality, in particular for the tasks of track fusion and rejecting unreliable tracks. Each of the functional components is discussed in detail below.

5.2 ARTS Demultipathing

Beacon reports from the ASR-9/ATCBI airport surveillance radar derived via the ADIDS-SCIP tap are subject to multipath. The term "multipath" is used loosely to describe any beacon return which either contains false position or false squawk code information. Because the beacon reports contain target identification in the form of a transponder code, the process for detecting and eliminating the false reports can be made to be quite effective. Because the ADIDS-MDBM tap is used only to provide aircraft identification (ACID) and not surveillance per se, and because the ARTS computer itself does some multipath rejection, the ARTS multipath removal process needs to be applied only to the SCIP data.

5.2.1 ARTS Multipath Removal Process Requirements

The multipath removal process operates in real time. Thus it must not significantly delay targets which may be genuine. It discards data which can be immediately proven false, and it tries to replace data which prove later to be false. Finally, even when multipath leaks through for any reason, subsequent real targets must not be suppressed; that is, the process has to be able to recover from pathological conditions.

Multipath removal from the ARTS SCIP data stream is greatly aided by use of the assumption that all aircraft in the Boston TCA are equipped with Mode A transponders. Furthermore, all aircraft arriving to or departing from Logan airport are required to use a discrete beacon code. Compliance with these two requirements are assumed in this process. The use of discrete beacon codes makes scan-to-scan association trivial. It leaves open the possibility, however, that an aircraft with no transponder, or one with an incorrectly operating or incorrectly set transponder, may become unnecessarily invisible to ASTA sensor fusion.

The multipath removal process makes use of a few basic features of a multipath return. The first is that multipath returns are necessarily further away than the true position of the aircraft. (Unfortunately this true position is in general not known.) Multipath returns often, but not always, coexist in the same radar scan with true returns. Multipath returns are often far away from the expected position of the aircraft, which is based on the previous history of that aircraft. Multipath is often due to reflections off fixed objects (like buildings), and appears in areas outside normal aircraft operating areas.

The multipath removal process must accommodate several annoying features of a multipath return. The first is that a multipath return is not necessarily further away than either the previous or the next true return. Sometimes several multipath returns over several scans are received while no true returns are. Sometimes multipath returns appear close to where the true return is or should be. Sometimes multipath returns appear in areas where aircraft normally operate.

5.2.2 ARTS Multipath Suppression Process Specification

There are six basic components to the ARTS multipath removal process. These components are designed to work in concert, each correcting deficiencies but not interfering with the correct operation of the others. Roughly in order of data flow they are: beacon validity requirement, regional suppression, report time/range checking, track projection, track length enforcement, and pathological recovery. Each is discussed below in its own section.

5.2.2.1 Beacon validity enforcement

Only SCIP beacon reports are used by sensor fusion. SCIP primary-only reports are ignored. In addition, the beacon reports are required to have a Mode A validity code of 3 (on a 0–3 scale). Furthermore, nondiscrete or erroneous beacon codes, such as 1200 or 0, are ignored.

5.2.2.2 Regional suppression

Because certain regions may be relied upon to uniformly contain multipath target reports in great excess over true reports, these regions are mapped out of the surveillance space of the ASR radar. Any ARTS target reports occurring in a suppressed region are not made available for further processing.

5.2.2.3 Report time/range checking

The basic concept behind the report time/range process is that if more than one report is received in one radar scan for a single discrete beacon code, at least one of the reports must be multipath. As a multipath return cannot be in-range from the true aircraft position, the further of the two reports must be the multipath, and can be removed. The obvious advantages of this process are that it requires little knowledge of the target's previous behavior, and that it is computationally quite efficient. The most important advantage is that it is selfstarting, i.e. that it can reject multipath given only two hits on a target.

This simple picture must be modified, however, to take into account the effects of aircraft motion, surveillance error, and missing true reports. (Radar scan time variations are small compared to the time perturbations induced by these other effects.) When an aircraft is moving, its range from the sensor becomes a function of time, and the time between hits can differ from the radar scan time. Surveillance error can make a multipath return appear closer than it should be. When true reports are missing for whatever reason, the time difference between received true reports is a multiple of the radar scan time, in addition to any contribution due to aircraft motion. All of these effects could under certain circumstances induce the simple time/range process to reject true reports while accepting multipath reports.

Thus the modified time/range process is as follows. The time between the present report and the most recent previous report is compared to the ranges given in Table 5.1. (The previous report must have passed the whole multipath removal process, otherwise it would have been removed and not stored for subsequent processing.) If this time difference lies in one of these ranges, either the present or the previous hit is multipath. If the difference between the ranges exceeds the range difference threshold given in Table 5.1, the nearer report is taken as the true one, and the further report is removed. If the further report is the later (current) one, it is merely discarded. If the further report is the earlier (previous) one, it must be removed from the track, and its effect on the track's derived parameters be eliminated. Sensor fusion presently does not cleanly reverse any fusion or unfusion decisions made from the previous report; that reversal would happen via the normal fusion and unfusion procedure. Then the nearer and later report can be appended to the track as normal. If the range difference does not exceed the threshold, track projection (see below) is used to remove one of the reports.

TABLE 5.1

| | Time/range parameter values. | |
|---|---|---|
| # of Full Scans | Time Range (sec) | Range Difference Threshold (nmi) |
| 0 | 0.0–4.2 | 0.1 |
| 1 | 5.0–8.7 | 0.2 |
| 2 | 9.7–13.1 | 0.2 |
| 3 | 14.6–17.5 | 0.2 |
| 4 | 19.5–21.8 | 0.2 |
| 5 | 24.3–26.2 | 0.2 |
| 6 | 29.2–30.6 | 0.2 |
| 7 | 34.1–34.9 | 0.2 |
| 8 | 38.9–39.3 | 0.2 |

The Table 5.1 values assume a radar rotation rate of 13 revolutions/minute. Both the entries and the number of lines in Table 5.1 are subject to change when more multipath data become available. This is especially true for the last column, where there is at present really insufficient data to make adequate threshold recommendations. The entries in Table 5.1 are the result of the examination of about four hours of ARTS CDR data from May 7, 1992. The last rows of Table 5.1 may never be exercised because, depending on the setting of the coast parameters, sensor fusion may have already dropped the track.

5.2.2.4 Track projection

Projection is only used if the ARTS track has a valid velocity. Track projection is used in two ways to remove ARTS multipath. First, if and only if the time/range process indicates that either the present or the previous radar report is multipath, but cannot discern which is the offender, track projection removes the report which has the larger distance to the track projection. Thus if $$d = ||(x,y)_{measured} - (x,y)_{projected}|| \qquad (5.1)$$

is the distance between the reported position and the ARTS track's position projected to the reported time, then if $d_{present} < d_{previous}$ then the previous report should be removed and the present one used, otherwise the present report should be discarded. It is important that the projection operation used to determine $(x,y)_{projected}$ in each case not use either $(x,y)_{present}$ or $(x,y)_{previous}$; it must be a projection based on information independent of the two target reports being weighed.

The second way that track projection is used is to always remove reports whose distance to the track projection exceeds a threshold. That threshold is slightly range dependent, and is given by $$d_{ARTS\_multipath} = d_0 + kr. \qquad (5.2)$$

Thus if $d > d_{ARTS\_multipath}$, the present radar report is discarded.

5.2.2.5 Track length enforcement

ARTS tracks are not considered reliable (blessed, in sensor fusion parlance) until $N_{ARTS\_bless}$ (presently 3) target reports are on the track. Because target reports which correspond to multipath returns generally do not get put on the track, or are removed from the track after they are put there, the ARTS track length may be smaller than the number of track reports that were provided by the SCIP data source. Only blessed tracks are sent on to safety logic for analysis.

5.2.2.6 Pathological recovery

There are conceivable situations where the above multipath removal procedures will lock on to a multipath track instead of a true one. In this case, all subsequent true target reports could be rejected. A simple recovery procedure is required to take care of such pathological situations. This pathological recovery is effected by the coast/drop mechanism already existing in sensor fusion. If an ARTS track gets no reports which are considered valid for a certain amount of time, then the track gets dropped. Subsequent reports would initiate a new track, allowing recovery.

5.3 Parameter estimation 5.3.1 Alpha-beta-gamma filter

Target centroids estimated from ASDE and ARTS data must be processed to reduce random noise and constant biases and to provide accurate estimates of the target positions, velocities, and accelerations. Sensor fusion uses a fixed-gain, variable time interval filter in Cartesian coordinates, the $\alpha$-$\beta$-$\gamma$ filter. The $\alpha$-$\beta$-$\gamma$ filter can be expressed as $$r_f = r_p + \alpha \Delta r$$

$$v_f = v_p + \beta \Delta r / \Delta t$$

$$a_f = a_p + \gamma \Delta r / \Delta t^2 \qquad (5.3)$$

where $r_f$, $v_f$, and $a_f$ are the filtered position, velocity, and acceleration estimates, respectively, $\Delta t$ is the time interval between measurements, $\Delta r = r - r_p$ is the residual between the present measurement r and the predicted position $r_p$, and $r_p$, $v_p$, and $a_p$ are the predicted position, velocity, and acceleration based on the filtered estimates from the previous iteration and are given by $$r_p = r_f + v_f \Delta t + \tfrac{1}{2} a_f \Delta t^2$$
$$v_p = v_f + a_f \Delta t$$
$$a_p = a_f \qquad (5.4)$$

The temporal behavior of this filter is governed by the parameters $\alpha$, $\beta$, and $\gamma$, which are fixed in advance according to an optimization scheme. The optimized filter coefficients are produced by training the filter on a data set representative of the actual data to be used, and using an evaluation function of the accuracy of simple position projection to produce optimized gains.

The implementation of the $\alpha$-$\beta$-$\gamma$ filter must take into account the possibility that, for either the ASDE or the ARTS data source, corrected updates may occur. These occur for ASDE tracks when a new target is found that is a better match to the track after a target has already been reported for that track in the same scan. Corrected updates occur for ARTS tracks when the multipath removal logic detects that a target report previously appended to a track was in fact a false report, and a new report is to be inserted in its place. These corrected reports are always one-deep; that is, they never remove more than one previous report. Thus the $\alpha$-$\beta$-$\gamma$ filter implementation retains a one-deep history of its estimates so that corrected reports can be incorporated properly.

5.3.2 Creep velocity

The RSLS safety logic uses target heading for target state determination, position prediction, and light transition and alert logic. The normal definition of heading $\phi$ is $$\phi = \tan_{-1} v, \qquad (5.5)$$

where $v$ is the target velocity and the four-quadrant arctangent has the range $[-\pi, \pi)$.

For targets with velocities small or comparable to the velocity uncertainty, however, such an estimate of the heading is too noisy to be used. The velocity uncertainty is determined by the surveillance noise and by the coefficients of the $\alpha$-$\beta$-$\gamma$ filter used to estimate velocity. There is a tradeoff between velocity estimate noise and response time to a change in the target velocity. The coefficients used in sensor fusion were optimized for estimating future position, not for estimating present heading of slowly-moving targets.

A more useful method of estimating the velocity of slowly-moving targets, the creep velocity, is defined as follows. Let $(r,t)$ be the latest target report position and time, and $(r_d, t_d)$ be the most recent previous target report position which satisfies the condition $$||r - r_d|| > d_{creep}, \qquad (5.6)$$

where $||\ ||$ denotes the Euclidean norm, and $d_{creep}$ is a fixed creep distance parameter. Then the creep velocity $v_{creep}$ is given by $$v_{creep} = (r - r_d)/(t - t_d), \qquad (5.7)$$

and the creep heading is given in the normal way by $$\phi_{creep} = \tan^{-1}(v_{creep}). \qquad (5.8)$$

A simple implementation would be to keep the target reports in a list or queue, appending new ones to the end and taking off old ones from the beginning to satisfy Equation 5.6. This can be problematic, however, for very nearly stationary targets, where Equation 5.6 is satisfied only for a very large number of target reports (if at all). The simple implementation could then appear as a memory leak for stationary targets. This problem can be mitigated with only slight loss of accuracy by appending a new target report $(r', t')$ to the list or queue only if $$||r' - r|| > d_{new}, \qquad (5.9)$$

where $d_{new} < d_{creep}$ is a distance parameter for novelty.

The implementation of the process for creep velocity must also take into account the occurrence of corrected reports. The process presently used in sensor fusion does this by keeping more target reports on the creep list than would be required by Equation 5.6. Instead, the oldest target reports are only removed from the creep list when $$||r' - r|| > d_{creep\_remove}. \qquad (5.10)$$

5.3.3 Altitude correction

Altitude information is maintained by sensor fusion and consists of the altitude above ground level, reported in feet and accurate to 100s of feet; and an altitude validity bit. The transponder-reported altitude from the SCIP is modified to do a simple pressure correction to produce an altitude above ground level, and coasted to allow for dropped Mode C altitudes. This is done as follows:

A time-stamped list of the $N_{altitude-average}$ recent valid transponder-reported pressure altitudes $z_{PA}$ is maintained. New SCIP reports have their pressure altitudes added to the list if (a) the velocity $v < v_{on-ground}$, and
(b) the pressure altitude $z_{PA}$ satisfies $|z_{PA} - z_{PAGL}| < \Delta z_{PAGL}$.

Old pressure altitudes are removed from the list when (a) there are more than $N_{altitude-average}$ altitudes on the list, or
(b) they are older than $t_{old-altitude}$ seconds before the present ARTS report. The pressure altitude for ground level $z_{PAGL}$ is computed as the average of the altitudes on the list. If there are no such altitudes, $z_{PAGL}$ and all altitudes reported to the safety logic are invalid, and any new pressure altitude automatically passes the $\Delta z_{PAGL}$ test.

For SCIP reports with a valid transponder-reported altitude, the pressure-corrected altitude reported to the safety logic is given by $z = z_{PA} - z_{PAGL}$ if $v > v_{on-ground}$, and zero otherwise. For SCIP reports with an invalid transponder-reported altitude, the previously reported altitude is coasted without modification, up to a maximum of $t_{altitude-coast}$ seconds, with the altitude validity flag set. For reports corresponding to tracks without valid altitude data for more than $t_{altitude-coast}$ seconds, the altitude validity flag is cleared.

A fused track reports its SCIP subtrack's altitude to the safety logic. An ASDE-only track has its altitude validity flag cleared. On unfusion, the resulting ASDE-only track has its altitude validity cleared, while the ARTS-only track retains its altitude validity.

The default values for the various parameters are given in Table 5.2.

TABLE 5.2

Parameter descriptions and default values for altitude correction.

| Parameter | Description | Default Value |
|---|---|---|
| $N_{altitude-average}$ | Number of on-ground altitudes to keep | 100 |
| $t_{old-altitude}$ | Age of oldest on-ground altitude to keep | 600 sec |
| $V_{on-ground}$ | Threshold velocity defining on-ground | 40 kt |
| $\delta Z_{PAGL}$ | Pressure altitude | 500 ft |
| $t_{altitude-coast}$ | Altitude coasting time | 15 sec |

5.4 MDBM-SCIP subfusion

The dual tap to the ARTS provides surveillance with the greater accuracy, coverage, and promptness from the ADIDS-SCIP tap, and surveillance with aircraft data tags and equipment types from the ADIDS-MDBM tap. As they both use the same source of surveillance, the ASR-9, fusing these two data streams can be done with a simple process. This task is called MDBM-SCIP subfusion.

The process presently used for MDBM-SCIP subfusion is chosen for expediency. For each MDBM target report, if there is a SCIP subtrack with no flight ID information, and if the latest target report for that SCIP subtrack is close enough to the present MDBM target report, then the MDBM target report and that SCIP subtrack are matched.

5.5 Geographic Feature Filter

In the design of sensor fusion, it is desirable to have a general-purpose feature-based target filter. This filter is used in at least three places, one each for the two input data streams to sensor fusion, and one for the output of sensor fusion. The purpose of the filter is to limit the target reports which can be involved in sensor fusion or which can be passed on to the safety logic.

The incorporation of a feature filter is motivated by several concerns. One is that there may be regions of degraded surveillance, where false targets due to multipath or other causes may create problems for sensor fusion (causing false association or tag swaps) and for safety logic (causing false alarms). Another concern is that in regions of overlapping ARTS and ASDE coverage, if sensor fusion fails (due to faulty surveillance), a coherent picture of the traffic can be maintained, and an extra target report from the unfused data avoided, if the extra target report is filtered out. These concerns require that the filter be definable over specific geographic regions, and be sensitive in some way to track reliability and data source. A combination of prefusion ARTS and ASDE and postfusion filters built on this general capability has been devised which achieves the following goals:
  Elimination of false ASDE tracks,
  Part of the elimination of false SCIP tracks,
  Definition of allowed coverage areas for the two radars,
  Fallback performance in case of track fusion failure,
  Elimination of slowly-moving targets in approach areas (boat filter),
  Elimination of overflight traffic, and
  Elimination of coasted tracks in nonsensical areas.

The general requirements of the geographic feature filter are outlined below.

5.5.1 Geographic feature filter requirements

The feature filter is composed logically of three parts: a region definition (where targets have to be for the filter to do anything), a criterion definition (what nature the targets or tracks have for the filter to be applied), and a functional definition (what action the filter performs if it is applied). A filter may have zero or more regions, each with its own target criterion, and its own function. A list of the parameters associated with each feature filter is shown in Table 5.3 below.

TABLE 5.3

Parameter list for geographic feature filters

| Parameter | Values |
|---|---|
| Enabled/disabled switch | enabled or disabled |
| Region definition | latitude-longitude polygon inside-out switch |
| Allowed track surveillance source | any combination of ARTS only, ASDE only, fused track, or coasted |
| Minimum track length | hits, 0 = don't care |
| Maximum track length (useful mostly for blessing) | hits, infinity = don't care |
| Minimum target area | $m^2$, 0 = don't care |
| Minimum net travel distance | m, 0 = don't care |
| Minimum sum travel distance | m, 0 = don't care |
| Minimum altitude | ft, −5000 ft = don't care |
| Maximum altitude | ft, 50000 ft = don't care |
| Invalid altitude treatment switch | FALSE = don't apply, TRUE = apply to targets with invalid altitudes |
| Track blessedness | FALSE = don't care, TRUE = track must be blessed |
| Function selection | Suppress/bless/ASDE confidence following |

5.5.2 Region Definition

A filter is defined over zero or more geographic regions. Each geographic region is determined by zero or more polygons, and allows disjoint, inside-out, and topologically zeroth- and first-order regions. A region with zero polygons is considered to contain every point. Each target report is compared to each region, and if the target report is contained in that region, then the target criterion is tested to see if the region's function is to be exercised. The target may fall within more than one region, and if the target is not suppressed by the target function of the first region, then the next region is applied. If the target does not fall within any region, then there is no action of the feature filter on that target. If the filter has no geographic regions, then it is considered to apply everywhere. It is up to the filter designer to make sure that the order of region testing is unimportant.

5.5.3 Criterion definition

The criterion definition allows one or more compound boolean tests to be applied to any target which is within the region. A target must pass all of the component boolean tests to satisfy the target criterion definition for a region. Hence each component boolean test must have a "don't care" parameter available to disable that test. For convenience, a boolean switch can be used to turn off the region entirely; this is most efficiently tested before the geographic test mentioned above. The target/track features that the tests are able to examine are surveillance source, track length (in radar hits), target area, track travel distance, target altitude, and track blessedness.

5.5.4 Function definition

There are three sorts of functions which the feature filter may perform: target suppression, track blessing, and ASDE confidence following. Target suppression is just that, i.e., targets which fall in the geographic region and satisfy its target criterion are not passed on for further processing. In the case of the feature filters which happen before sensor fusion proper, this means that these target reports will not be available for sensor fusion or safety logic. In the case of the feature filter which happens after sensor fusion, this means that these target reports will not be passed on to the safety logic. Track blessing sets a flag in the track that it is blessed. This flag may be set, but may not become cleared once set. Blessing is performed independently for ARTS and ASDE subtracks by the feature filters before track fusion, and also for the fused track by the feature filter after track fusion. Fusing two subtracks causes the new track to be initialized as unblessed. Unfusing of a track causes the two daughter tracks to become unblessed. Subtrack blessedness is unchanged by fusion or unfusion. If a track or either of its subtracks is blessed, its target reports are passed on by sensor fusion to the safety logic. ASDE confidence following performs a combination of target suppression and track blessing to force sensor fusion to use track confidence information passed to it by the Merge task in the ASDE processing software. This capability is used mostly for debugging purposes.

5.5.5 Geographic feature filter use

A listing of the available parameters used by a feature filter is given in Table 5.3.

A key functionality of the geographic feature filter incorporated in sensor fusion is the reduction of false tracks due to multipath. The initial specification of the geographic feature filter included a technique to reduce false tracks by requiring tracks in certain regions to have more than a minimum number of radar hits to be marked for passing on to the ASTA safety logic. (This marking is called blessing the track.)

The travel distance criteria are used for lead-in filters. In such a filter, a tracked target is required to have traveled at least a minimum distance since track creation before it is blessed. This works because multipath is of two heuristic types: stationary, which would never travel far enough to satisfy this criterion, and moving, which disappears before it moves very far. This filter works very well indeed.

The travel distance for a track can be calculated in several ways. It can be calculated as the distance $r_{net}$ between the latest position and the initial position, but this errs on the short side for curved or cornered trajectories. The travel distance can be calculated as the simple sum $r_{sum}$ of the distances between successive target reports, but this errs on the long side because the centroids have some noise component. The estimate $r_{sum}$ would eventually exceed any threshold distance. These simple travel distances are inadequate by themselves.

The technique is to combine the use of the two simple calculations of the travel distance. The criterion actually used is the combination $(r_{net} > d_{net})$ && $(r_{sum} > d_{sum})$, where the parameter distances $d_{net}$ and $d_{sum}$ may differ from filter region to filter region. This technique makes all the errors of the individual calculations of the travel distance, but combines them so that the errors don't matter. In fact the travel distance filters used so far combine both travel distances and a track length requirement.

5.6 Fusion Process Requirements

The track fusion process should use tracks which correspond to the same aircraft, but not those which do not. The fusion should use ground position, velocity, and altitude information when available to perform the fusion. Fused tracks should be checked for correctness of fusion when appropriate. In cases where the fusion would be ambiguous, any tentative fusion should be reversible.

The target fusion process must be able to handle both surveillance gaps and surveillance overlaps. Gaps are produced when one sensor is physically incapable of sensing targets in a particular area (blind spots), or when the surveillance data is processed in such a way as to eliminate target reports in an area (masks). Surveillance overlaps occur when both sensors can detect a target in a particular area. At Logan, we must anticipate having both surveillance gaps and surveillance overlaps.

The target fusion process must also be able to handle the temporal non-coperiodic and asynchronous nature of the two surveillance sources. The ASR-9/ATCBI spins at one revolution every 4.6 seconds, while the modified Raytheon Pathfinder now spins at one revolution every 1.74 seconds. Each surveillance source also has an incompletely specified and variable internal data delay. The two clocks from the two surveillance sources are asynchronous. This lack of synchronism in the timestamps is not constant; the two clocks drift with respect to each other.

To balance the conflicting demands of timely and accurate fusion, the target fusion process should be able to perform tentative fusion and corrective unfusion. The safety logic requires immediate fusion to avoid the erroneous identification of two targets simultaneously on final approach, for example, when in fact the two targets are merely different views of the same aircraft from two surveillance sources (dual targets). This immediate fusion should be provided on the first radar hit. Such an immediate fusion can only be decided on position information, and thus is not as reliable as position-velocity fusion. Hence the initial fusion should be marked as tentative. The tentative fusion would prevent dual targets from coming to the safety logic, but would not require the display logic to put up the data tag for that target. A tentative fusion would normally be reinforced by subsequent corroborative surveillance, and would then be marked as a firm fusion. At present, tentatively and firmly fused tracks are treated identically in sensor fusion.

The hazard in fusion is that it might be performed incorrectly. Thus fusion should be reversible, and the impact of erroneous fusion should be minimized. Corrective unfusion would occur when fused tracks prove to be independent targets. The unfusion should not produce any counter-intuitive behavior on the controller displays, nor generate any inappropriate safety system lights or alarms (though in such a case, an alarm quite likely would be appropriate). An error message should be generated if a firmly-fused track becomes unfused.

The central target fusion process is composed of a simple track maintenance rules to reduce the number of tracks considered for fusion; a position- and velocity-dependent fusion criterion to identify fused target pairs; and a time-synchronization scheme to maintain an accurate estimate of the clock offset between the two surveillance sources. Each of these three components is discussed in its own section.

5.6.1 Fusion Track Maintenance

Several types of target tracks are maintained to account for the fusion process. Tracks that are not fused but are suitable for fusion are of two types: ARTS tracks (ATBC) and X-band tracks (XTBC). Tracks that have been fused recently are called tentatively fused tracks (TC). Tracks that have been fused a while are called firmly fused tracks (FC). Other tracks are either ARTS unfused tracks (AUC) and X-band unfused tracks (XUC). Tracks that are to be dropped are called NIL.

Figure 11:
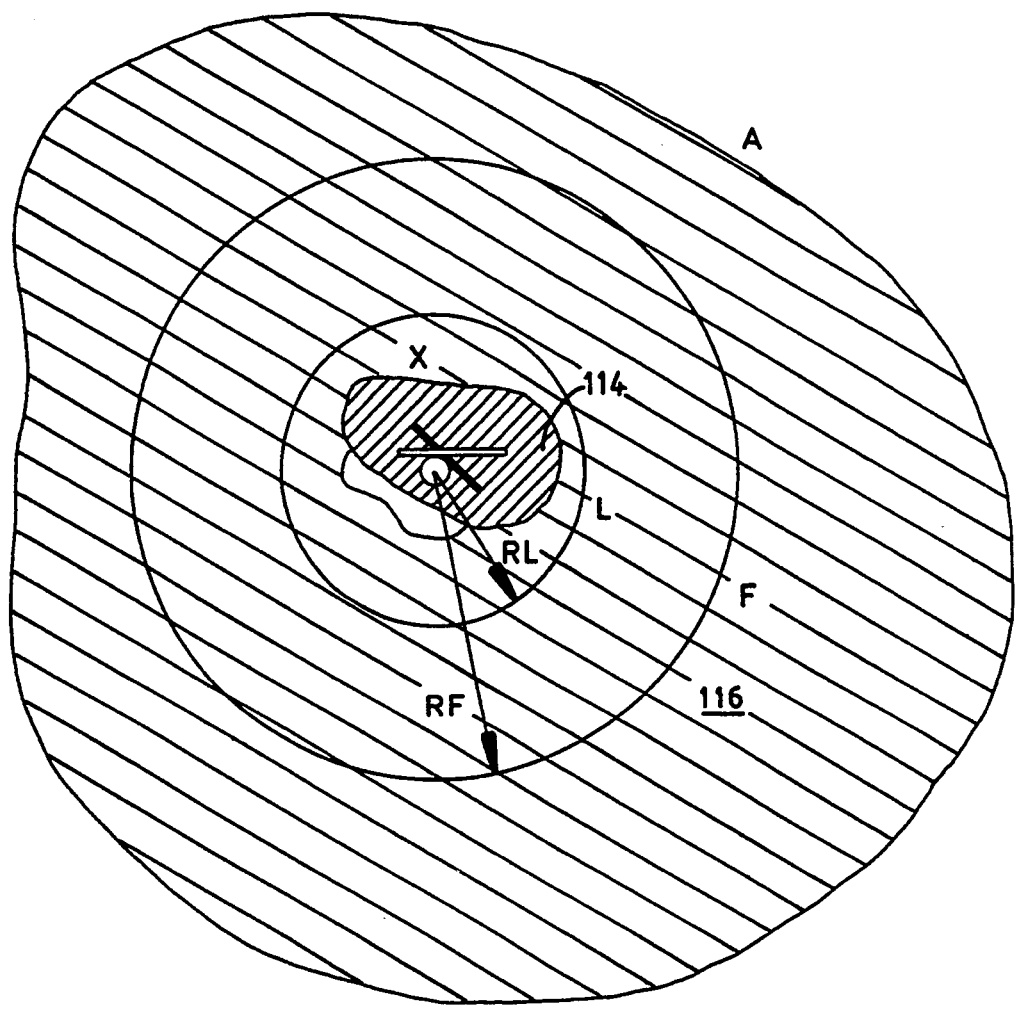
FIG. 11 is a diagram of areas where targets are allowed to be "fused" (such as by a sensor fusion system as shown in FIG. 5).

Several geometric concepts are introduced to specify the process. The surveillance maps specify the areas where targets are allowed to be fused. Referring to FIG. 11, ASDE surveillance data is available for targets in region X, whereas ARTS information is available for targets in region A. In FIG. 11, the ASDE coverage area 114 is hatched, and the ARTS coverage area 116 is dotted. For simplicity of process development, generate circles centered at the surveillance origin with the following properties: Circle L contains the whole ASDE surveillance area, plus a little pad for surveillance error. Circle F contains at least all the targets which could possibly enter Circle L within $N_{Acoast}$ ASR rotations, assuming larger-than-normal airborne aircraft velocities. The corresponding radii are denoted by and $R_L$ and $R_F$. (Typically $R_F - R_L$ is at least a statute mile.) Let $z_{max\pm}$ be the maximum altitude that an ARTS target may have for fusion to take place, with the $\pm$ denoting two parameters providing hysteresis. Let the range of the target from the surveillance origin be denoted by R, and the target's ARTS-reported altitude by Z.

Now the tracks maintenance is performed according to the rules in Table 5.4. The altitude-dependent tests are made only if valid altitude is available. The fusion criterion defined in the following section.

TABLE 5.4

Fusion track maintenance rules

| Transition | Condition |
|---|---|
| ARTS tracks | |
| AUC → ATBC | $\{[(R<R_F)\&\&(R<R_{previous})] \;\|\;$ $(R<R_L)\} \;\&\&\; (Z<Z_{max-})$ |
| AUC → NIL | track is dropped |
| ATBC → AUC | $(R>R_F) \;\|\; (Z>Z_{max+})$ |
| ATBC → NIL | track is dropped |
| ASDE tracks | |
| XUC → XTBC | always |
| XTBC → TC | track satisfies fusion criterion with one ARTS track |
| XTBC → NIL | track is dropped |
| unfused track pairs | |
| ATBC+XTBC → TC | (fusion) track pair uniquely satisfies fusion criterion |
| fused tracks | |
| TC → FC | track satisfies fusion criterion $>N_{Fc}$ times |
| TC or FC→ATBC+XTBC | (unfusion) track pair satisfies unfusion criterion |
| TC or FC → ATBC | ASDE subtrack is dropped |
| TC or FC → XTBC | ARTS subtrack is dropped |

5.6.2 Fusion Criterion

Fusion is established by comparing any updated track in the ATBC list with all tracks in the XTBC list, and also vice versa (any updated track in the XTBC list with all tracks in the ATBC list). Fusion is checked for all updated track pairs in the TC and FC lists. Fusion is performed on time-synchronized position information. (Time synchronization is discussed in the following section.) Let $(r_A, v_A)$ be the two-dimensional position and velocity of an ARTS target, and $(r_X, v_X)$ be those of an ASDE target, the older one projected to the more recent one's time. Then let $$\Delta r^2 = ||r_A - r_X||^2 + \tau_c^2 ||v_A - v_X||^2 \qquad (5.11)$$

be the square of the distance between the two targets, where $\tau_c^2$ is a constant. If either surveillance source does not provide velocity, then the velocity difference defaults to a constant value $\Delta v_{default}$. The fusion criterion is then that $\Delta r^2 < r^2_{fuse}$, where $r^2_{fuse}$ depends on whether either subtrack is undergoing high acceleration or deceleration. In certain cases, an ASDE-only track may have previously been fused with an ARTS track, and the ARTS track may drop, causing the track to enter the XTBC list. In this case, this track would, barring any possible ASDE track swap, retain the ARTS data tags matched to it by the previous fusion.

Unfusion is possible for fused tracks where surveillance requires it. Unfusion occurs when $\Delta r^2 > \mu r^2_{fuse}$, where the hysteresis multiplier $\mu > 1$. Unfusion further requires that surveillance from both sources be sufficiently recent.

The word "uniquely" in the rule for the transition ATBC+XTBC→TC has the following explanation. The latest track report (whether it be ASDE or ARTS) must fuse with one and only one track from the other surveillance source. (One should note that fusion is not precisely commutative. That is an unfortunate necessity, due to the extrapolation of the position of only one target in the fused pair.) If the uniqueness criterion is not satisfied, then no fusion is performed.

One problem with the direct implementation of the above process is that each new target report for a track on either TBC list requires a fusion check with all targets on the other TBC list. A certain amount of optimization is obtained by allowing fusion only between old ATBC tracks (those with more than target reports) and new XTBC tracks (those with less than target reports), and vice versa. This would effectively allow fusion only between ARTS arrivals and new ASDE tracks, and between ARTS departures and old ASDE tracks. This optimization should allow exceptions in certain cases discussed in the section for fusion history lists.

5.6.3 Fusion history lists

Normally ARTS and ASDE subtracks may only seek fusion (be on a fuse candidate list) if they are young, presently defined as having less than $N_{Aold}$ or $N_{Xold}$ hits, respectively. Old subtracks may not fuse with old subtracks. This produces the correct fusion behavior for both arrivals and departures, and for discontinuous subtracks. It disallows the fusion of subtracks which should have fused previously.

This procedure ignores the possibility that an unfusion event occurs (due to surveillance error), but the subtracks stay continuous. As an X-band surveillance error sufficient to cause unfusion would likely also cause a subtrack drop as well, the more likely cause for this situation would be a surveillance error in the SCIP subtrack. The result is that the two subtracks are possibly both old, and would then not allowed to fuse together again. The side effect is that the persistent unfused SCIP subtracks can fuse incorrectly with false tracks. As we do not want to eliminate the prohibition of old-on-old fusion, a solution in the form of fusion history lists is implemented.

A fusion history list is maintained individually for each subtrack, both X-band and SCIP, and contains a list of other subtracks that this subtrack has ever been fused with. When a subtrack is initialized, its fusion history list is initialized to be empty. When a fusion event occurs, a pointer to each subtrack's fusion counterpart is appended to the fusion history list. Thus there is a pointer from each fused subtrack to the other. Unfusion has no effect on the fusion history lists (that would be historical revisionism). When a subtrack is deleted, references to it are deleted from all other fusion history lists (no necrological list entries are allowed). This can be done efficiently because the fusion history list in the subtrack being dropped points to all the other subtracks that refer to it in their fusion history lists.

In addition to the normal procedure of young subtracks checking for fusion, old subtracks with non-empty fusion history lists are also checked for fusion when they update, but only for fusion with unfused subtracks in their fusion history lists. This is the only effect of the fusion history lists on fusion itself.

The fusion history lists associated with each subtrack allow unfusion to be easily reversed if later warranted, even in the case that both subtracks are old.

5.6.4 Fusion track number assignment

To mesh the treatment of fusion track numbers with the requirements of safety logic, sensor fusion must assign fusion track numbers carefully. Fusion track numbers are assigned by fusion to be unique identifiers of tracks which may or may not be fused, and which may or may not be sent on to safety logic.

To provide safety logic with the most continuous picture of track behavior, it is important that track numbers appear as consistent as possible on fusion and unfusion. To this end, sensor fusion uses the ASDE subtrack blessed flag to determine which fusion number to retain on fusion and which subtrack to give the old fusion track number on unfusion.

Figure 12:
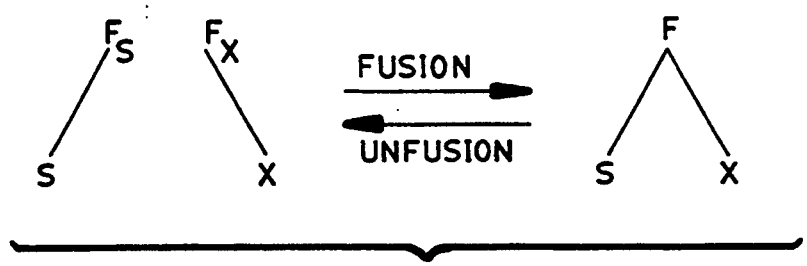
FIG. 12 is a depiction of a fusion process and an un-fusion process, which processes can be performed by a sensor fusion system as shown in FIG. 5.

Let S be the ARTS (SCIP) subtrack number, X be the ASDE (X-band) subtrack number, $F_s$ be the pre-fusion or post-unfusion ARTS-only fusion track number, $F_x$ be the that of the ASDE-only fusion track, and F be the post-fusion or pre-unfusion fused track number. The fusion and unfusion processes are depicted in FIG. 12.

On fusion, if the ASDE subtrack is blessed, then $F=F_x$, otherwise $F=F_s$. On unfusion, if the ASDE subtrack is blessed, then $F_s=F$ and $F_x$ is a new fusion track number, otherwise $F_x=F$ and $F_s$ is a new fusion track number.

5.6.5 Fusion Drop and Suppress Messages

Two sorts of end-of-track messages sent to safety logic, drop messages and suppression messages. Drop messages are to be sent only for those tracks which have been sent to safety logic and are now being purged from the sensor fusion track store. Suppression messages are to be sent for those tracks which are no longer to be sent to safety logic and which are not to have any effect on safety logic, but remain in the sensor fusion track store and may be sent to safety logic again in the future.

The reason two such message types are used is that safety logic purges its track store when it receives the drop message, and any state history for that track would have been deleted. This affords suboptimal performance, as track history is used for several of the safety logic processes.

Track fusion always results in a drop message. Unfusion may result in a suppression message, if neither unfused track is to be transmitted to safety logic.

5.6.6 Time Synchronization

Sensor fusion should synchronize the clocks of the two surveillance sources, and use extrapolation to bring the asynchronous target reports into effective synchrony. Sensor fusion uses simple velocity extrapolation to do the latter task. Thus to extrapolate an X-band track to check for fusion with an ARTS target report, one would calculate $$r_X(t_A) = r_X(t_X) + v_{xX}(t_A - t_X - t_{AX}) \tag{5.12}$$

where $t_A$ is the surveillance time from the ARTS target report, $t_X$ is that of the latest X-band target report, and $t_{AX}$ is the time offset between the two sources. No extrapolation for velocity would be required (constant velocity assumption). This is sufficient for the regions where fusion is important, i.e. for targets on short final and targets right after departure. A similar expression for Equation 5.12 can be written for extrapolating ARTS tracks, with $t_{XA} = -t_{AX}$.

To synchronize the clocks of the two surveillance sources, $t_{AX}$ is initialized to the smallest difference between the arrival times of the first hundred ASDE reports and the system time of the computer running sensor fusion, plus a constant fudge factor for average ASDE processing delays. ADIDS-SCIP derives its clock indirectly from the same system time and thus has no effect on the initialization of $t_{AX}$. The initialization can be done to within an accuracy of less than a second. After initialization, the value of $t_{AX}$ is adjusted when proper fusions are being made, to allow for drift. This adjustment is performed by a simple exponential filter $$t_{AX}(\text{new}) = (1-a)t_{AX}(\text{old}) + at_{AXopt} \tag{5.13}$$

where $t_{AXopt}$ is the optimal offset determined by the minimization of the fusion error with respect to $t_{AX}$.

$$t_{AXopt} = t_A - t_X - v_X \cdot (r_A - r_X) / ||v_X||^2 \tag{5.14}$$

A similar equation can be written for synchronization update based on the velocity estimated from ARTS data. The most recently estimated velocity is used. The steady state gain "a" in the exponential filter is a small number, typically 0.01. In view of the appearance of the velocity magnitude squared in the denominator of Equation 5.14, the adjustment to $t_{AX}$ are not performed when the velocity drops below a certain velocity used in the target state transition determination.

5.7 Track coasting

Sensor fusion allows two different types of coasting. The first type produces coasted tracks, which are allowed to be treated differently for the purposes of track fusion. The second type produces extrapolated target updates, with the tracks fusion characteristics otherwise unmodified. At present, the capability to produce coasted tracks is not used in the Logan demo, and will not be discussed here.

Track extrapolation allows target reports to be generated for tracks which have not been reported to fusion for a while. Three time parameters define the characteristics of extrapolation: the time before the first extrapolation is made, the time between extrapolations, and the time after which no more extrapolations are made. After this last time, a track is put into the coast state, which presently causes it to be dropped immediately.

Track extrapolation thus allows tracks to be coasted through surveillance gaps or regions of degraded surveillance. By setting the time to first extrapolation less than a normal radar scan time, scan interpolation can be performed. This allows the simulation of a radar with faster scan rates.

5.8 Artificial target handling

Sensor fusion allows the injection of artificial targets or sprites. These are useful for demonstrating and testing the RSLS safety logic and displays. Artificial tracks are treated exactly as normal tracks, with the exception that fusion is allowed only between real tracks and real tracks, or between artificial tracks and artificial tracks, and never between real tracks and artificial tracks.

5.9 Potential Sensor Fusion Improvements

Sensor fusion presently only allows tracks from two radar sources to be fused. The fusion system can be made to accommodate multiple surveillance sources. There is an immediate need to incorporate ASR-9 primary radar reports into sensor fusion as well as the beacon reports. The incorporation of information from further advanced surface surveillance systems, such as the ADS-Mode S, requires a multisensor fusion capability.

Sensor fusion presently does not attempt to combine position reports from different surveillance sources to produce more accurate positions. In the present case, with the vast disparity in centroid accuracy between the ASDE-X and the ASR-9/BI surveillance, little accuracy is to be gained. Future systems may incorporate radars with more nearly equal accuracies, whereupon such a capability would be advantageous.

The timestamps provided by ADIDS-SCIP reflect the time of receipt of the surveillance, and not the time of the surveillance itself. For the most part, the difference between the two can be ignored, but an occasional beacon report is delayed anomalously before it gets to ADIDS-SCIP, resulting in an incorrect timestamp. Sensor fusion should be able to correct such anomalous timestamps. This can be done by synchronizing the normally correct timestamps to a calculated radar rotation model. Timestamps that don't fit the model would be corrected by using the model prediction instead of the reported time of receipt.

The MDBM-SCIP subfusion process can be upgraded to handle ambiguous subfusion. This would prevent the occasional incorrectly tagged target that presently occurs.

When a track first becomes blessed, sensor fusion presently sends the latest target report for that track to safety logic. Another approach would be to send a history of the pre-blessed behavior of that track, so that any track state information can be properly initialized by safety logic.

Longer-term improvements to the entire RSLS system may involve architectural changes. One such possibility is the integration of sensor fusion with ASDE scan-to-scan association. This would allow better ASDE track initiation for arrival aircraft, where the expected position, velocity, and other aircraft features can be derived from ARTS data. It may also help disambiguate tracks that may have been confused due to merged targets.

Another longer-term improvement would be to use the arriving runway assignment produced by the surface monitor to aid in coasting arriving aircraft through large surveillance gaps. This would increase the reliability of fusion for arrivals, and allow the more frequent retention of tag data for arriving aircraft.

6.1 Overview of the Safety-Logic Architecture

Figure 13:
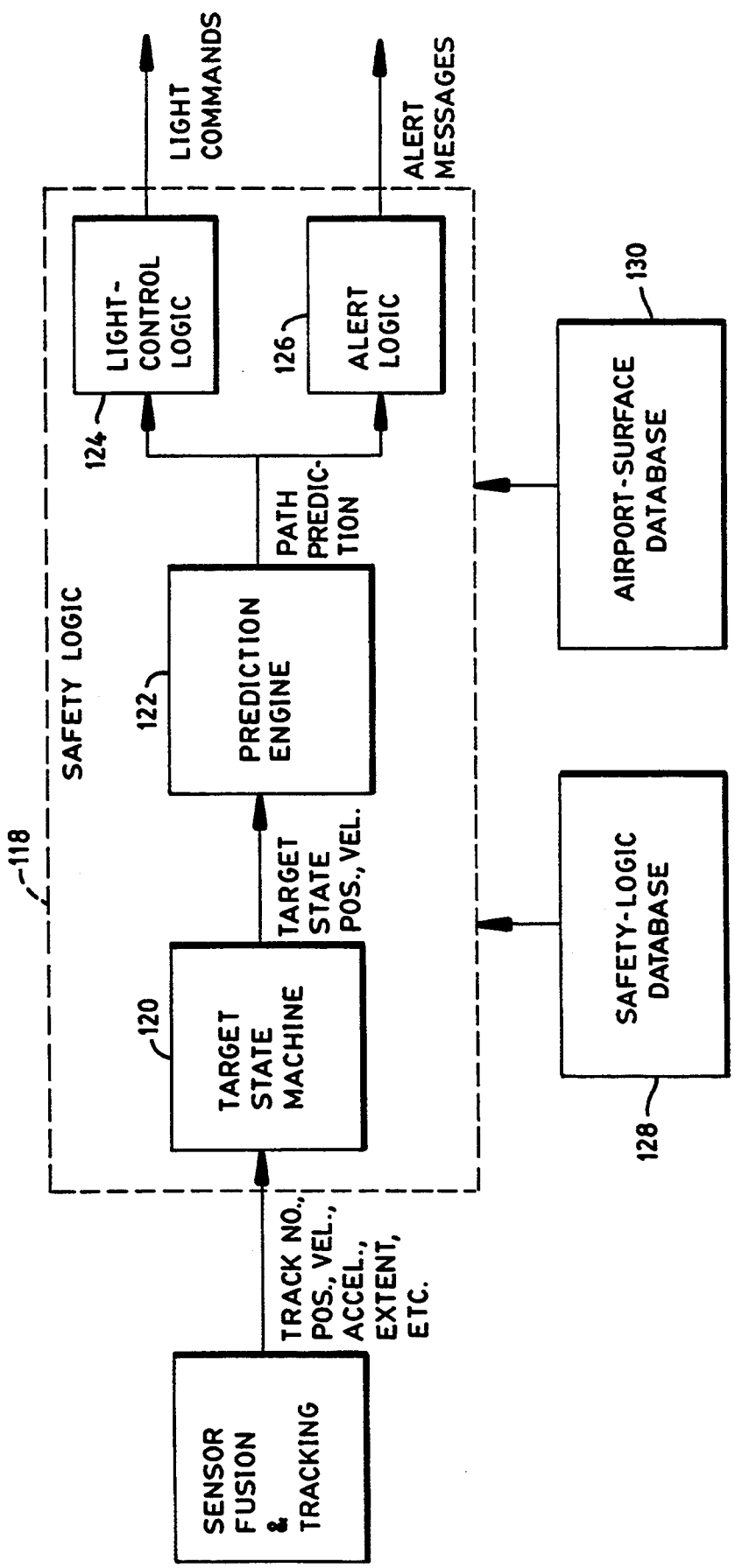
FIG. 13 is a block diagram of a safety logic system, such a system is shown as a single box in FIG. 5.

The safety-logic algorithms determine when the runway-status lights should be on (red) or off. They also determine when alerts should be issued to the controllers. FIG. 13 illustrates the safety-logic architecture 118. The sensor-fusion-and-tracking algorithms, described in an earlier chapter, provide track reports to the safety logic 118. The track reports contain the following information for each tracked target: 1) track number (both ASDE track number and sensor-fusion track number), 2) position, 3) velocity, 4) acceleration, 5) extent (a measure of the size of the target), and 6) other data, such as altitude (when it is available from ARTS data).

The safety-logic algorithms can be divided into four modules 120, 122, 124, 126, as shown in FIG. 13: 1) target state machine 120, 2) prediction engine 122, 3) light-control logic 124, and 4) alert logic 126. The target state machine 120 determines the target's "state," for example, whether it is departing, landing, or taxi-ing. The prediction engine 112 estimates where the target could be in the future by predicting its path. The details of the prediction engine are in Section 7.7. The light-control logic 124 determines which runway-status lights should be red and which should be off, and indicates this to the radar displays and airport model board by issuing light commands. The alert logic 126 sends alert messages to the radar displays and the audible alerting system when it has determined that two targets are in conflict and that conflict warrants an alert. The rest of this chapter will give a high-level description of these modules.

Other inputs to the safety logic 118 are parameters from two databases 128, 130, as shown in FIG. 13. The safety-logic database 128 contains the parameters used directly in the safety-logic modules. Although the safety logic is airport-independent, it still requires the airport-surface database 130, which provides specific information about the airport such as the location of runways and taxiways.

6.2 Target State Machine

6.2.1 Target States

Every target is classified as being in one and only one target state. Table 6-1 is a list of the target states and the acronyms that appear in the safety logic. The "landing abort" state refers to a go-around, a missed approach, a touch-and-go, or not landing safely (e.g., going off the end of the runway).

TABLE 6-1

Target States

| TARGET-STATE ACRONYM | TARGET STATE |
|---|---|
| STP | stopped |
| TAX | taxi |
| ARR | arrival |
| LDG | landing |
| DEP | departure |
| DBT | departure abort |
| LBT | landing abort |
| UNK | unknown intent |

6.2.2 Target-State Transitions

Figure 14:
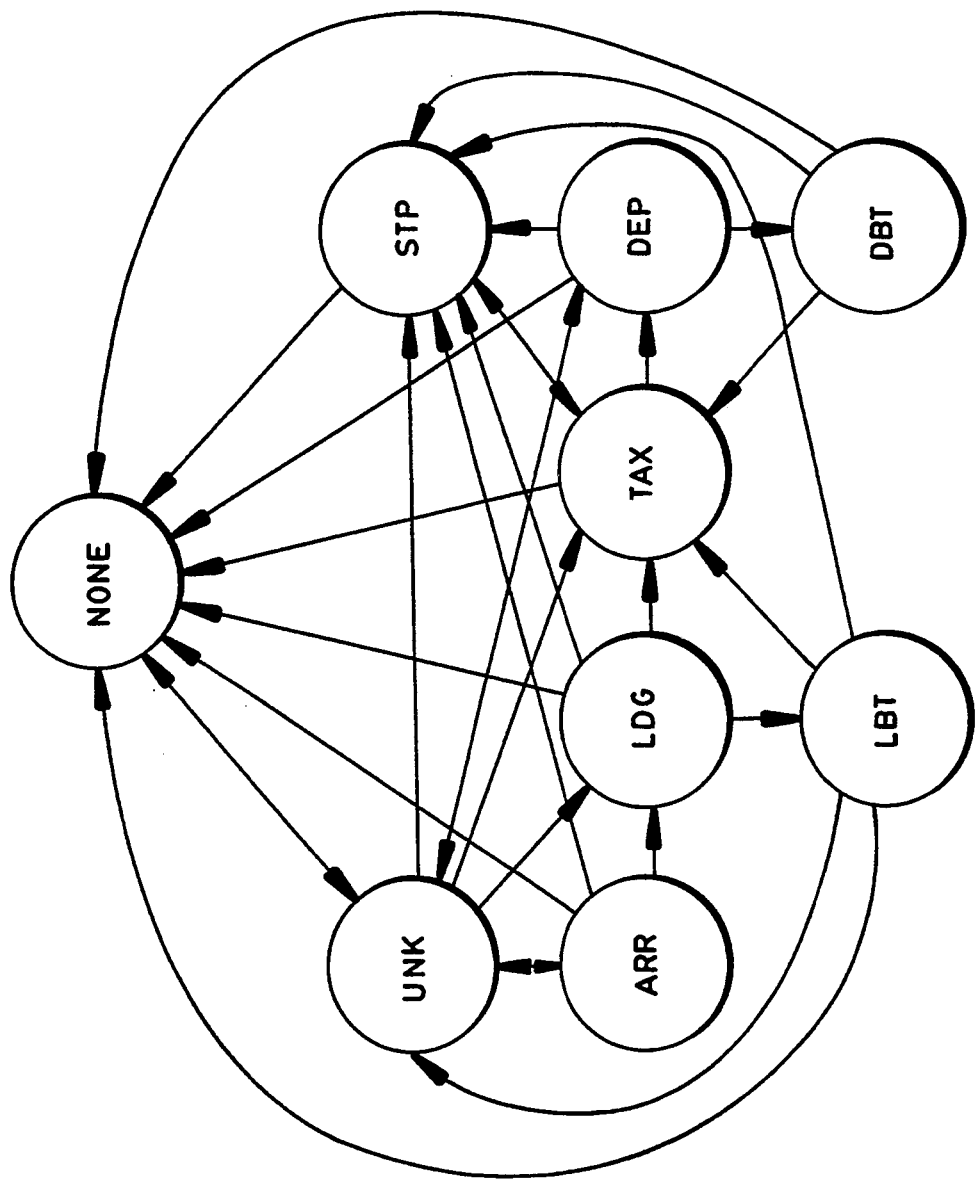
FIG. 14 is a state machine diagram of the safety logic system of FIG. 13.

A target state machine specifies the transitions from one target state to another, as opposed to specifying the conditions for being in a target state. FIG. 14 illustrates the possible transitions between states. The state "NONE" is a pseudostate that represents "no track," i.e., it is used as a source and sink of tracks. Although some of the states are not appropriate for ground vehicles (e.g., DEP, ARR, and LDG), the RSLS surveillance is not adequate to determine whether a target is an aircraft. Thus, a ground vehicle might be put into an inappropriate state, such as in a transition from TAX to DEP.

There are two advantages to the state-machine approach. First, it avoids the possibility that a target might "fall between the cracks," that is, end up in a situation for which no target state has been defined. With a state machine, a target will always have a defined target state. Second, the target state machine incorporates hysteresis, a technique for avoiding the problem of jumping back and forth between states due to surveillance errors. A target-state transition that is an example of hysteresis is as follows. Suppose that the parameters v_tax− and v_stp+ are velocities (i.e., speeds or magnitudes of velocities) and that v_tax− < v_stp+. The transition from STP to TAX occurs when the velocity of a target in the stopped state exceeds v_stp+. However, the transition from TAX to STP occurs when the velocity drops below v_tax−. By having two different velocity parameters separated by an amount greater than the expected surveillance error, small surveillance errors would not cause numerous back-and-forth state transitions.

6.3 Prediction Engine 6.3.1 Overview of the Prediction Engine

To control the runway-status lights and generate alerts, the RSLS safety logic requires knowledge of the predicted positions of all tracked targets. The set of processes that determines where a target could be in the future is called the "prediction engine." Since the prediction engine 122 (FIG. 13) takes into account that targets can make turns at intersections of runways and taxiways, a target can have more than one predicted path. Rather than come up with a single set of predicted paths, the prediction engine computes two sets of predicted paths. One set assumes the target will travel as far as reasonable within a given look-ahead time. The other set assumes the target is attempting to stop (but not a panic stop) within a given look-ahead time. Thus, the two sets of predicted paths, or "trees," compute reasonable bounds on future target position. In other words, the RSLS path-prediction algorithm does not answer the question "where will the target be in a given t seconds?" but rather the question "where could the target be in a given t seconds?"

To determine these path-prediction trees, the prediction engine requires prediction models of target motion. There are two models for each target state. The first one, called the "acceleration model," is used to determine the first set of predicted paths (i.e., the furthest the target could be). The second one, called the "deceleration model," is used to determine the second set of predicted paths (i.e., the nearest the target could be). It should be noted that these models by themselves do not determine future position, because they do not take into account the airport geometry (i.e., which paths can be taken) and models of how targets would turn from one path onto another path at any intersection.

6.3.2 Prediction Models of Target Motion

Table 6-2 describes the prediction models as a function of target state. All predictions start with the estimates of current target position and velocity from the sensor-fusion and tracking algorithms. In general, the standard equations of motion for a given look-ahead time are used to predict future position; for example, the look-ahead time is 60 seconds for targets in the high-speed states DEP, ARR, and LDG. These predictions use either a nominal acceleration rate (accel_nom) or nominal deceleration rate (decel_nom), which are functions of target state. These rates could be functions of target type once target type is reliably known to the safety logic. The question might be asked, "Why not use the estimates of actual acceleration instead of assumed nominal acceleration and deceleration?" The answer is that estimates of actual acceleration are relatively noisier, and thus less accurate, than those of velocity. Also, actual accelerations are not constant; since they vary unpredictably with time, estimates of current acceleration are not useful for predicting future behavior on the 30-to-60-second time scale.

TABLE 6-2

Prediction Models for Each Target State

| Target State | Acceleration Model | Deceleration Model |
|---|---|---|
| stopped (STP) | NA | NA |
| taxi (TAX) | accelerate at accel_nom(tax) up to a specified maximum taxi velocity v_max_tax, and then continue at that velocity | decelerate at decel_nom(tax) |
| departure (DEP) | accelerate at accel_nom(dep) to a maximum departure velocity v_max_dep | decelerate at decel_nom(dep); i.e., becomes a departure abort (see below) |
| landing (LDG) | continue at current velocity (i.e., accel_nom (ldg) = 0) | a) if before threshold, then same as acceleration model<br>b) if after threshold, then decelerate at decel nom(ldg) |
| arrival (ARR) | continue at current velocity (i.e., accel_nom (arr) = 0) | a) if before threshold, then same as acceleration model<br>b) if after threshold, then decelerate at decel_nom(ldg); i.e., becomes a landing |
| departure abort (DBT) | continue at current velocity (i.e., accel_nom (dbt) = 0) | decelerate at decel_nom(dbt) |
| landing abort (LBT) | continue at current velocity (i.e., accel_nom (lbt) = 0) | NA |
| unknown (UNK) | continue at current velocity (i.e., accel_nom (unk) = 0) | decelerate at decel_nom(unk) |

6.3.3 Path-Prediction Algorithms

To predict target paths, the prediction engine first divides the airport surface into a network of "propagation cells" that completely cover the movement area and do not overlap. For example, a set of cells are drawn end-to-end along the entire length of a runway. The same is done for taxiways. Thus, the cell structure depends on the airport geometry. The important point to understand about path prediction is that it is done locally within each cell, then all the cells are stitched together to generate the entire path.

The procedure to generate the paths is as follows. First, the prediction engine determines in what cell a new target is located and what the possible exit points are. Second, using the prediction models of target motion described above, standard Newtonian equations of motion, and a turning model that assumes a maximum transverse acceleration (described in more detail in Section 7.7), the prediction engine determines which exit points the target can reach (if any) in the look-ahead time. Third, for each exit point the target can reach within the look-ahead time, the prediction engine draws a path to that point and hands off the target to the next propagation cell, thus creating a local "tree" with side branches. After each path has been drawn as far as it can go within the look-ahead time, the final result is a set of two global trees, one for the acceleration model of target motion and one for the deceleration model. These trees are the unions of the individual propagation-cell trees.

6.3.4 Approach Logic and Approach Bars

One of the tasks of the prediction engine is to implement the approach logic, which determines whether an airborne target is on approach to a runway and, if so, which runway. As part of this logic, the prediction engine projects an arriving target and determines whether it could land on a particular runway. To make this determination, the prediction engine uses a turning model that allows for S-curves as well as straight-in approaches and single-curved approaches.

Figure 15:
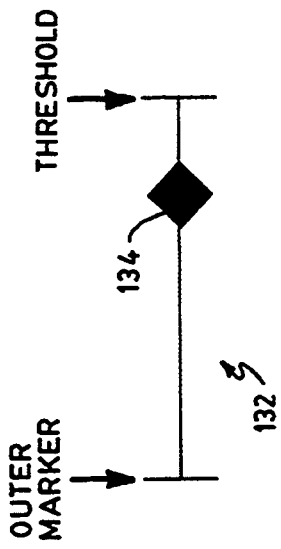
FIG. 15 shows an approach bar similar to that shown on the Airport Surface Detection Equipment display of FIG. 4.

Another task of the prediction engine is to calculate distances for approach bars. As mentioned in Chapter 1, approach bars are ASDE-display enhancements that indicate to the controller the position of the aircraft on final approach to the airport. As illustrated in FIG. 15, an approach bar 132 has a length which represents the distance between the outer marker and the runway threshold. A small diamond moving 134 along the bar represents the actual aircraft and indicates its position relative to the outer marker and threshold as determined by the prediction engine. The RSLS gives the controller the following four display options for the approach bars: 1) show no approach bars, 2) show approach bars only when a target on approach is involved in an alert, 3) show approach bars only when there is a target on approach, and 4) always show approach bars, even when there is no target on approach.

If it is possible for an aircraft on approach to land on more than one runway (i.e., the prediction engine projects it onto more than one runway), the aircraft is called an ambiguous target. However, ambiguous targets still appear on only one approach bar and are associated with only one runway for turning on runway-status lights and issuing alerts. The logic rule for selecting the approach bar is to indicate the target on the approach bar of the runway with the lowest required transverse acceleration, i.e., the runway corresponding to the straightest of the approaches. The logic rule for choosing the runway for turning on lights and issuing alerts is to assign the target to the runway in use for landings in the current configuration. For example, at Logan Airport aircraft arriving to runway 33R often follow the ILS approach to runway 27 and then veer off to 33R. The safety logic at first places the aircraft on the 27 approach bar and then the 33R approach bar. If runway 27 is being used only for departures in the current configuration, then the safety logic assumes the aircraft will land on 33R and not land on 27. If both runways 27 and 33R are being used for landings, then a parameter can be set to indicate to the logic which runway should be assumed to be the landing runway. However, if the wrong runway is selected, the lights and alerts will not be operating correctly. Another way to handle this problem is to use the part of the ARTS data that specifies the aircraft's landing runway.

6.4 Logic for Runway-Entrance Lights

6.4.1 Overview of the REL Logic

Figure 16:
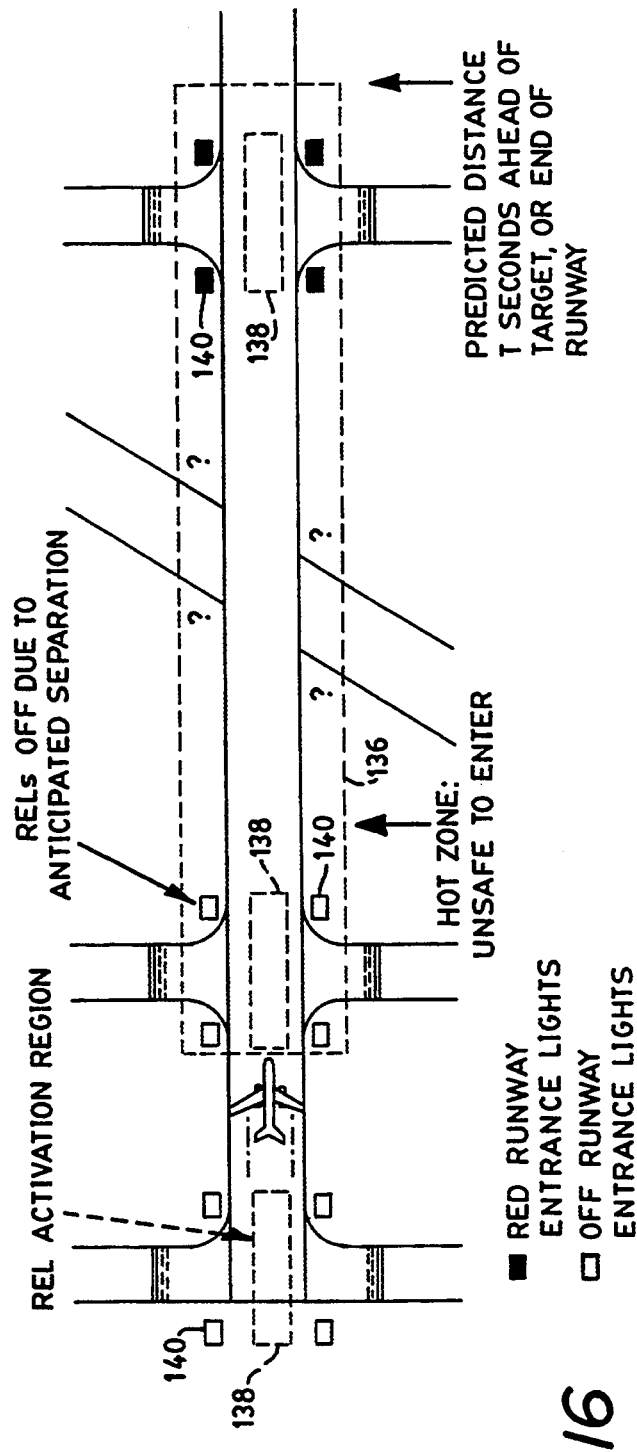
FIG. 16 is a diagram of an airport surface illustrating operational concepts of runway-entrance lights according to the invention.

As discussed in Chapter 1, red runway-entrance lights (RELs) at a runway/taxiway or runway/runway intersection indicate that it is unsafe to enter the runway at that intersection. It is unsafe because there is a high-speed target (e.g., DEP or LDG) moving along the runway toward that intersection; controllers call the runway "hot" under these circumstances. As illustrated in FIG. 16, the logic for the runway-entrance lights is based on three concepts. The first concept is a target hot zone 136. The hot zone is an area ahead of a high-speed target, measured from the front of the target's extent (i.e., from the nose), that should be free of other targets. Thus, entry into the hot zone by other aircraft, ground vehicles, or personnel would be unsafe. The second concept is a REL activation region 138, which is associated with each set of independently operated RELs. The basic idea behind the logic rule for RELs is as follows: the lights are red if a hot zone overlaps their associated REL activation region, and off otherwise. In particular, the lights behind the target are always off. An exception to this rule is when RELs inside a hot zone are off due to the application of a third concept, called anticipated separation, which will be described in Section 6.4.3.

In FIG. 16, the RELs are represented by rectangles 140 at runway/taxiway intersections (although this is not the way they are represented on the RSLS displays). At the runway/runway intersection, the question marks indicate that the logic for runway/runway intersections is still under development (Section 6.4.4 will discuss runway/runway intersections).

6.4.2 Target Hot Zones

There are two types of hot zones each with a different type of length: 1) t-second zones, whose length is the distance corresponding to t seconds ahead of the target (e.g., t=30 seconds), where t is a function of target state and a particular set of RELs, and 2) whole-runway zones, whose length is the whole runway ahead of the target. The length of a t-second zone is calculated by the prediction engine using the target's acceleration model of target motion.

The length of the hot zone depends on the target's state. Table 6-3 shows the hot zones being used for the target states in the current version of the safety logic. Arrivals (ARR) have a t-second zone, where t is called $t\_arr\_rel$. Departures (DEP) "own" the whole runway, and thus have whole-runway zones, unless they are airborne (i.e., altitude is above the parameter altitude $alt\_dep\_rel$), in which case their hot-zone lengths are zero. Targets that are DBT or LBT also own the whole runway, because they are in unusual and potentially dangerous states. Targets that are TAX, STP, or low-speed UNK, where "low-speed" means velocity less than $v\_tax+$, have zero hot-zone lengths at this time, because their velocities are so low that it is often safe for other targets to cross the runway ahead of them. However, UNK targets with velocity greater than $v\_tax+$ have t-second zones.

Landing targets (LDG) are divided into three cases. If they are on approach and have not yet crossed the threshold, they have t-second zones. Once they cross the threshold, they "own" the whole runway, and thus have a whole-runway zone until they are "under control," that is, until their velocity has dropped below some parameter velocity called v_ldg_rollout. When they are under control they are considered to be in a landing rollout and then have a t-second zone again.

TABLE 6-3

| Target State | Hot-Zone Lengths Hot-Zone Length Ahead of Target |
| --- | --- |
| ARR | t arr rel seconds |
| LDG | 1) before the runway threshold: t_ldg_rel seconds 2) across the runway threshold but before landing rollout: whole runway 3) during landing rollout: t ldg rel seconds |
| DEP | whole runway (if not airborne) |
| DBT | whole runway |
| LBT | whole runway |
| TAX | zero |
| STP | zero |
| UNK | 1) high-speed: t_unk_rel seconds 2) low-speed: zero |

6.4.3 Lights at Runway/Taxiway Intersections

This section will describe the logic for RELs at runway/taxiway intersections along active and inactive runways. A runway is active if it is being used primarily for takeoffs and/or landings in the current airport configuration. A runway is inactive if it is not active but may be used temporarily for takeoffs and landings at any time.

As mentioned in Section 6.4.1, the safety logic uses the concept of a REL activation region, an area on the runway at an intersection. Each activation region is associated with a set of RELs (i.e., a set consists of a pair of lights on either side of a taxiway or runway at the entrance to a runway). No set of RELs can respond to more than one REL activation region, but a single REL activation region may control more than one set of RELs. The light-control logic turns on a set of RELs (i.e., sends the command to turn them red) if a target's hot zone overlaps the REL activation region associated with the RELs, except when anticipated separation applies, as will be described below.

There are two ways to determine whether a hot zone overlaps a REL activation region, depending on the type of hot zone. If the target has a whole-runway zone, then the hot zone overlaps all REL activation regions ahead of it. If the target has a t-second zone, the safety logic first considers the REL activation regions that the target could reach within its look-ahead time. It then compares t to the time it would take the target to reach those REL activation regions. Expressed mathematically, the hot zone overlaps a REL activation region if the following is true:

$$t\_min\_enter < t\_state\_rel, \quad (6\text{-}1)$$

where t_min_enter is the minimum time for the target to enter the REL activation region, as calculated by the prediction engine using the target's acceleration model, and t_state_rel is the parameter from Table 6-3 with "state" representing the target state (state=arr, ldg, or unk).

There are several ways to turn RELs off. One of the ways uses the concept of anticipated separation. This term refers to the fact that controllers can issue clearances and instructions to aircraft in anticipation that legal separation between aircraft will exist when required, even though legal separation does not currently exist. For example, it is not legal for an aircraft to cross a runway in front of a departure. However, a controller can issue "taxi across" instructions to an aircraft waiting to cross a runway at a taxiway hold line, even though a departure on that runway has not yet passed the taxiway intersection, in anticipation that, by the time the waiting aircraft starts across, the departure will be past the intersection. The delay in crossing is due to the time it would take the waiting aircraft to spool up its engines before it started across.

To avoid interference with the controllers and to allow for surveillance delays, the light-control logic uses anticipated separation to turn off the RELs before a target's hot zone has passed through the REL activation region at approximately the time when a controller would issue the "taxi across" instruction. Thus, the logic sends the command to turn off a set of RELs if the target that turned the RELs red is a time t_antic_sep_rel seconds from exiting the REL activation region. This condition can be expressed mathematically as the following:

$$t\_max\_exit < t\_antic\_sep\_rel, \quad (6\text{-}2)$$

where t_max_exit is the maximum time for the target to exit the REL activation region, as calculated by the prediction engine using the target's deceleration model, and t_antic_sep_rel reflects the anticipate-separation time (e.g., 4 seconds, representing the spool-up time of a waiting aircraft). In FIG. 16, the first set of RELs inside the hot zone is off due to anticipated separation.

Other ways to turn RELs off, besides anticipated separation, are as follows: 1) the target track is dropped, 2) the target is a DEP and has altitude greater than a parameter altitude alt_dep_rel (if there is a valid altitude), 3) in the case of t-second zones, the hysteresis threshold is exceeded (i.e., t_min_enter ≧ t_state_rel+delta_t_state_rel), and 4) in the case of whole-runway zones, the target changed to a state where the hot zone is no longer a whole-runway zone. If the RELs were turned off due to the second condition, then they can be turned on again only if the target has transitioned out of the DEP state.

6.4.4 Lights at Runway/Runway Intersections

As mentioned in Section 6.4.1, the safety logic for RELs at runway/runway intersections is handled differently than at runway/taxiway intersections. At first, one might ask, "Why not use the same logic rules as for runway/taxiway intersections?" However, there is a difference. At runway/runway intersections, a target observing red RELs is likely to be traveling at high speed, such as a departure, arrival, or landing on an intersecting runway. This is particularly true for active runways but would also be true for inactive runways that are temporarily being used for takeoffs and/or landings. The concern is that a pilot traveling at high speed might take an unsafe action upon seeing red lights.

Consequently, the decision was made in the RSLS to deactivate the RELs at runway/runway intersections except for those cases when a runway is consistently being used only as a taxiway in the current configuration. For example, at Logan Airport in Boston landing aircraft on runway 4R generally exit onto runway 33R. Since all aircraft on 33R must cross runway 4L to go to the terminal, and 4L is usually an active runway whenever 4R is active, the RSLS does activate the RELs facing targets on 33R/15L at the intersection with 4L for those configurations where 4R is active and 33R/15L is always inactive. As will be discussed in Section 6.7, a topic for further research is to determine logic rules for RELs at runway/runway intersections when both runways are active.

6.4.5 Examples of Runway-Entrance Lights.

When an aircraft arrives at the runway (ARR state), the aircraft's hot zone extends ahead $t\_arr\_rel$ seconds. For example, if $t\_arr\_rel$ is 30 seconds and the aircraft's velocity is 130 knots along the runway, the target acceleration model for ARR computes the length of the hot zone to be ($t\_arr\_rel$) * (velocity of the target)=6630 feet (about 1.1 nautical miles). All RELs whose activation region overlaps the hot zone are red. None are off due to anticipated separation, because ARR is too far away from the activation regions to satisfy the anticipated separation condition. The RELs are off if their activation region does not overlap the hot zone.

After the aircraft has entered the airport region, so that it is now in the landing state (LDG), assuming the aircraft is across the threshold and at high-speed, i.e., its velocity is greater than $v\_ldg\_rollout$ (e.g., 55 knots), the hot zone extends to the end of the runway.

For an aircraft in a landing rollout, i.e., in the LDG state, but with a velocity less than $v\_ldg\_rollout$, the hot zone is now $t\_ldg\_rel$ seconds ahead.

When the aircraft has slowed down to TAX, its hot-zone length is zero (i.e., $t\_tax\_rel=0$), so that no RELs are red.

6.5 Logic FOR TAKEOFF-HOLD LIGHTS

6.5.1 Overview of the THL Logic

The light-control logic determines whether takeoff-hold lights (THLs) next to active or inactive runways should be red or off. Although inactive runways are not generally used for takeoffs, they may be used for takeoffs at any time, so that the logic for takeoff-hold lights should apply to inactive runways as well as active runways. Also, THLs are at locations used for intersection takeoffs as well as full-length takeoffs. Takeoff-hold lights at a given location are red if two conditions are satisfied: 1) a target is in position for takeoff or starting its takeoff at this location, and 2) the runway is not safe for takeoff at this location. The first condition implies that there must be a target in a position to see the THLs in order for them to be red. This is not true for RELs, which turn red regardless of whether there is a target in a position to see them. The second condition depends on whether there is another target that could come in conflict with a departure. This condition is also different from the logic for RELs, in that THLs turn red based on the actions of two targets, whereas RELs turn red based on the action of a single target. These conditions are described in more detail in the next three sections.

6.5.2 Target In Position for Takeoff or Starting Its Takeoff

Logic to determine whether a target is in position for takeoff or starting its takeoff has been divided into two cases. In Case 1, the target is defined to be "in position for takeoff," because it satisfies the following conditions: 1) it is in the STP state, 2) its centroid is in a specified area on the runway, called the arming region, and 3) it was not previously in the LDG state. The last condition, which is optional and can be set to apply to only certain runways for each configuration, was added to prevent THLs from turning red when a previously-landed aircraft temporarily stops in an arming region at a location on the runway used for intersection takeoffs. If the aircraft is not likely to take off (because it just landed), a red THL would be a nuisance light. The THLs are placed ahead of the departure location, and the arming region extends all the way to the THLs.

In Case 2, the target is "starting its takeoff," i.e., it is in a rolling takeoff or in the early stage of a takeoff. There are five conditions a target must satisfy to be considered starting its takeoff. First, it could be in either the TAX or DEP state. Second, as for Case 1, its centroid must be in the arming region. Third, to rule out the situation where the target is crossing the runway, the target must be sufficiently lined up with the runway, i.e., the difference between the target's heading and runway heading must be within a specified tolerance. Fourth, to rule out the situation where the target is passing through the arming region at high speed, the target's velocity must be below a given parameter. The fifth condition is that the target was not previously LDG for the same reasons stated for Case 1 above.

6.5.3 Targets on the Same Runway

As mentioned in Section 6.5.1, the second condition for THLs to be red is that the runway must be unsafe for takeoff. This condition can be divided into two cases depending on whether there is another target on the same runway as the target about to take off or there is another target on an intersecting runway. This section will describe the former case; the next section will describe the latter.

In the former case, the THL logic rule states that the runway is unsafe for takeoff if there is a target inside the THL activation region, an area that includes the runway ahead of the lights as well as an extension on either side of the runway. As in the description of the target hot zone, the THL activation region is an area ahead of a target in position for takeoff, or starting its takeoff roll, that should be free of other targets before takeoff commences. Under the logic rule, the THLs are red if one target is in position for takeoff and another target is inside the THL activation region. If there is no target in the arming region, the THLs would be off, even if the runway is unsafe for takeoff.

There are two exceptions to the logic rule that the runway is unsafe for takeoff if there is a target in the THL activation region. The first exception states that the runway is safe for takeoff if the target in the THL activation region is predicted to exit "soon." Exiting "soon" means that target B is predicted to exit the THL activation region before target A could reach target B if A started to take off. The mathematical expression for this condition is the following:

$$t\_max\_exit < t\_min\_reach, \qquad (6\text{-}3)$$

where $t\_max\_exit$ is the maximum time for B to exit the THL activation region, as calculated by the prediction engine using B's deceleration model, and $t\_min\_reach$ is the minimum time for A to reach B using the acceleration model for departures (DEP). This rule is motivated by another example of anticipated separation (see Section 6.4.3), in which it is legal for a controller to clear a stopped aircraft for takeoff in anticipation that the target on the runway will exit before the aircraft starts its takeoff roll.

The second exception involves what is referred to in the safety logic as the "special departure (DEP) case." If a prior departure is far down the runway and is airborne, the runway is safe for takeoff even though to the ASDE the departure appears to be in the THL activation region. This idea is based on controller procedures in which it is legal to have an aircraft take off on a runway when a previous departure is still over the runway as long as certain conditions are met. These conditions are as follows: 1) the distances can be determined by suitable landmarks, 2) the distance between the aircraft is greater than a specified distance that depends on aircraft type, 3) the downstream aircraft is airborne.

The light-control logic cannot check these conditions, because it knows neither aircraft type, nor whether distances can be determined by landmarks, nor, in some cases, whether an aircraft is airborne (even though the ARTS data sometimes indicate altitude). Consequently, the light-control logic will check other conditions that approximate these conditions and still provide a margin of safety. They are as follows: 1) B is DEP, 2) visual flight rules (VFR) are in effect (this information must be entered manually into the safety logic), 3) B is downstream from A on A's runway, 4) B's distance from A is greater than a parameter distance, and 5) B's altitude is deemed valid by sensor fusion and B is airborne, or B's altitude is not valid and B's velocity is greater than a parameter velocity.

Another condition for the runway to be unsafe for takeoff is for a target to be a TAX and be predicted to enter the THL activation region. The prediction engine determines that a target is predicted to enter a region if all the target's paths based on the deceleration model for TAX enter the THL activation region. In other words, B will definitely enter the region within the TAX look-ahead time even if it starts to brake. This condition is not currently implemented in the safety-logic software.

There is an important point that should be noted here regarding how the prediction engine determines whether there are two targets in potential conflict. Rather than compare all pairs of tracked targets to determine whether A and B might collide, which would be a huge computational problem that grows as $N^2$, where N is the number of targets, the prediction engine has A and B each "notify" the runway. The prediction engine then tells the safety logic to compare only A and B, which is a more-manageable approach than a combinatorial one.

6.5.4 Targets on Intersecting Runways

A runway can also be unsafe for takeoff when there is a potential conflict with a high-speed target on an intersecting runway. The logic for this case is based on the concept of an intersection window, an area at the intersection of two runways. The runway is unsafe for takeoff if target A, which is in position for takeoff or starting its takeoff, and target B, which is in any target state except STP and TAX, could be in the intersection window simultaneously if A started to take off. This logic rule again uses the concept of anticipated separation. Rather than wait for B to cross the intersection before turning off the THLs, the logic turns off the lights in anticipation that B will be across the intersection before A could be in conflict with B if A became a departure.

According to the rule described in the previous section, as B crosses A's runway the THLs would turn red while B is in the THL activation region along A's runway. To prevent this from happening, the safety logic has a mechanism that keeps track of whether B is on an intersecting runway or along the same runway as A. If B is on an intersecting runway, the THLs for A will not turn red.

The prediction engine computes the time interval A could be in the intersection window and the time interval for B. The logic rule then becomes: the runway is unsafe for takeoff if the time intervals of A and B overlap with a safety margin time added to the time intervals. The prediction engine uses the acceleration and deceleration models of target motion to compute the time intervals. For target B, the earliest time to enter the window is calculated using its acceleration model, and the latest time to exit the window is calculated using its deceleration model. Target A is usually stopped or moving very slowly, so its deceleration path is likely to end before the intersection window. Consequently, both its earliest time to enter the window and latest time to exit the window are calculated using the acceleration model for departures.

As mentioned in Section 6.5.3, the prediction engine does not compare all pairs of targets to determine which pairs are potentially in conflict, thus avoiding a huge computational burden. The prediction engine has A and B each "notify" the intersection window and then tells the THL logic to compare only A and B.

6.6 Logic for the ARR/STP and LDG/STP Alert

The safety logic currently implements one type of alert, which, as mentioned in Section 6.1, was added for demonstration purposes. This alert, referred to as the ARR/STP or LDG/STP alert, involves one target (target A) stopped on a runway and another target (target B) on approach to the runway or landing on the runway. More precisely, A is STP, and B is ARR or LDG, or B is UNK with velocity greater than $v\_tax+$. When an alert has been issued, octagons are drawn around the conflicting targets, even if one of the targets is displayed on an approach bar, and an alert message is sent to the audible alerting system. For example, the alert message for an arrival to runway 22L of Logan Airport is as follows: "Warning. Two-Two-Left Arrival, Traffic on Runway."

The alert logic is based on the concept of an alert activation region, an area around the runway that the prediction engine checks to see if there are any targets that may potentially be in conflict with target B. An alert is issued if two conditions are met: 1) B is "close to" or on the runway, and 2) there is a target A stopped in the alert activation region. If B is airborne, the first condition for issuing an alert can be expressed mathematically as $$t\_reach\_threshold < t\_alert, \quad (6\text{-}4)$$

where $t\_reach\_threshold$ is the time it would take for B to reach the runway threshold as calculated by the prediction engine using B's acceleration model, and $t\_alert$ is a parameter threshold (e.g., 35 seconds). If B is already past the threshold, $t\_reach\_threshold$ is set equal to zero. The reason the logic does not compare $t\_alert$ to the time for B to reach A is the following: it is important to alert soon enough so that B has time to execute a go-around. This timing is independent of A's location in the alert activation region, so that it is better to measure B's time to a fixed point, such as the threshold or missed-approach point. Since missed-approach points can vary depending on aircraft type, it was decided to use the threshold instead.

Analogous to the discussion in Sections 6.5.3 and 6.5.4, the prediction engine avoids the $N^2$ computational problem by having A and B "notify" the runway. Thus, the alert logic needs to compare only the two targets A and B instead of all pairs of targets.

6.7 Future Topics for Development

This chapter has presented a high-level description of the processes currently implemented for the RSLS safety logic. Some examples of topics to be developed in the future are the following:

1. Logic for stopways: Boston's Logan Airport has long, crossing stopways at the approach ends of runways 4L and 9. These stopways also intersect with several taxiways. On the model board of Logan Airport, there are RELs at the intersections of taxiways with these stopways, However, there currently is no light-control logic to drive the RELs. Also, the stopways are not included in any activation regions for RELs, THLs, or alerts, so that these stopways are not included in the safety logic.

2. Anticipated separation for takeoff-hold lights: As mentioned in Section 6.5.3, the THL logic involving anticipated separation for targets on the same runway, in which a target is predicted to exit the THL activation region or enter the THL activation region, can be implemented.

3. Logic for runway-entrance lights at runway/runway intersections: As mentioned in Section 6.4.4, the logic for controlling the RELs at runway/runway intersections has not yet been completely resolved. Various logic schemes could be tested with real and simulated data to determine whether lights at these intersections would interfere with normal operations.

4. Logic using target classification: Knowledge of target type, e.g., aircraft type or whether the target is a ground vehicle, would greatly improve the safety logic. First, testing of the logic has shown that a ground vehicle is sometimes determined to be a DEP or LDG; knowledge of target type would solve this problem. Second, some of the safety-logic parameters should be a function of target type, e.g., the acceleration and deceleration parameters in the prediction models of target motion, to make the aircraft modeling more accurate. Third, knowledge of target type would help prevent having helicopters triggering RELs to turn red when they should be off.

5. Controller interface: A controller interface is needed for the tower supervisor to input information to the safety logic about current conditions, such as meteorological conditions, surface braking conditions, and the current runway configuration. The latter information would indicate which runways are active or inactive, and which areas are closed to any operations.

6. Incorporating controller/pilot intent: The current logic is not aware of controller or pilot intent. This causes a problem in certain cases, such as sidesteps and land-and-hold-short operations. In the latter case, the logic does not know when an approaching aircraft has been told by the controller to hold short of an intersecting runway. It assumes that the aircraft has permission to use the whole runway for its landing. This may cause some problems. For example, if there is also a target in position for takeoff on the intersecting runway, then the THLs for that target will turn red, even though the controller may have cleared the target for takeoff (which is legal). This would cause interference with controller operations. On the other hand, if the logic assumes the approaching target will hold short of the intersecting runway, but the target is not intending to hold short, then the logic does not provide protection between the two targets, i.e., the logic's effectiveness has been reduced. The controller interface just described above would allow the controller to input to the safety logic whether an aircraft is intending to land and hold short.

7. Smooth transitions between configurations: Currently, when the airport supervisor changes the runway configuration, software engineers must stop the RSLS surface-monitor software, input the new configuration, and then bring up the system again. Even if a controller interface is added to allow the tower supervisor to specify the current configuration, it would be useful to be able to keep the system running and to transition smoothly during configuration changes.

8. Other alerts: As mentioned in Section 6.6, only one alert has been implemented. Many other alerts that have already been designed could be easily added, such as a head-on alert between a DEP and a TAX on the same runway (logic rule: alert immediately). Other alerts can be implemented, such as a tail-chase alert between an ARR to a runway and a TAX downstream on the same runway.

9. Hot-zone lengths: One future change in the hot-zone lengths for LDG and ARR targets is to switch to whole-runway zones a fixed time $t\_threshold$ seconds before the runway threshold rather than waiting for the target to cross the threshold. This would indicate that an aircraft owns the whole runway a little before it crosses the threshold.

10. ARTS data for landing aircraft: As mentioned in Section 6.3.4, the safety logic needs to know the intended landing runway for ambiguous approach targets, especially when both runways that a target can land on are being used for landings in the current configuration. The ARTS data can provide that information, but use of this information by the safety logic needs to be implemented.

7. RSLS SYSTEM SOFTWARE ARCHITECTURE

7.1 Introduction

In the disclosed embodiment, the RSLS system executes primarily on multiple networked workstations that use the UNIX operating system. The ADIDS system, which can use IBM PC-compatible machines running the DOS operating system, and the ASDE data conversion and distribution system, which can be based on a Mercury single board computer, are exceptions. The run-time software consists of approximately 175K lines of C++ code to implement the radar processing, sensor fusion, safety logic, and displays, and an additional 15K lines of C code to implement to ASDE radar interface and ADIDS system. This software is organized into a dozen independently executing processes (tasks) that communicate with each other via operating system and network resources.

The multi-process approach minimizes complexity and facilitates the use of multiple processors in areas where more processing horsepower is required. It is based on dividing the major processing tasks into separate data-driven programs. The programs communicate with each other so that the output of one program (process step) becomes the input to the next program. In some cases, the communication is bi-directional to allow for cases where there is feedback or a query-response structure in the flow of data through the process steps. The multi-processing nature of the UNIX operating system directly supports this approach. The UNIX kernel also provides direct and flexible support for communication between processes that reside within one computer or within multiple computers connected via a network.

7.2 System Overview

Figure 17A:
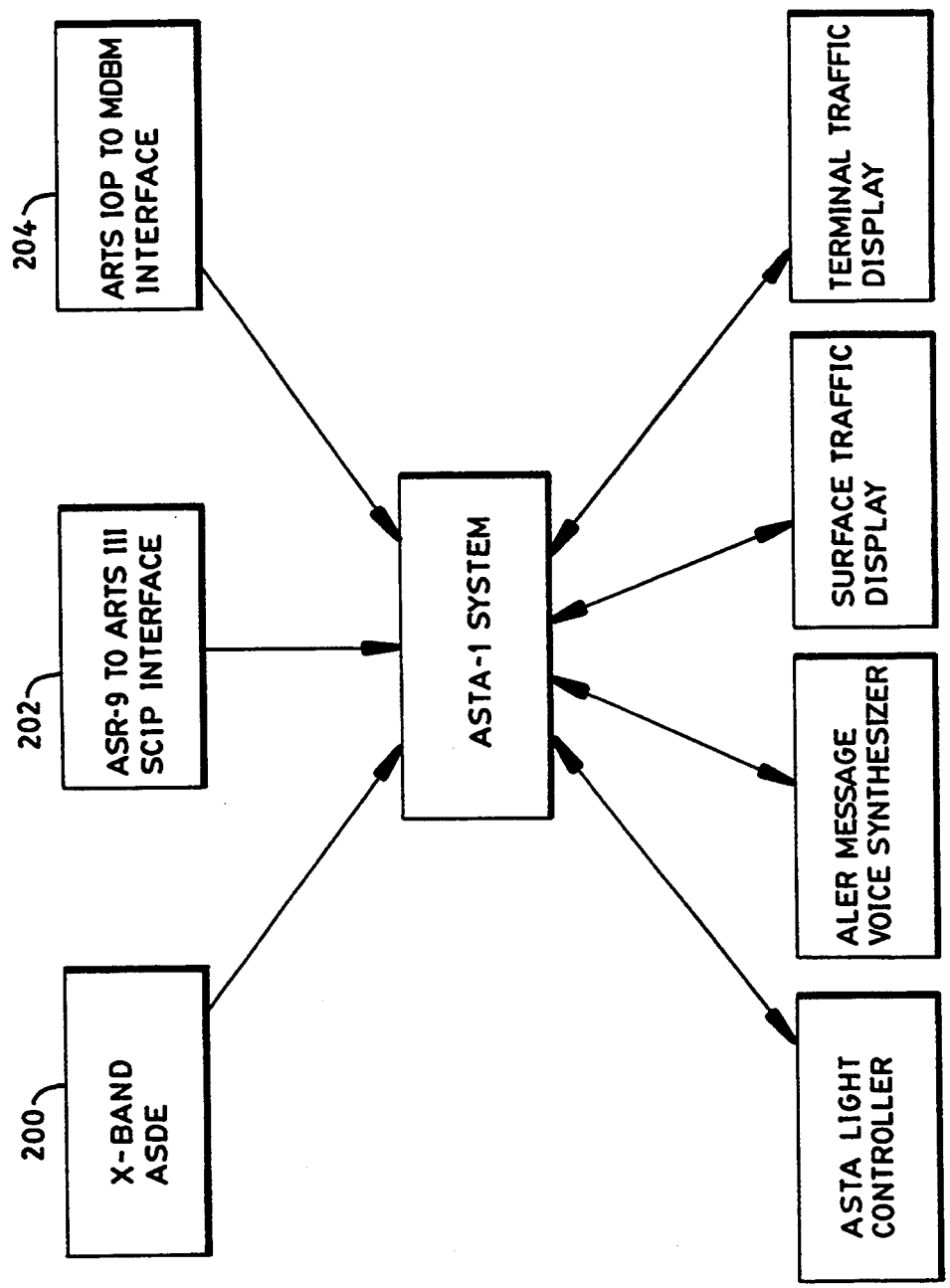
FIGS. 17A and 17B are high-level diagrams of an RSLS according to the invention.
Figure 17B:
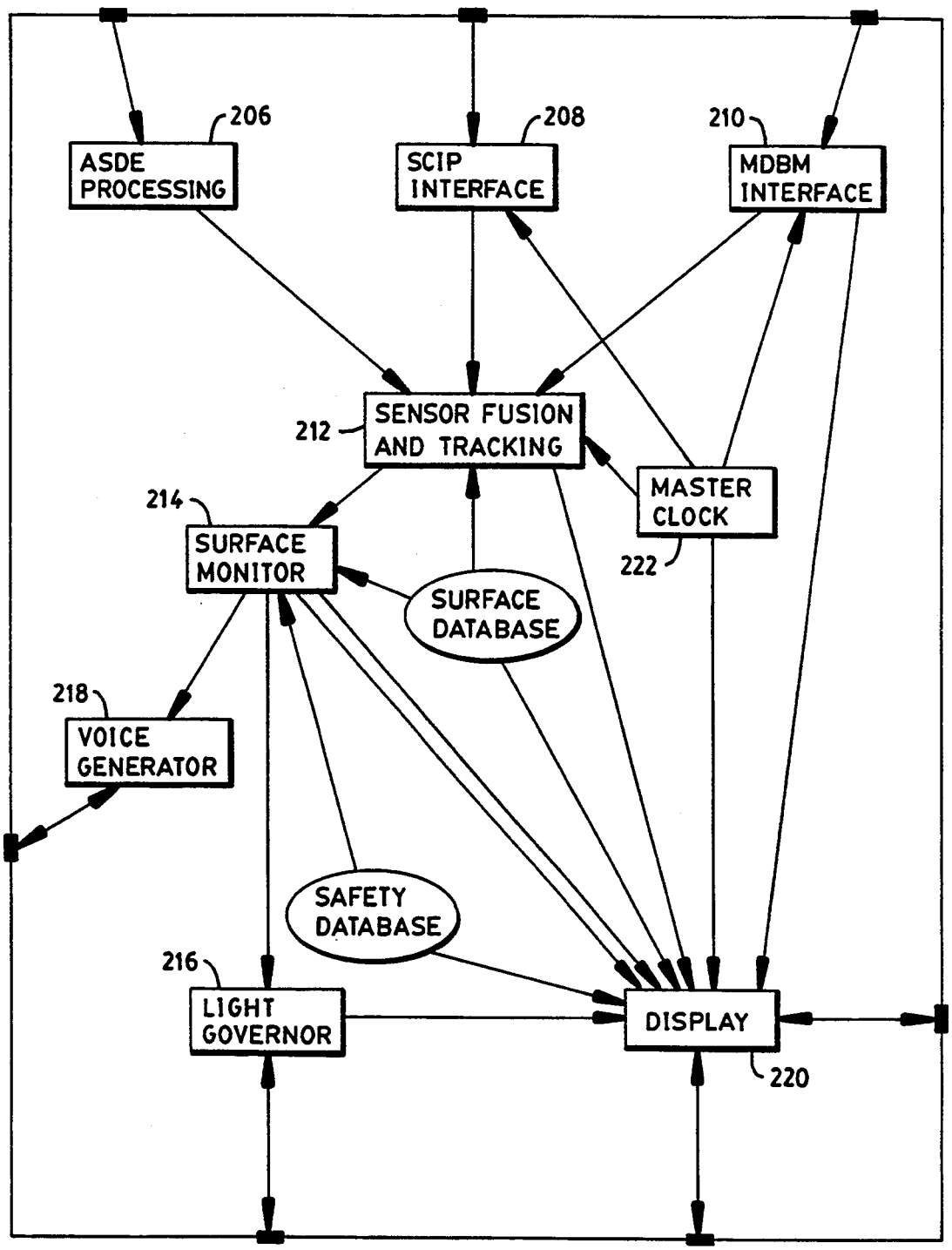

FIGS. 17A and 17B are top-level diagrams of the RSLS processing. Each rectangle represents a functional element. Boxes with rounded corners represent sources of data outside the RSLS system. Ovals indicate primary databases. The arrows reflect the flow of data between functional elements.

There are three sources of data flowing into the RSLS system: digitized radar video from the X-band ASDE 200, beacon replies from the ASR-9-SCIP-to-ARTS-III IPO interface 202, and display symbology from the ARTS-III-IOP-to_MDBM interface 204. The X-band ASDE video is an 8-bit digitization of the log magnitude of the received return for each of the radar's range-azimuth pixels. The beacon replies from the ASR-9 indicate each target's range, azimuth, mode-A-squawk code, mode-C altitude, and various confidence and validity fields. The data extracted from the IOP-to-MDBM interface includes all text and symbol data destined for the controller displays attached to MDBM. For targets, this text and symbol data includes the target position, the symbol to display at that position, and, for targets with data block and the direction of the data block's leader line.

ASDE processing 206 subtracts clutter from the radar image, identifies targets in the clutter-removed image, funds the centroid (position) of the targets, and then matches the target to targets in previous scans to form tracks. Because no single workstation-class processor is capable of handling the high input data rate and processing demand, the ASDE processing is implemented as three processes: clutter rejection, connected components, and merge. These processes execute on an eight-processor Silicon Graphics workstation 95 (FIG. 9). The input data is distributed to multiple instances of the clutter rejection and connected components processes executing in parallel and the intermediate results are recombined in a final merge process.

The SCIP interface 208 collects surveillance data from the ASR, applies geometric and message-type filters, decodes the packet binary format used by the ARTS into standard data types, and adds a time stamp. Because the location of the ARTS hardware is physically remote from the majority of the RSLS hardware, the SCIP interface is implemented in two parts. The first part, ADIDS-SCIP, which executes on a PC adjacent to the ARTS hardware, extracts the data, applies geometric and message-type filters, adds a message identifier and time stamp, and transmits the data over a modem, The second part, which executes on a UNIX workstation, receives the data via a second modem, unpacks it, and makes it available to the rest of the system.

The MDBM interface 210 listens to data from the ARTS-IOP-to-MDBM link, emulates the updating of tables performed in the MDBM, extracts target updates, applies geometric and message-type filters, decodes the packed binary format by the ARTS into standard data types, parses portions of the data block for targets with tags, and adds a time stamp. Because the location of the ARTS hardware is physically remote from the RSLS hardware, the MDBM interface is implemented in two parts. The first par, ADIDS-MDBM, which executed on a PC adjacent to the ARTS hardware, extracts and interprets the data, applies message-type and geometric filters, adds a message identifier and time stamp, and transmits the data over a modem. The second part, which executes on a UNIX workstation, receives the data via a second modem, unpacks it, parses portions of the data block for targets with tags to extract aircraft identity and airframe type, and makes the data available to the rest of the system. Sensor fusion 212 receives the target data generated by ASDE processing, beacon data from the SCIP interface, and flight-identity and airframe-type data from the MDBM interface and produces a unified picture of the aircraft and vehicles that are on or near the airport surface. Sensor fusion's responsibilities include the following:

- translating all target positions to a common coordinate system,
- determining and applying time offsets to synchronize time stamps,
- smoothing target positions,
- estimating target velocity and acceleration,
- de-multipathing the beacon reports,
- filtering false targets fro the ASDE data,
- transferring identity and type information from the MDBM data to the beacon data,
- determining which ASDE targets and to the beacon target represent the same target and should be combined into a single track, and
- coasting tracks through coverage gaps.

The surface monitor 214 uses the output of sensor fusion and several databases to control the operation of the lights, to generate audible alerts and to drive the depiction of targets on approach on the displays. For each target, the surface monitor determines the target's state, calculates the range of possible future positions within a defined time horizon, assesses whether the state of the lights should change in response to the target's new state, and determines if an alert should be generated due to possible interactions with other targets.

The light governor 216 processes light state commands from the surface monitor and uses them to send commands to the light control system. It forwards light state change messages to the displaces when the light control system confirms that the light has turned on or off. It uses a database to correlate the light IDs used by the surface monitor with the light channel numbers used by the light control hardware.

The voice generator 218 formats alert commands from the surface monitor into messages suitable for a voice generation system (e.g., DECtalk). In case of temporarily overlapping alerts, it queues messages according to the priority that the surface monitor has assigned to each. It uses a database of message templates.

The display 220 generates a plan-view of the current situation. It is normally used show the position (and other characteristics such as identity, type, heading, radar image size, and alert status) of the tracked targets, the state of the RSLA lights, and the approach bars to targets on approach to the runways. It can also show additional information generated by the system such as all targets identified by ASDE processing (unfiltered), target fusion status generated by sensor fusion, and target states and predicted paths generated by the surface monitor. It uses a map database to provide visual reference.

The master clock 222 is a time server that provides a common time reference to all processes. In real-time operation, the master clock allows the system to run at varying time rates.

7.3.1 Radar Processing Overview

Figure 18:
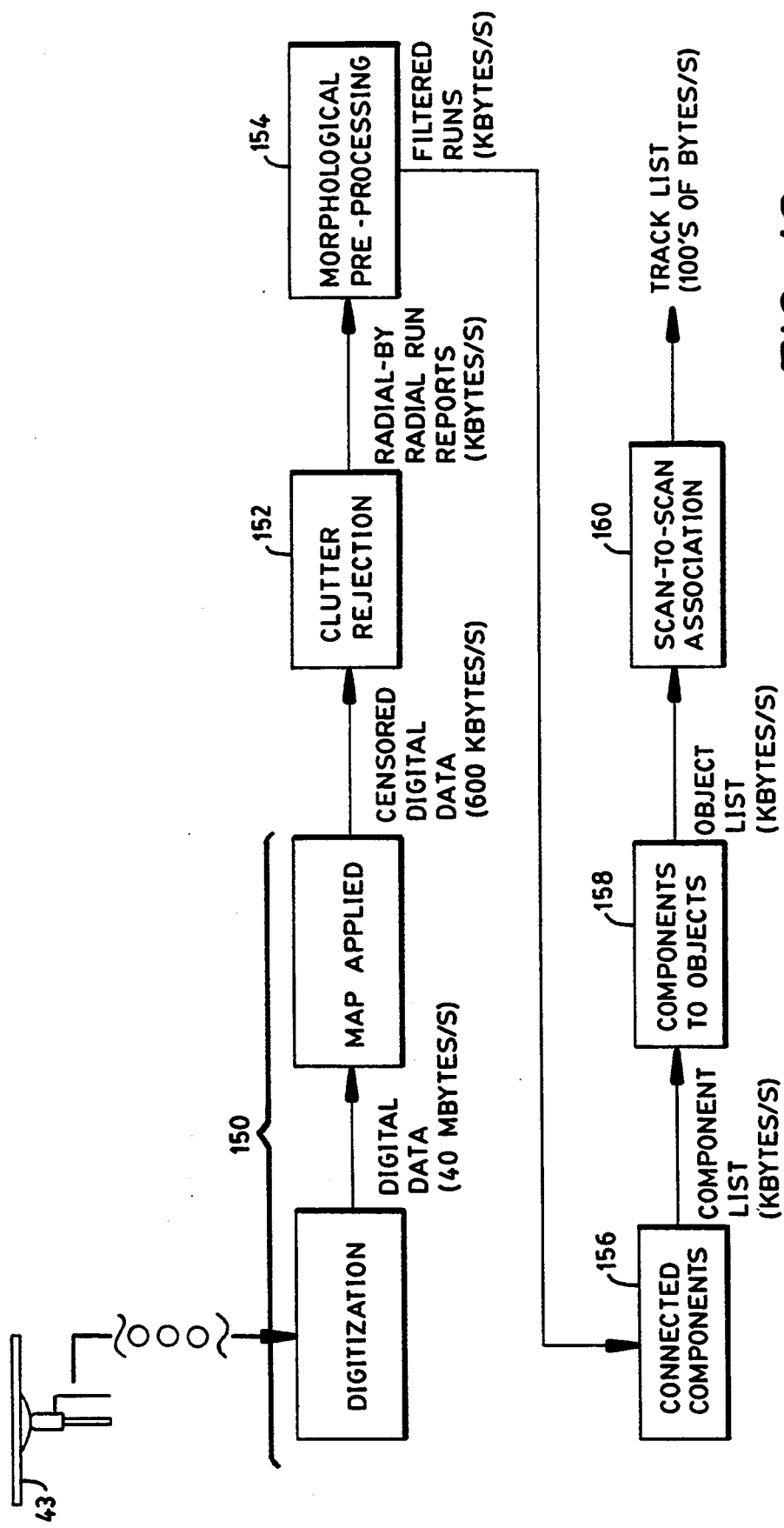
FIG. 18 is a block diagram of surveillance processing in accordance with the invention.

Referring to FIG. 18, a block diagram of the radar processing (discussed in an earlier section) includes:

I. ASDE-X Data Extraction 150,
II. Clutter Rejection 152,
III. Morphological Pre-Processing 154,
IV. Connected Components 156,
V. Components to Objects 158, and
VI. Scan to Scan Association 160.

Figure 19:
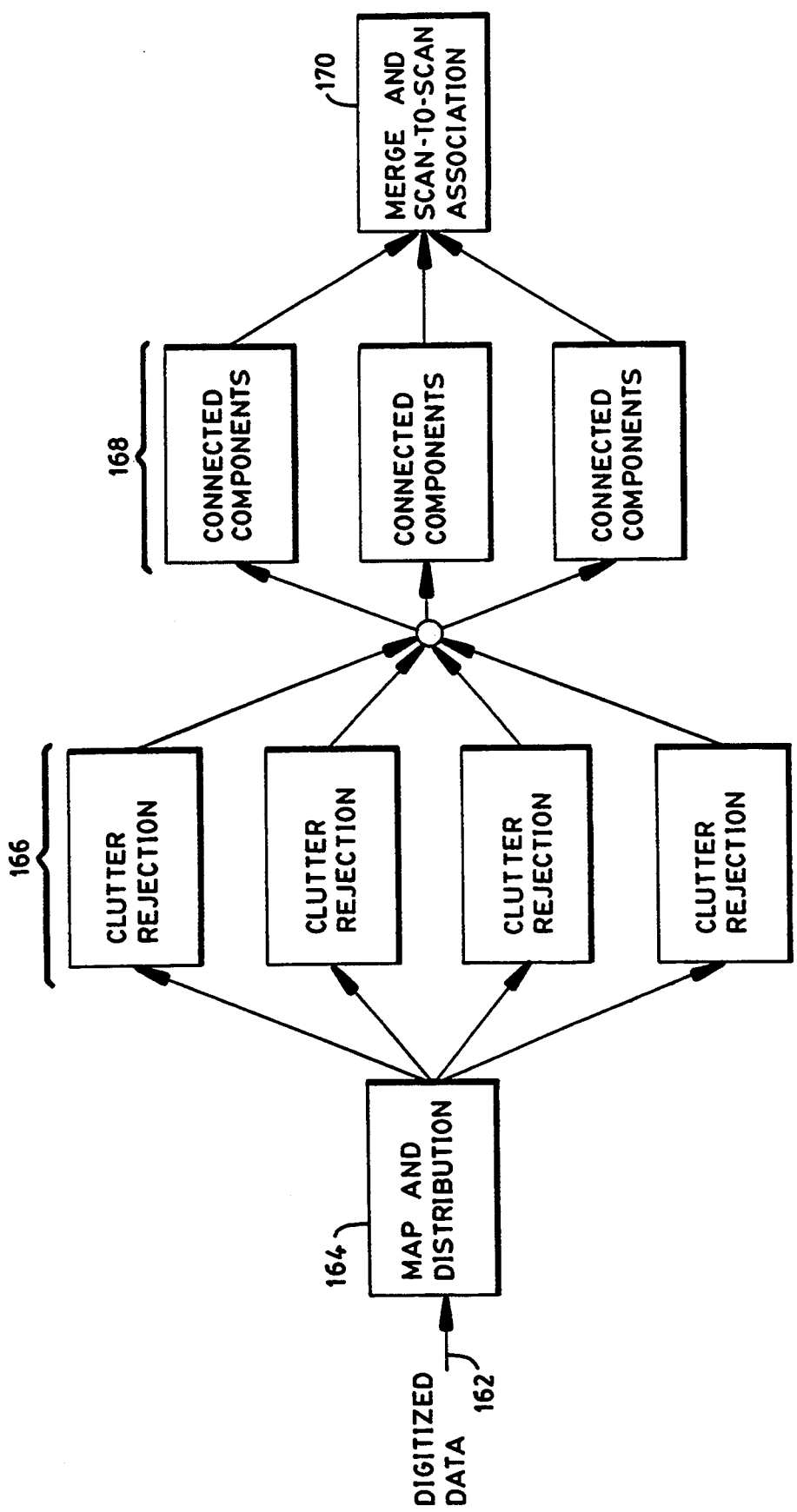
FIG. 19 is a block diagram of the processing of FIG. 18, but using parallel processing techniques.

It is entirely possible to create a version of software that performs these operations serially. However, the advantages for real time of paralleling several of these operations motivated a rather elaborate scheme of dividing the functionality between several processes. FIG. 19 provides an overview of the major processes.

Initially, the analog radar data is digitized 162 and enters the system at a very high rate (typically 40 Msamples/s.) Using custom hardware, only data from the airport surface and approaches are passed on for subsequent processing. The surviving data is passed to a general-purpose single-board computer 164 that serves to distribute data to several Clutter Rejection processes 166 based on airport region. "ASDE Data Conversion and Distribution" section describes this stage of processing.

The four clutter Rejection processes 166, running on processors within the SGI multi-processor system, each cover about a fourth of the airport samples. An individual process always sees the same airport region. These processes maintain a surface-sample-by-surface-sample history or radar returns for use in a dynamic CFAR mechanism that detects target pixels. Rather than reporting each target pixel individually, they are strung together to form runs that are sent to the Connected Component processes 168. Each process sends out these runs in n-radial packets with n currently being 128. The "Clutter Rejection" section describes details in this mechanism. It should be noted that while the data to the three processes is fed sequentially, due to processing delays some packages for the end of one processor's region may be completed and sent after the first packets from the next region. It should also be noted that since the number of operations per pixel is almost constant, load balancing for this stage can be performed statistically (before run time).

It was found that the number of runs emerging from the clutter rejection processes were sufficient to require parallelization of the process. This leads to two difficulties. First, while most objects may be completely contained in the "wedges" sent from Clutter Rejection, some straddle boundaries. Second, Connected Components load balancing between processes is completely data dependent.

The first problem is handled as follows: Connected Components is performed on an entire airport surface wedge. Components are then grouped together into objects (see the "Connected Component" section below for more detail). Objects are then sorted into two lists. The first consists of all objects totally contained within the surface wedge. The second list consists of objects that straddle the surface wedge boundary. Packets containing these lists are sent by several Connected Component processes to a single Merger process whose responsibilities include splicing together boundary objects.

The second problem (load balancing) is handled by a first-come first-serve scheduling process for the Connected Component processes. Each Clutter Rejection process places its result on its own queue with a time stamp. All available Connected Component processes compete for access to the set of Clutter Rejection output queues, which is mediated by a semaphore. The "winner" checks all queues for data and chooses the oldest packet and releases the semaphore. All Connected Component processes maintain no history—i.e., after processing a packet and sending off the results, no information from it is maintained. Thus, when a packet is finished, a Connected Component process is available for processing any other packet.

As the last stage of radar surveillance processing, the Merge/Scan-to-Scan Association process 170 must collect data from all the Connected Component processes and produce a single unified view of the surface as well as maintain history on all known tracks. The Merge/Scan-to-Scan Association process is described in the section entitled, "Merge and Scan to Scan Association." In this single process, a table of wedges already seen in the current scan is maintained and updated. As a new wedge is received, the targets completely contained within it are immediately put on a new target list. If any boundary targets exist, the "wedges already seen" list is checked to see if the appropriate neighbors are present. If the neighbors have the completion of the partially seen object, the completed object is placed on the new target list. The new target list is then matched to the various lists of existing tracks as described in the "Merging and Scan-to-Scan Association" section. Finally, tracks that are updated in the present scan are made available to the next processing stage, namely Sensor Fusion.

7.4 Radar Interface

While current general purpose computers are available that are capable of supporting the surveillance processes, the safety system, and assorted displays, no commercial hardware exists for the task of interfacing to a high-speed imaging radar in real-time. Since designing, simulating, wirewrapping, debugging, and maintaining custom hardware is expensive and time-consuming, the radar interface design has to be flexible. It should support the ASDE-X radar, sampling at 40 megabytes/second, and the ASDE-3 radar, Sampling at 42 megabytes/second. It must support real-time radar processing, raw radar data recording, and playback of recorded radar data. Processing and recording the radar data at the full real-time rate would be prohibitively expensive- it would mostly process samples of no interest, where airport surface traffic cannot possible travel. Therefore, the radar interface must map in only the areas of interest and ignore all other areas. To meet all these needs, the radar interface consists of three modules; the Radar Interface board (RIB), which does the analog to digital conversion, the Map board, which filters the data in range and azimuth, and a Mercury 3200 single board computer (MC3200), which formats and outputs the resultant data.

The Map board and MC3200 are placed on a VME bus where formatted radar samples are copied in the VME memory of the system that processes (or records) the data. The RSLS real-time ASDE surveillance system is configured with the Map and MC3200 boards placed in the VME side of a Silicon Graphics Incorporate (SGI) UNIX multiprocessor. Another application of the radar interface is in a VME computer system called the Lincoln ASDE Recording System (LARS), which records the data onto a high-speed Honeywell Very large Data store (VLDS) tape recorder. The LARS can record data and the real-time SGI system can process the same radar data simultaneously and independently. The MC3200 in the LARS runs slightly different software from the MC3200 in the SGI.

The data tapes produced by the LARS can be played back in real-time through the SGI-based surveillance system by directly connect the MC3200 in the LARS to the MC3200 in the SGI (bypassing the RIB and Map board). The MC3200 in the LARS runs software that mimics a RIB/Map board connected to a radar, so the SGI real-time system processes as if it were really connected to a radar.

The importance of playing back recorded radar data in real-time cannot be exaggerated. System development of debugging are greatly speeded by processing the same data that deterministically reveals the same bugs each time. While keeping the number of process parameters as small as possible was a major design goal, optimizing even a small number of parameters would be extremely difficult without the ability to assess the effects of parameter changes on the same data. Rare system failures, which would otherwise be almost impossible to reproduce, can be captured in the tape recordings and played back to determine the cause.

7.4.1 The Radar Interface Board

The RIB has the following three inputs: the radar receiver video-frequency output, the radar's Azimuth Change Pulses (ACP), and the radar's Azimuth Reference Pulses (ARP).

The radar receiver's video output is an analog signal where the amplitude represents the received power for some location the airport surface. In the case of the ASDE-X, the video is the logarithm of the received power. The exact location on the surface that corresponds to the video can be determined by knowing when the radar transmits a pulse and where the antenna was pointed when the pulse was transmitted. This is the purpose of the ACP and ARP signals.

The ACP pulse is generated whenever the antenna moves past a series of fixed positions. An ARP is generated whenever the antenna is pointed directly "North"- actually this is simply a reference direction and is arbitrarily chosen. After each ACP, the radar transmits a pulse. The number of ACPs since the last ARP are counted and therefore determine the position of the antenna when the pulse was transmitted. The time is lag since the pulse was fire determines the distance from the radar of each part of the video.

A related concept to ACP/ARP is the Plus Repetition Interval (PRI). PRI is technically the time between radar pulses. There are many radar video samples during each PRI. So each sample during the same PRI represents the received power at a different range but at the azimuth. Therefore, the term PRI is often used to mean the set of samples for a given azimuth that are all generated from a single transmitted pulse.

The RIB does A/D conversion on the incoming video stream using the ACP and ARP pulses for time association. The output is 40 (or 42) megabytes/second of digitized radar data along with clock and control bits.

7.4.2 The Map Board

The Map board maintains a censor map of each position on the airport surface. Each bit of the map represents a group of samples whose extent is 4 range gates by 32 azimuths. The azimuth and range gate (the number of samples since the start of the PRI) of each sample is looked up in the map to determine if the sample is to be thrown away or transmitted to the MC3200.

The Map board received the RIB data and filters it base don range and azimuth as described above. The samples of each PRI are grouped together, and the Map board's internal independent free-running clock is used to time-stamp each PRI. Sixteen PRIs are buffered in memory and then transmitted over a 16-bit high-speed parallel cable to the MC3200.

7.4.3 The Mercury 3200 Single Board Computer

The MC3200 has two jobs. It controls the Map board; initializing, status monitoring, downloading the censor map, and receiving the radar information. The MC3200 also groups the radar information into packets and determines where the data is to be sent for further processing. The software for the MC3200 is written entirely in C.

The MC3200 in SGI communicates with clutter-rejection processes running on any of the SGI CPUs. Each cluster-rejection process operates on a fixed region of the airport surface. This is currently arranged so that, if there are N clutter-rejection processes and M samples/scan, each process will receive $P=M/N$ samples/scan. A further convention is that the 1st clutter-rejection process always receives samples O through P-1, and 2nd clutter-rejection process always receives samples P through 2P-1, and so on. The division is performed so that PRIs are not split between clutter-rejection processes, but the concept remains the same.

The MC3200 determines which clutter-rejection process is to receive each packet of radar data based on the azimuth of the data. After inserting a small packet header, the MC3200 performs a VME block move of the packet into the ring-buffer associated with the appropriate clutter-rejection process. Each packet of radar data contains the samples (censored by the Map board) for 16 PRIs, the number of samples, the azimuths of the PRIs, the clock time, and a sequence number incremented with each transmitted datum.

In addition to the PRI packets, the MC3200 also communicates other information to the clutter-rejection processes. Since the exact range of the samples cannot be decoded without knowing which samples have been censored, the censor map is transmitted to each clutter-rejection process during system initialization. The time of day associated with the clock counter value of zero is also transmitted to each clutter-rejected process.

After the last PRI packet for the current scan has been sent to any clutter-rejection process, an End of Scan record is sent. This allows the clutter-rejection process to immediately realize that no further data is forthcoming for this scan and the remainder of the scan can be spent calculating new clutter statistics and performing other bookkeeping functions. The clutter-rejection process could monitor the azimuth of each PRI packet to determine this, but in the unlikely event of an error, the end of scan could not be determined until data from the next scan arrived.

During playback, when the data source is not a radar but a tape in the LARS, data corruption due to tape errors is possible because of the very large volume of data. When this occurs, an error record is send to each clutter rejection process that would normally receive the corresponding data. Since the software for the MC3200 in the SGI is identified during playback and real-time processing, the software for error records is enabled, but never activated during real time.

7.5 Clutter Rejection

The clutter rejection processes have three major goals. The first goal is to eliminate as much receiver noise, radar returns from unimportant objects, interference from other radars, and waiver interference as possible. The second objective is to detect as many radar returns from aircraft and other ground vehicles as possible. The third goal is to support the real-time system.

There is some conflict between these goals. Detecting as many targets as possible actually means allowing a fair number of clutter returns to be declared as target returns. This way the rest of the system, which has history and target shape information can prune out these false defections without increasing the overall system False Alarm rate (FAR) and maintain an extremely high Probability of Detection (Pd). But the real-time needs to the rest of the system may necessitate reducing the number of target detections to lower the data rate. A balance must be found. The processing power of CPUs commercially available in the next few years may make tradeoffs between real-time behavior and process performance unnecessary, but the current system must take this into consideration.

As the first goal implies, clutter is composed of the radar returns from objets on the airport surface which are not aircraft and ground vehicles (such as buildings, lights, signs, grass, etc.), received pulses from other radars, and the backscatter from rain, snow and other adverse weather. This implied that the only correct output from the clutter rejection processes is runs of samples caused by aircraft, ground vehicles, and multipath. Since multipath does not have the same statistics as the background clutter, it is not appropriate for the clutter rejection process to reject the multipath. The multipath will be eliminated in further states of the system.

7.5.1 Input Data

The clutter reject processes have three input sources: the command line arguments, the runway/taxiway map (a run-length table), and the MC3200. The command line arguments and the runway/taxiway map will be discussed in the Initialization section. The data from the MC3200 is also discussed in the radar Interface section.

7.5.1.1 Ring Buffers

The MC3200 communicates with the SGI processors through a shared memory circular buffer (a ring buffer). The MC3200 is on the VME bus inside the SGI rack. The ring buffer memory is actually on the SGI proprietary high-speed bus, but is mapped onto the VME bus by a SGI I/O board. Unfortunately, there is no way for the MC3200, which is executing a stand-alone kernel, to use Unix System V shared memory segments and semaphores to communicate to three SGI processors.

The memory size required for the ring buffers is calculated and the Unix kernel is configured to reserve this memory. A program (called XMC3200 tool) is executed on the SGI which determines the size of the reserved memory and downloads the MC3200 program. The operator of the real-time system enters the number of ring buffers which are to be used. Xmc3200 tool sends the number, sizes and addresses of the ring buffers to the MC3200. Each clutter rejection process is started with an address of a ring buffer as a command line argument.

Since the ring buffers occupy memory outside the control of the SGI Unix kernel, operating system services such as semaphores are not supported. A complete semaphore package could be implemented using VME test-and-set instructions. Fortunately, since only one process writes to the ring buffer, and one one process reads the ring buffer, a rigorous semaphore is not needed for this application. A pair of pointers is sufficient. One pointer points to the byte past the last record in the ring buffer. The other pointer points to the first record in the ring buffer. The MC3200 determines if space is available in the ring buffer for the next record, writes the next record, then updates the last record pointer. The clutter rejection process determines if there are any records in the right buffer, reads the record, then updates the first record pointer. There cannot be any contention since the instructions to update the pointers are atomic.

7.5.1.2 MC3200 Records

The first thing the MC 3200 sends each clutter rejection process is the basic constants that each process needs in order to properly interpret the radar samples. The MC3200 first sends the clutter rejection process the azimuth numbers of the PRIs which will be sent, the total number of clutter rejection processes N, and this process's sequence, $1 \ldots N-1$.

Next, the MC3200 sends a record which contains the basic radar constants such as the PRF, the sampling frequency, the scan time, etc. This record also contains the censor map. The censor map contains a bitmap of the airport surface. Each bit corresponds to a cell of 4 samples in range and 32 samples in azimuth, When the bit is on, the samples in this cell will be included in the radar data when the bit is off the corresponding samples will not pass the RIB. The final initialization record is a clock record. The RIB contains a real time clock (see section x.y.z) called the radar clock. When a new ACP is received, the radar clock value is sent, along with the azimuth number, and record sequence number in the header for each PRI. the clock record contains the SGI system clock value which corresponds to the zero radar clock value. this time record is needed in order to convert the radar clock count into a time and date.

The MC3200 groups 16 PRIs into one PRI packet. Each PRI packet has it's own header, in addition to the header the RIB attached to each PRI. An error condition is indicated if the radar clock value for the first PRI in the PRI packet is zero. In the event of an error, the data for the PRI packet is ignored.

When all of the PRI packets for the current scan have been sent to the clutter rejection process, the MC3200 sends an End of Scan record.

When the system is operating in playback mode, receiving radar data from the LARS instead of the radar, it is possible (in fact quite likely) that there will be some tape errors during the playback. The LARS will send an error record containing the number of packets lost. The MC3200 sends an error record to each clutter rejection process which is affected. Then the MC3200 sends empty PRI packets for each packet lost. This error record is only possible during playback and cannot be sent during normal real-time operation.

7.5.2 Processing Steps

Each clutter rejection process has two phases. First, the target detections are made and transmitted as soon as possible to reduce the latency. Then, after all the radar samples for this process for the current scan have been thresholded, the clutter map is updated.

Figure 20:
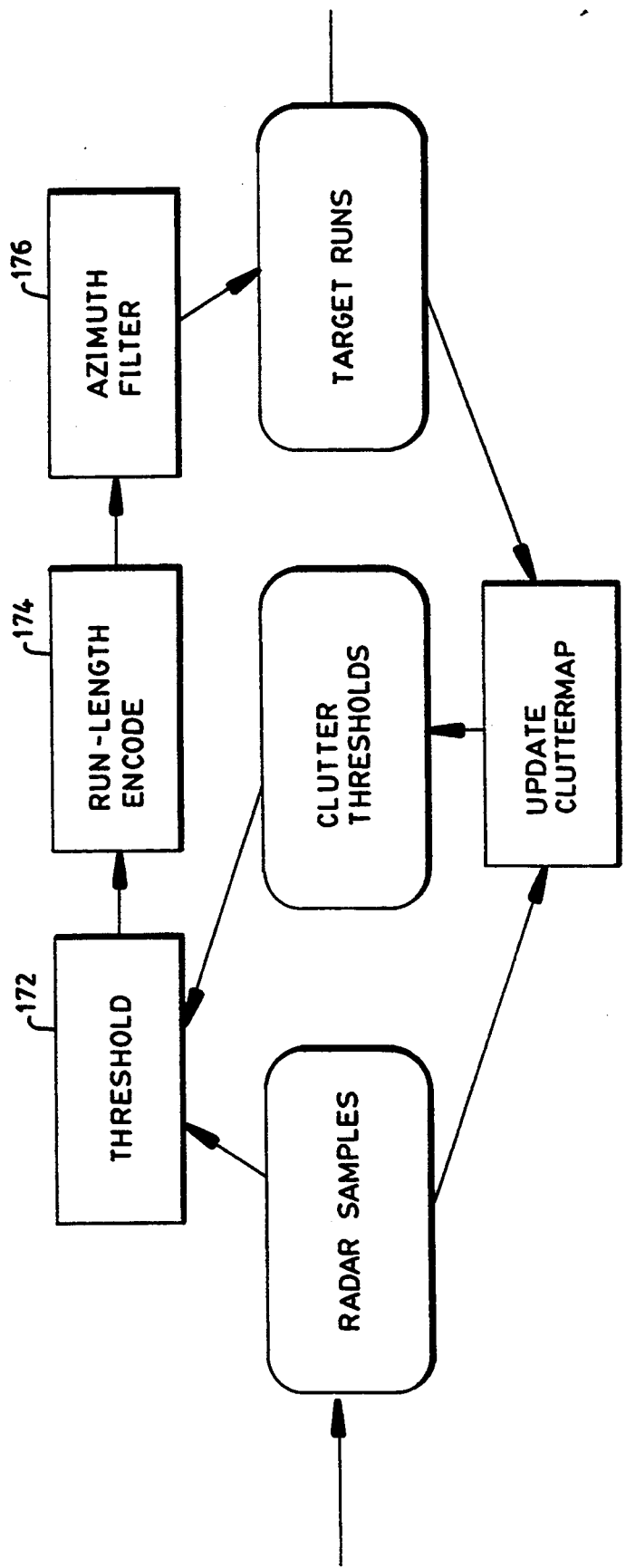
FIG. 20 is a diagram of clutter rejection processing and data flow, which can be part of the radar processing.

It is important that targets which do not move for long periods of time continue to be detected and tracked. Therefore, the estimation of clutter statistics should not include target samples in the calculation of the clutter thresholds. The internal feedback loop of FIG. 20 is designed to avoid this. The thresholds are updated for each sample except for those samples which have been declared as target samples.

It is easy to see that if the process functions perfectly that only the samples which correspond to surface clutter will be updated each scan. But, of course, the process cannot be perfect. So how do errors affect system performance? The process parameters are intentionally set so that there is a very high Probability of Detection, $P_d$, at the expense of the False Alarm Rate, FAR. In the event of a false detection, the sample erroneously declared to be a target pixel does not update the clutter statistics. Since the false detections are independently distributed over the airport surface each scan, it is extremely unlikely that a given clutter sample will be declared to be target for several consecutive scans. Therefore, the clutter statistics will not be significantly affected by false detections.

Another possible event is a missed detection. This occurs when a target sample is erroneously included in the clutter statistics. The sample from the target distribution then will be included in the clutter statistics estimation and bias the clutter thresholds. When an aircraft moves onto a location, the pulse shape and antenna horizontal beamwidth cause a smooth sample value versus time plot. There is an interval where the reflected power from the target is not significantly above the clutter as to be detectable. In this interval the clutter thresholds can be seen to be effected.

Knowing the scan rate, the radar characteristics, the process parameters, and the target RCS, it would be theoretically possible to operate any ground vehicle a "stealth" target which would never be detected. It could be driven at such a rate so that the clutter statistics rise so high that the target is always below the threshold. Fortunately, this pathological case is practically impossible, In practice, the thresholds are raised slightly as the target moves into the area, but well below the peak target values so that the target is always detectable.

One lesson to be learned is that, in addition to lowering $P_d$, a large value for K will increase the effects of missed detections on the clutter statistics. The target sample which is above the mean will increase the standard deviation, and this error is then multiplied by K to determine the new threshold.

If samples from radar interference are included in the clutter estimation, it will not significantly effect the clutter statistics since, like random false detections, radar interference will not appear in the same place consistently enough to significantly bias the clutter statistics. For this to occur, the PRF and scan rate of the interference source would have to be synchronized with the radar. This is not impossible; just extremely unlikely.

7.5.3 Output Data

The output data from each clutter rejection process can be grouped into two types, initialization information, and target detections. The initialization records are sent each time a client connects. If a client disconnects, then reconnects, the initialization records are sent before any target runs are sent.

Radar constants (e.g. PRF, scan time, sampling frequency) are bundled with the censor map. Since the censor map bitmap used by the RIB hardware is difficult to manipulate, the bitmap is converted to a run-length table (RLT). Each run in the censor map RLT consists of the starting sample number and the ending sample number of the samples whose bits are on in the bitmap.

The time record which contains the time of day which corresponds to the zero of the radar clock is sent. This record is identical to the record from the MC3200.

To minimize boundary effects, the target runs from several PRI packets are grouped together into a larger wedge. After all the runs from each PRI in the wedge have been collected, the entire wedge is sent.

After all the target detections for the current scan for this process have been sent, and End of Scan record is sent.

7.5.4 Real Time Constraints

There are three major considerations for real-time processing; peak processing load, average processing load and latency. The radar data flows from the MC3200 into the clutter rejection processes in uneven bursts. At Logan Airport, during the portion of the scan where the radar faces away from the airport the data is ignored. Even during the portion of the scan when the radar faces the runways the censor map causes uneven data rates. Some PRIs will have hundreds of samples which must be processed, other PRI's have very few, but since the radar sampling rate is a constant 40 MB/s, the data rate fluctuates. The solution to this peak data rate problem is simple. Sufficient memory is allocated to buffer the data so that the peaks and lulls in the data rate are averaged together.

No matter how much buffering is performed, however, if the processing is not capable of handling the average data rate, real-time performance cannot be sustained. The sampling rate of the radar, 40 MB/s for the X-Band radar, is much too great to process in real-time. The RIB applies a censor map to the data which reduces the data rate to a much more manageable rate of approximately 600 KB/s. But even this rate is too great for the clutter rejection software running on one MIPS R3000. To achieve real-time rates with the current generation processors, the clutter rejection software runs in parallel on several processors.

The total surveillance system must deliver the aircraft tracks in a timely manner to be useful. The latency of the target tracks is defined as the elapsed time between the time the radar scanned the target to the time the target reports are transmitted. Even though both the clutter rejection process and the connected components process operate in parallel processes, each packet of radar data must flows serially through a clutter rejection process and then into a connected components process, and then the merge process.

7.5.4.1 Latency

The latency of each clutter rejection process is reduced by a very straightforward ordering of the process steps. Each clutter rejection process first compares the input samples to the corresponding clutter threshold in the clutter map and run-length encodes the samples which are above the threshold. Next process applies the azimuth filter, and these filtered detected runs are then transmitted to the connected components process. Only after every sample has been transmitted (for this process) does the process start to train the clutter map.

7.5.4.2 Parallel Processing

There are several schemes which could be used to split the clutter rejection into separate processes. For maximum flexibility and ease of implementation, a loosely coupled scheme with local memory was chosen. It is likely that a tightly coupled scheme with only global memory would work quite well and could possibly take better advantage of the SGI system resources. But a tightly coupled approach would restrict the hardware that could support the software. This tightly coupled approach will be discussed, but has not been implemented.

The simplest approach to parallel processing was taken. The airport surface is split into N wedges (these wedges should not be confused with the wedge definitions in the connected components processes). Each clutter rejection process is responsible for only the samples in it's wedge. Each process thresholds and run-length encodes the samples for it's wedge, applies the azimuth filtering, then calculates the clutter thresholds for the next scan in the remaining time available.

While the current parallel architecture was easy to implement, it is not optimal. In the beginning of each scan, the first clutter rejection process receives data faster than it can process, yet all the other clutter rejection processes are idle. The first clutter rejection process will also finish training the cluttermap and become idle while other clutter rejection processes still have work to do for the current scan. Both the average processing rate and the latency can be improved by taking better advantage of parallel processes.

The architecture of the SGI would also support a tightly coupled approach. The clutter map (for clutter thresholds and the statistics needed to calculate the thresholds for next scan) for the entire scan would reside in a global shared memory segment. Each process would have the same basic control structure; thresholding and run-length encoding, apply the azimuth filtering, transmit the runs, then calculate new clutter thresholds. But rather than wait for a large portion of the airport samples to be thresholded, each process would operate on just one packet.

The only critical resource which would have to be protected with a semaphore is the ring buffer which receives the data from the MC3200. A clutter rejection process would first grab the semaphore (blocking if it is unavailable), then copy the PRI packet into local memory, update the ring buffer's pointer which points to the next packet to be read, then release the semaphore. The azimuth range of the PRI packet determines the portion of the shared clutter map in shared memory which will be accessed and modified. This section of the clutter ma is unique to this scan, so as long as each clutter rejection process is operating on the current scan, the clutter map shared memory segment does not need to be protected with a semaphore.

For airport topologies like Logan Airport where the radar points away from the airport for a large fraction of the scan, this is probably sufficient because there is a large percentage of a scan where no new data is available to be processed. If it is possible that there could be contention for the same area of the clutter map by two processes one process operating on the previous scan, one process operating on the current scan, then each portion of the clutter map will need to be protected by a semaphore. This present two difficulties. Many computer systems may not be able to support this large number of semaphores which will further restrict the portability of the software. (Note that the SGI does support this large number of semaphores.) The second problem is that this scan overlap implies that there are times when the rate of data processing is less than the required real-time rate. If this scan overlap occurs often, then the processing load is greater than the average processing capabilities and the real-time system cannot be stable.

The previous parallel implementations of the clutter rejection process are both Single Instruction Multiple Data (SIMD) processes. The code for each process was identical, but the data which each process received was different. Another tightly coupled parallel implementation of the clutter rejection could be performed by splitting the clutter rejection process into two different parts. This is called Multiple Instruction Multiple Data (MIMD) parallelism.

A MIMD approach could be implemented by having one type of process which thresholds the data, and another type of process which trains the clutter map. The data would flow from the MC3200 into a shared memory segment to be read by both the threshold and clutter map training processes. Each threshold process would use the global clutter map scheme previously described. The target runs would be transmitted into queues for both the connected components processes and the clutter map training processes. A clutter map training process would grab the oldest packet of target runs from the queue and lock the appropriate section of the clutter map, and locate the radar samples which correspond to the target packets. Then the new clutter thresholds would be calculated and the lock on the clutter map segment releases.

7.5.5 Target Detection

As previously discussed, clutter rejection is performed in two phases. The first phase performs te target detection, and the second phase updates te clutter map. As shown in FIG. 20, the target detection phase is composed of three parts: thresholding 172, run-length encoding 174, and azimuth filtering 176. The thresholding and run-length encoding are performed together.

7.5.5.1 Thresholding and Run-Length Encoding

Each 8 bit sample is compared to the threshold in the clutter map for the corresponding azimuth and range. The output is this binary decision. Either the sample is above the threshold or it is not. Rather than send a 1 or 0 for each sample, the samples above threshold (the target samples) are run-length encoded. A run of target samples consists of consecutive target samples and is represented by the sample number of the first sample in the fun, and the sample number immediately following the last sample in the run.

There are actually two clutter map thresholds: a Short Term Memory (STM) threshold, and a Long Term Memory (LTM) threshold. The STM performs the bulk of the clutter rejection while the LTM exists only for the special case caused by target shadows (see section 1.6). Each sample is first compared to the STM threshold and if it is greater compared to the LTM threshold. Since the vast majority of the samples are clutter, most samples are tested only to the STM threshold (and fail). Only a relatively small minority are then compared to the LTM threshold.

Samples are numbered by considering the censor map. The 1st sample in the censor map is sample 0, the second is sample 1, and the last sample is sample N. Since it would be too laborious to run through the censor map to determine each target sample's sample number, a table lookup is used.

After the censor map is read during initialization, the sample number for the first sample on each PRI is calculated and stored in a lookup table. The sample number for sample s on PRI p is simple lookup(p)+s.

The convention for runs used throughout the surveillance system is that the starting sample number is the sample number of the first sample in the run. The ending sample number is 1 plus the sample number of the last sample in the run. The length of the run is therefore, end-start. This is an arbitrary convention used in many image processing systems.

Target runs never overlap PRIs. In other words, if a target run extends to the last sample on PRI n, and other run starts on the first sample on PRI n+1, the two runs will not be consolidated into one run.

7.5.5.2 Azimuth Filtering

The clutter rejection process is a CFAR process. In other words, there is a finite positive probability that a clutter sample will be above the threshold. To raise the probability of detection, the number of false detections may be in the order of one in a hundred. This will not raise the overall system false alarm rate since these random false detections will be spatially isolated and easily removed by further processing.

But these false detections can cause problems for the clutter map training. when the clutter statistics are estimated, no samples above the threshold will ever be considered as part of the clutter distribution. But some of the samples in the clutter distribution will be above the threshold. This would bias the estimation of the clutter statistics and lower the clutter threshold.

One solution would be to calculate the bias and add it to the threshold. But since these false alarms add extra load to the rest of the system and will be eliminated anyway, a simple spatial filter is used to eliminate the salt and pepper false detections before the target runs are transmitted and used for training the clutter map.

Any target run which is not adjacent to a run in the proceeding PRI or the next PRI is eliminated. Runs on the first or last PRI in a packet are never eliminated. Since the target runs from several PRI packets are grouped together for transmission, the azimuth filter would have better performance if the entire wedge was filtered. The current software, however, does not do this. Each packet of 16 PRIs are filtered separately.

7.5.6 Updating the Clutter Map

The cluttermap is composed of two parts: a Short Term Memory (STM), and a Long Term Memory (LTM). The basic workhorse of the clutter rejection process is the STM. The STM holds the clutter thresholds which rapidly adapt, on the order of several scans, to the current environment.

The only reason for the LTM is to handle shadows. A large target, such as an aircraft, will cast a shadow. The samples in the shadow of an aircraft will be lower than the clutter threshold and therefore bias the clutter statistics. When an aircraft stops for longer than the STM time constant, the clutter statistics in the shadow may go down to the level of receiver noise. If there was a significant amount of clutter in the shadowed area, when the aircraft departed the clutter could be above threshold and declared to be target samples.

All of the clutter estimators are performed with floating point arithmetic. Empirical testing determined that, with the MIPS R3000 CPUs, there was no significant performance improvement when integer arithmetic was performed. The additional accuracy with floating point arithmetic was much more significant.

7.5.6.1 Short Term Memory

There are three floating point numbers for each sample in the STM: The STM threshold, the mean estimate, and the average square value estimate. The STM threshold is equal to the mean plus a constant, K, times the standard deviation (m+Ks).

7.5.6.1.1 Estimating the Mean

The mean is estimated with a simple recursive filter: $m_i = ((N-1)m_{i-1} + x)/N$. Where $m_i$ is the mean on the ith scan, x is the current sample value, and N is the time window which controls the decay. The current parameter N is 6.

7.5.6.1.2 Estimating the Standard Deviation

The standard deviation, s, is the square root of the variance. The Markov estimator for the variance is equivalent to xbarsquare-xsquarebar, where xbarsquare is the square of the mean, and xsquarebar is the mean of the squared sample values. The mean has already been estimated and can simply be squared. A recursive estimator for the average square value is used. The estimator has the same form as the mean estimator: $ASV_i = ((N-1)(ASV_{i-1} + x*x))/N$, where $ASV_i$ is the average squared value for scan i, x is the sample value for the current scan, and N is the time window for the estimator. Since the ASV estimator is noisier than the mean estimator, the value of N should be larger than the mean estimator time window—twice as large is a reasonable value.

Rather than calculating the square root of the variance and then multiplying K times the result, a table lookup is used to combine both calculations. Since the standard deviation estimate is much noisier than the mean estimate, an upper and lower bound on the standard deviation can be given. This process parameter is expressed in the product Ks and is also combined into the table lookup.

7.5.6.2 Long Term Memory

The LTM is calculated by taking the maximum of the current LTM threshold with the current STM threshold. Perhaps a better, but more CPU intensive, update rule would be the maximum value of the current LTM threshold times a decay constant and the current STM threshold. The LTM decay would be trivial to implement, but is not in the current software.

The current software has the LTM threshold disabled. This has not been found to adversely affect the system performance.

7.5.6.3 Clutter Map Initialization

All the discussions of the clutter rejection process in this section have been about steady state performance where the clutter map is already assumed to contain the correct statistics and thresholds. But how is this state achieved?

There are two parts to the clutter map initialization. The first is convergence to the proper values. The initial clutter map is set so that the STM statistics are very high and the LTM statistics are zero. Therefore everything is assumed to be clutter. After a few time constants, the STM converges to the proper clutter estimates and thresholders—but still assuming that all stationary objects are clutter. When a target which was stationary during the clutter map convergence period moves, it moves onto an area which has correct clutter statistics and is then detected. After a few time constants, the area where the target was stationary converges also.

The LTM is not updated until the STM has converged.

Since targets may be queued up for considerable periods, the time before the entire airport surface has converged may be excessive. Therefore a map of the runways and taxiways is loaded during initialization. After the STM has been initialized, the areas in this map are reset to values higher than receiver noise (the normal RCS of pavement is lower than the receiver noise), but significantly lower than the peak values for aircraft. This allows the runways and taxiways to converge quickly, while the other more complex areas converge at a slower rate.

7.5.7 Desirable Improvements

7.5.7.1 Reconnect to MC3200

The clutter rejection software is very robust and has a very long mean time between failure. Nevertheless, it is possible that a clutter could crash. It would not be difficult to create a process which monitors the clutter rejection process and restarts any process which fails. The problem is, the current MC3200 program only send the initialization information (the censor map, and the time record) once.

It would be a nice feature if a clutter rejection process could signal the MC3200 that it needed another copy of the initialization records.

7.5.7.2 Additional CFAR for Rain

The current system performs quite nicely in low to moderate rain. Higher levels of rail, however, cause some problems. One reason for this could simply be that less sensitive parameters are required. Parameters for heavy rain have not been explored yet.

But it is likely that lowering the sensitivity of the clutter rejection software will not lead to good rain performance. The greatly reduced signal to clutter ratio may lead to low probability of detection with reduced sensitivity. And local rain gusts may cause large false detections (the area CFAR process used in the display of the ASDE-3 can also cause this).

Better results might be found by applying both the current time CFAR with an area CFAR. This could be done without excessive CPU requirements by counting the number of target samples detected in each wedge. If the number of detections becomes unreasonable, a higher threshold could be used until the number of detections was reasonable. The threshold offset could gradually be reduced either with time, or as the scan moves away from that region on the surface (or both). The threshold offset could be performed in a table lookup, requiring no additional processing load beyond the reprocessing of a wedge.

7.5.7.3 LTM Decay

As mentioned earlier the LTM delay has not been implemented because the LTM is currently disabled.

7.5.7.4 Additional Feedback

Either in addition to the LTM, or instead of the LTM other feedback mechanisms could be implemented. Each of the following mechanisms have the desirable feature of not requiring any additional hard real-time constraint between other parts of the surveillance system and clutter rejection.

7.5.7.4.1 Resetting the Clutter Map

The output of the surveillance system could be monitored to locate any false detections that clutter rejection consistently declares. This could be done by noting that a target has been declared out of range where a large target was stationary. If the target never moves and has all the characteristics of clutter that was shadowed the location of the false target could be sent to the appropriate clutter rejection process.

The clutter rejection process can reset the STM in that area to high values so that everything in that area will be declared as clutter. Then a few time constants later, the STM will converge to the correct clutter values. If the LTM is used, it should be turned off in this area until the STM has converged.

There is no hard real-time constraint since the clutter rejection process does not absolutely have to reset the STM on the very next scan.

7.5.7.4.2 Shadow Detection

It may be possible to detect shadows and not update the clutter statistics there, exactly as clutter statistics are not updated where targets are detected. This could be done analogously to target detection. Targets are declared when the sample is greater than $m+Ks$. Shadows could be declared when the sample is less than $m-Ks$.

7.5.8 Clutter Rejection Parameters

The following section enumerates clutter rejection process parameters which have been described elsewhere.

7.5.8.1 Wedge Size

While the radar samples are received in packets of 16 PRIs per packet. To limit boundary effects, a larger packet size is desired for the output target runs. The −wedge N command line argument controls the number of PRI packets which are processed and sent in one wedge. The current default value for N is 8, which means that the wedge size is 8 * 16 or 128 RPIs per wedge. N must be an integer.

7.5.8.2 Mean Estimator Window

The mean estimator window size is controlled by the −t N command line argument. The argument N is the integer number of scans to use as the time window. The current default is 6 scans.

7.5.8.3 K

The constant K used to calculate the STM clutter thresholds in the formula threshold=mean+K sigma is controlled by the −k X command argument. The floating point argument X is used as the constant. The current default value is 5.

This argument controls the sensitivity of the clutter rejection. This indirectly has strong effects on the real-time performance of the system since a more sensitive detection will result in a greater data rate.

7.5.8.4 Runway/Taxiway Map

The RLT used as the map of the runways and taxiways fro clutter map initialization is a compile time constant. In RejectClutter.C the constant name is runway_map. The current default value is "runup.img." This will probably be made a command line argument in the future.

7.5.8.5 Runway Initial Clutter Value

The initial STM clutter map value assigned to each sample in the Runway/Taxiway map is a compile time constant in the file RejectClutter.C. The constant name is runway_initial_threshold. The current default value is 75.

7.5.8.6 Ring Buffer Address

The address of the memory to map in to the process address space for the ring buffer which receives data from the MC3200 is controlled by the −buf A command line argument. The argument A is a hexadecimal number. This argument is required and there is no default value.

7.5.8.7 Ring Buffer Size

The number of bytes in the memory segment for the ring buffer which receives data from the MC3200 is controlled by the −len N command line argument. The argument N is a hexadecimal number. This argument is required and there is no default value.

7.5.8.8 Convergence Delay

The clutter rejection process will threshold and train the clutter map for a number of scans before the clutter map has converged. During this period initialization messages and End of Scan records will be sent to all clients which connect, but no target runs will be sent. The number of scans to wait before sending target runs is controlled by the −wait N command line argument. The integer argument N is the number of scans to wait. The current default value is 50 scans.

7.5.8.9 Sigma Bounds

Since the standard deviation (sigma) estimation is noisier than the mean estimator, it is desirable to limit the range of sigma. But sigma is not actually calculated, rather the quantity K sigma is returned from a table lookup to achieve better processor efficiency. For this reason, the K sigma product range is controlled by the −min_k_sigma X0 and −max_k_sigma X1 command line arguments. Both arguments X0 and X1 are floating point numbers. The current default value for X0 is 15 and the current default value for X1 is 35.

7.6 Connected Components

7.6.1 Process Architecture

The basic processing stages of the Connected Component process are as follows:
 a) Unflattening received date structure and converting them to a Run Length Table,
 b) Opening,
 c) Component extraction loop,
 d) Components to objects,
 e) Object feature extraction,
 f) Sorting of objects into "totally internal" and "boundary" categories,
 g) Censoring "totally internal" objects based on area, and
 h) Flattening and transmitting of "totally internal" and "boundary" lists.

When the Connected Components process receives the list of runs from Clutter Rejection, it is in the form in which it was extracted. For each radial, a list exists of target-to-background and background-to-target transitions. No transition is recorded if a run extends to a region mapped out by the censoring map. In addition, a list of pointers is maintained to the start of the data for each radial as well as the number of "runs" for each radial.

This structure is converted to the representation used for Connected Components processing and for the Merge process as well. This representation actually consists of two "sub-representations" that share a number of characteristics but differ in some respects. In both representations, runs are described relative to an enclosing "wedge." A region of interest is'defined from some start radial to some end radial and from some start range to some end range. We define an origin as the point of minimum azimuth and minimum range.

In the first representation (subsequently referred to as an integer r.l.t.), every run is defined by two numbers. Each is the ordinal count of a point with the numbering beginning at the origin. The first point corresponds to the location of the first target point after a background point and the second point corresponds to the first background point after the last target point in a run. No information is recorded for the ends of radials so that if a target run extends to the far range limit and another unrelated target run starts as the near range limit of the next azimuth, these runs will be represented by a single run starting in one radial and ending in the next. This is the representation into which the data is initially transformed. This representation is most efficient for operations such as r.l.t. logical operations (see below).

In the second representation, every run is defined by four numbers. For the two points defining the run, the row and column value of the start and end of the run are given. In this representation, a point is always inserted for the end of a radial if a run extends to the far range end and for the start of run if a run starts at the near range. This representation is most useful for the morphological operations such as openings and closings and contour tracking where it is important to know the neighbor relation of nearby runds. This representation will be referred to subsequently as a coordinate r.l.t.

The two representations are convertible, and the conversion operation is relatively inexpensive computationally. The advantage gained by having a particular operation performed in a more efficient representation is usually worth the slight expense of a conversion between representations, After conversion, the received data is in the integer r.l.t. form. It is then converted to a coordinate r.l.t. for the opening. The opening consists of an equal number of erosions and dilations. It has been found that in the presence of increased numbers of small components, typically non-target in nature, the processing time for Connected Components rises rapidly. By performing multiple erosions and their corresponding multiple dilations, considerable real-time savings occur at the expense of missing smaller real objects. Thus a threshold number of runds is used (currently 200) below which one erosion followed by one dilation take place and above which two erosions followed by two dilations takes place.

Further, while an opening on the entire surface run length table would be quite possible, the Connected Component process has only a single surface wedge available to it at one time. It would be possible to produce a functionally equivalent r.l.t. If neighboring wedges had overlapping data. However, for code simplicity, an approximation to a "correct" opening was used at wedge boundaries. Conceptually, one assumes that both neighboring wedge consist of all target. This is a conservative assumption, leading to the removal of the fewest number of pixels at the boundary. It is achieved in a computationally efficient manner by adding several runds at the start and end of the wedge that extend from the minimum to the maximum range. The openings are then performed, and any runs outside the wedge that remain are removed.

The erosions are implemented as follows: each run is first decremented by one at either end. We then make a new r.l.t. with each of the runs in the original r.l.t. replicated three times—one with the previous row number, one with the current row number, and one with the subsequent row number, with all the runs merged into ascending order. Then, a pass is made through the resulting r.l.t. using a counter that increments at every start-of-run and decrements at every end-of-run. A final run is only reported if the counter goes up to three and as soon as the counter falls below three, it is terminated. A dilation is similar, with a run beginning whenever the counter goes above zero and ending when it returns to zero and, or course, lengthening the run rather than shortening. It should be noted that the coordinate r.l.t.

representation of this operation is more efficient since row information si explicit, and even more important, since it represents all end of radials explicitly.

The main workhorse of the Connected Components process is the component extraction loop. This loop can be viewed as a recursive process. Its input consists of a "master r.l.t. containing multiple components. Its output consists of the r.l.t. of the first component in the master r.l.t. and the rest of the master minus the one component. This process is repeated until the master r.l.t. is empty.

Each iteration of the loop is performed as follows: first, the first run in the master r.l.t. is found. Then, a technique called contour tracking is applied. This consists of walking around the component in a counter clockwise direction from the first run and recording all 8-connected points visited. The resulting list is referred to as a chain code. The chain code is then converted into an r.l.t., which is the first output product. This r.l.t. is then subtracted from the master. Run length table subtraction is one of a class of Boolean r.l.t. operations that include r.l.t. anding, oring, and not. In fact, the subtraction is implemented using the anding of the master r.l.t. and the not of the component r.l.t. The operation is performed in the integer r.l.t. format.

The component extraction loop results in a list of components. Note the implicit data reduction from number of runs to number of "eight-connected items." However, it is unfortunately not true that each such component corresponds to a real-world object. This is most frequently because of aircraft breakup, but can be due to objects being close enough to merge into single eight-connected components. In an attempt to handle the breakup case, a nearest distance threshold is established, and components that are closer than the threshold are put together on a single object list. The most accurate method of performing this check would be a pairwise chain code point-by-point comparison. This is computationally much too expensive. Therefore, for each component an enclosing wedge is produced with some padding added. A computationally inexpensive check for pairwise wedge overlap is performed. If two wedges overlap, the two components involved are dilated. If a single object results, the components (the before dilation versions) are placed on the same object list. Unfortunately, since the dilations are not symmetric in range and cross-range, this test suffers from rotational asymmetry. Computationally inexpensive, better approximations are available, but they have not yet been implemented because of time considerations.

The previous stage results in a list of objects, each composed of one or more components. Then, features are calculated for each object. So far, the features implemented include object centroid, area, enclosing wedge, and perimeter. The perimeter is not currently calculated in the real-time system because of speed considerations.

The next step involves deciding which objects are totally internal to the surface wedge for the current packet. The surface wedge is the start azimuth to end azimuth region associated with the current packet. We associate an enclosing object wedge with each target detected. The object wedge consists of the first and last azimuths of the wedge as well as the start and end range of the target, plus some padding. If the object wedge is totally contained within the surface wedge, the object is considered to be totally internal to the wedge. If some part of the object wedge is outside the surface wedge, the object is considered to be a boundary object. Using this definition, the objects are then sorted into a list of internal objects and a list of boundary objects. To decrease the processing load for the subsequent Merge and scan-to-scan association processing, a small area threshold is imposed, currently 40 square meters. Objects below this threshold are discarded.

Finally, the lists of internal and boundary objects, where the internal objects include features, are serialized for transmission (flattened). As explained above, all pointers are removed, and the various data fields are placed in a continuous buffer along with sufficient information to reconstruct the various lists. This buffer is transmitted, along with the time stamp of the wedge, to the Merge process.

7.6.2 Output Data Description

The output data, as described above, is a list of internal targets with features and a list of boundary targets. These have been "flattened" into a buffer for transmission via the sever/client mechanism.

7.6.3 Databases

The adjustable parameters maintained in the database for this process are minimal. They include the radar parameters (range bin size, range and azimuth offset, number of radials, etc.). In addition, the database contains the threshold area and the components to objects association distance.

7.6.4 Significant Problems/Solutions

The structure of the Connected Process and the techniques used address a number of surveillance and real-time issues. A list of the most salient problems (in no particular order) follows:

1) A high degree of parallelism should be achieved,
2) Salt and pepper type small objects which cause processing time to climb faster than linear confuse components to objects must be eliminated,
3) Target breakup should be dealt with,
4) Wedge boundary conditions need to be handled,
5) The extra load on the Merge process from "small" objects should be reduced, and
6) The feature should be extensible.

Given the real-time requirements of this system, which include the ability to apply maximal processing power both when the overall data load went up and when the data load for a few geometrically localized packets goes up, a reasonable scheduling process was required. Such an process would also need to take latency considerations into account. If we allocate processes on a geographical basis (one process per region) it would potentially lead to a single overloaded process handling many target while other processes on the other processors were idle. Since the regions of high load cannot be known a priori, we decided that all processes be geographically independent. Thus, they typically could not have information about neighboring wedges, or history for that matter, since an individual process will have information from different regions for each of its iterations. Thus, the Connected Components processes have no memory of the previous wedges processed. Connected Components processes have no memory of the previous wedges processed. Therefore, when processes go to retrieve new wedges, all processes are equivalent, so any one of them can be chosen. To reduce latency, the oldest available wedge is chosen.

The openings were instituted to address problem number 2. Since the time spent in contour tracker is proportional to the perimeter of a component, a hefty penalty is extracted for processing small objects with a high perimeter to area ratios. In addition, since the beam width corresponds to five cross-range samples and the pulse corresponds to 2-3 rearrange pixels, anything larger than a point target, provided that is reasonably bright, is not lost in a single erosion. Finally, the components to objects code can be significantly confused in the presence of a great deal of multi-path clutter.

The problem of object breakup (problem 3) is handled by associating component together into objects. The assumption that components in close physical proximity are most likely part of the same object is born out most of the time. In retentions such as runup pads and crowded taxiways aircraft can be so closely spaced that this assumption is broken. This can be a significant problem.

The fourth problem, the one of handling objects at boundaries between wedges, is really an offshoot of the region-dependent Connected Component processing. Since each Connected Component process has no history, it can have no knowledge of its neighboring wedges. Therefore, the ability to patch together boundary components must be left for down stream.

The small object filter addresses the fifth problem. Its purpose is merely to reduce the loan on the Merge process. Since the Merge process is not parallelized, this is one means to adjust the load.

Finally, an attempt has been made to produce a standard template for object features so that new features can be easily added and tested without disrupting the remainder of the code.

7.6.5 Suggested Improvements

A number of improvement in the Connected Components system would improve system performance. Some were known at development time but were not implemented in order to produce a working system quickly. Others became apparent upon studying system output. These improvements include the following:
1) Wedges should overlap for improved opening quality,
2) R.L.T. should be rescaled to have square pixels in components to objects,
3) Several binary object features should be added, and
4) Greyscale data should be passed for use in calculating greyscale features.

As discussed above, the assumption is made in the opening that the neighboring wedges consist of pure target. When objects on boundaries are reconstructed, this leads to distortions in shape. If surface wedges overlap by a few radials, the resulting openings will look exactly as if complete data was always available. This would constitute improvement 1.

Improvements number 2 would better the results of the components-to-objects process. In initial offline forms of the code, the closest distance between components was calculated from point-by-point comparison of the points along their chain codes. While highly accurate, this is remarkably inefficient. This method is approximated by checking if the enclosing wedges overlap. If they do, a number of dilations are performed on the two components, and the number of components in the result is checked. The number of dilations depend on a distrace parameter. The number of dilations is the distance parameter divided by the range cell size (This is rounded of course). The difficulty is that the amount of dilations in the cross-range direction is range dependent. This can be corrected by rescaling the r.l.t.'s involved so that the pixels are roughly square and then performing dilations.

Currently, the perimeter feature has been written and tested but has been removed from the real-time system for speed. This feature should be added to the real-time system as well as various shape descriptors, major and minor axis finders, and several other features. These would aid in bad drop reacquisition (see Merging and Scan-to-Scan Association) as well as several other goals such as heading determination. This could be achieved by more code optimization (difficult) or by purchase of faster hardware.

Finally, if the greyscale values available for target pixels (those pixels that are above threshold in Clutter Rejection), features relating to greyscale could be calculated. These include centroids at different thresholds, peak values, etc. This information would be helpful in multipath rejection and inclement weather handling.

7.7 Merging and Scan-to-Scan Association 7.7.1 Process Architecture

This executable module actually combines two separate processing stages. These two stages are the last in the Radar Surveillance sequence and must be performed serially. Rather than incur the overhead of "flattening" and "unflattening" involved in implementing them as separate processes, it was decided to have them co-reside in a single process. The first stage involves merging the parts of surface wedge boundary targets and adding them to a list also containing target internal to wedges. This list constitutes the new targets for the current wedge that will be made available for tracking. The next stage is the scan to scan association, which produces tracks. Each stage will be discussed separately.

7.7.1.1 Merge

The basic processing stages of the Merge stage are as follows:
I) Receive and unflatten lists for Connected Components,
II) Decide to process or queue,
III) Register wedge number,
IV) Add objects internal to wedge to new target list,
V) Attempt to match new boundary components to boundary components currently on unfinished list,
VI) Perform the Components-to-Objects procedures on targets finished in (V),
VII) Calculate features for objects found in VI, and
VIII) Add completed objects to new object list.

As described above, each Connected Components process output two lists. One contains the objects totally contained within the surface wedge of the packet and the other contains boundary components. In addition, the surface wedge as well as the time stamp for the wedge are sent. In step I, the Merge process chooses the oldest packet from all the Connected Component queues. This packet is unflattened and made ready for processing. In step II, we determine whether this packet is from the "current" scan or from the next scan (step III discusses incrementing scan numbers). If the packet is from the current scan and has not been seen before, processing continues. If it is from the next scan, the packet is enqueued awaiting completion of the current scan, and the next wedge is retrieved. If is from the current scan and has been seen before, an error if declared. Next, the wedge number is entered in the wedge list (step II). If this wedge completes the current scan, the wedge list is cleared. Further, if this is the first wedge of a new scans it is used to project a time boundary for the current scan. By splicing together all adjacent wedges seen earlier in sequence number and later in sequence number without gaps, the process calculates a maximal enclosing wedge for the current surface wedge.

The new target list is initially empty for each new wedge. At this point, all objects internal to the wedge are added to the list. A cumulative unfinished list for all boundary components not yet completed is kept. Steps V and VI are than calculated together. First, the Components to Objects procedure is performed with the unfinished list serving as the object list and the new boundary component list as the component list. The resulting objects are than sorted as either being within the maximal enclosing wedge or not. Those that are within the maximal enclosing wedge are removed from the unfinished list. Their features are calculated. They are then transferred to a the new target list.

When a target is cut by a wedge boundary, the above method puts both parts as components into a single object. This leads to an identical centroid and area, but is inappropriate for features such as perimeter.

7.7.1.2 Scan-to-Scan Association

In order to explain the basic engine for the San to Scan Association, the needed data must be described. As previously mentioned, lists of components from objects. Lists of objects from subsequent scans form tracks (hence they are lists of lists). A list of tracks that all meet a particular criterion is referred to as a "tracklist." The system currently maintains six tracklists, one of which is a list of tracks to be terminated in the current scan.

Starting with a list of new objects from the current scan, for each tracklist for which it applies, we proceed as follows:

1) A "Best match under threshold" process is applied to match objects to tracks. When a match takes place, appropriate track features are calculated.
2) Matched tracks are reported along with certain features to Sensor Fusion
3) Unmatched objects are collected for matching with the next list.

At the end of the scan the following operations are performed:

1) Promote tracks from one list to another, and
2) Extract certain track features, most notably position projection.

The tracklists are as follows:

1) High-confidence tracks,
2) Bad drop tracks,
3) Low-confidence tracks seen more than once,
4) Single-object tracks from previous scans,
5) Single-object tracks from the current scan, and
6) Dropped tracks.

List 1, 2 and 4 use the "best match under threshold" process for matching. The "best match under threshold" process takes as input a list of new objects from the current scan (some may have been removed by matching with previous tracklists) and a tracklist, The process proceeds as follows:

1) Take the next object off the list of objects to be matched. Call it O.
2) Set the min distance (M.D.) to infinity and set a pointer to the beginning of the tracklist.
3) Take the next track off the tracklist. Call it T.
4) Find the distance according to the match metric for the tracklist between the T and O. If it is above the threshold, go to 5. Otherwise, compare it to M.D. If it is greater than M.D., go to 5. If it is less, check if the latest entry in the track is from the current scan. If it is not, make a new distance the M.D. and save a point to this track. If it is , compare the distance of the new object to the distance of the current matched object. If the new distance is smaller, make it M.D. and save a pointer to it.
5) If there are not more tracks, continue. Otherwise, go to 3.
6) If M.D. is still infinity, then put the target on the unmatched list (to be passed to the next track list and go to 1. If M.D. is less than infinity, check if the best track has an entry from the current scan. If it does not, insert 0 into the track and report the track immediately. If it does, remove the current last object and put into the new object list, and then insert 0 into the track and report it immediately. Certain features for 0 are also calculated.
7) If there are no more objects, we are finished with the tracklist. Otherwise, go to 1.

In the above process, a track can be reported more than once in a single scan if multiple objects match it. The last report is the correct one. Also note that the distance metric is the geometric distance from the projected position to the object position. For most situations, the projection is simply a two-point projection. However, for two runways, a pier at the end of the runway leads to a high-clutter situation and a lower-gain filter for position projection is needed. Thus, when a target if line up with these runways and is over the pier, the projection is calculated from the average velocity from the last five sightings.

The features calculated from matched tracks include duration of track in number of scans, integrated distance of track from first sighting and whether this is over a threshold, whether the latest sighting is on a map of the "normal" movement area, both two-point and averaged velocity, and the aspect graph for the track.

As described in a previous section, an aspect graph is a table of aircraft features as a function of range from and orientation with respect to radar. Currently, the table has 18 entries at 10 degree spacing for orientation and a log distance scale with an entry for every doubling in distance. the only feature currently used in area. This aspect angle is based on the orientation of the velocity vector with respect to the radio from the radar to the centroid. Since the aspect angle calculated this way is unreliable for very slow moving or stopped aircraft, cells are only populated when the velocity is above low threshold. Also, for efficiency aspect graph entries are only calculated after the aircraft has passed the leading criterion.

7.7.1.3 Track Lists

The high-confidence track list contains those tracks whose integrated distance is above the threshold. These tracks are almost never caused by multipath. As described above, objects match this list unsigned the standard position-projection-based best-fit process. The bad drop list contains tracks that appear to have been dropped incorrectly. The criterion for this is discussed below in the section on transitions between lies. Best fit is not used here, and the first object that matches ta track is Chosen. We did this only for ease of implementation ad should be corrected. The match criterion between track and object is more complicated here. The aspect of the track in question records the last cell in which the aircraft was seen. To match the bad drop, a new object must satisfy the following:

1) It is close to the feature values of the last seen aspect graph cell, and
2) The new object is in the region covered by the surface map.

The next list (list 3) consist of tracks that have at least 2 sightings but have not passed leading. As described in the section on processes, leading is an accumulated travel distance threshold that a target must have traveled to be declared high confidence. It also uses projection-based best fit for matching. List 4 consists of tracks seen once in previous scans and matches to it also use projection based best fit. All objects that fail to match any of the other lists initiate their own tracks on list number 5. These lists are given track numbers that remain with the track for its lifetime.

At the end of each scan, tracks are allowed to transition between lists. If a high-confidence track has not been matched this scan, several tests are performed on its recent values. If the recent average velocity is below a threshold and the last two out of three hits are on the movement area, it is moved to the bad drop list. If it does not meet these criteria, it is position coasted for a few scans. Entries in a bad drop list track must "position-project" correct for several scans for the bad drop to be promoted to the high-confidence list. Low-confidence tracks in list 3 should pass the leading criterion to be promoted to the high-confidence list. A second sighting within a large (−130m) radius is all that is needed to progress from 4 to 3. List 5 is automatically promoted to list 4. Tracks that have run out of coasts or have gone beyond the bad-drop reacquisition time limit go onto the dropped list.

7.7.2 Output Data Description

The output consists of individual track updates. The data includes the following:
1) Track number,
2) Centroid (2-d),
3) Area,
4) Confidence (goes from 0 to 1 after passing leading), and
5) New and dropped track indication.

This is sent out for every target whether it has passed leading or not. Because of best fit, multiple reports for the same target may occur. With respect to bad drop, while the track is on the bad drop list, no reports are made.

7.7.3 Databases

The parameter database for the Merging and the Scan-to-Scan Association is larger than for the Connected Components process. It includes the following:
1) Area threshold,
2) Components-to-Object distance,
3) In-track projected position tolerance,
4) Search radius for second sighting,
5) Number of coasts for various situations,
6) Pier fix tolerances,
7) Equations and locations of pier,
8) Minimum number of scans for high-confidence tracks,
9) Minimum accumulated track length for high confidence tracks,
10) Minimum maximum distance from first signing for high-confidence track,
11) A file containing surface map,
12) Velocity range for the bad drop mechanism,
13) Aspect graph size and limits,
14) Number of radials in a packet,
15) Radar parameters,
16) The region is in which to search for bad drop reacquisition,
17) Timeout for bad drop, and
18) Fit parameter for features for reacquired targets.

Significant Problems/Solutions

The following are the most significant problems addressed in the scan-to-scan associated portion of the process:
1) Multipath targets,
2) Inappropriate drops,
3) Quick reacquisition of high confidence targets if dropped,
4) Capture of "important" targets by lower confidence tracks, and
5) Providing surveillance over the piers (high-clutter region)

We identify the multigraph targets primarily through the leadin criterion. This consists primarily of a threshold for the distance moved. However, the target should also have moved more than a minimum "max" distance from its initial sighting to prevent stationary objects with a small amount of dither from passing leadin.

Drops that take place on the movement area, that take place below departure velocities, and involved high-confidence targets are deemed to be inappropriate drops. This criterion quite accurately detects in appropriate drops. Once these drops are detected, it is important to reacquire them quickly (before forcing them to pass leadin again). This is accomplished by using the aspect graph to match features to the dropped target. In the initial stages of development, various features were analyzed for scan-to-scan consistency within a track. It was found that major discontinuities were found for even simple features such as area in regions where targets turned, and enormous longer-term variations were found as well. The reason for this is straightforward. Provided that an aircraft is constrained to the roughly two-dimensional surface of the airport, its return, neglecting ground bounce effects and shadowing, is dependent only on its heading and range. It was found that targets at about the same range and heading had very similar features, with the standard deviation being typically under 10%. using the features from the last cell of the aspect graph in which the target was seen seems to match the dropped target in many situations. Some exceptions include shadowing and a target that has turned significantly since the latest sightings.

It was also found that allowing all tracks to compete on an equal basis for new targets led to frequent "theft" or important in-track targets by new, low-confidence tracks. Clearly, this is so for first sightings since the association radius for these targets is quite large; but it was also found that if bad drops had "first crack" at the targets, some unmatched bad drops would latch on to subsequent aircraft. To minimize this, reliable tracks are matched first and only those targets that are not taken are made available to bad drops.

Finally, a low-gain filter is used for the piers to compensate for the degraded surveillance, using the assumption that targets fly straight over the piers.

Suggested Improvements

The areas for improvement include the following:
1) The concept of scan boundaries is rather artificial. If fits well with the Logan geometry where surveillance is provided for only about 180 degrees of the airport. However, it is unclear where to put the cut for an airport with the radar in the middle of the runway configuration. In addition, since processing for wedges from subsequent scans is suspended until the current scan is completed, it leads to suboptimal use of the processor.

2) While the process exists for splicing parts of aircraft cut by boundaries back together again for such features as perimeter, they must be sped up to be consistently real-time (faster hardware would do the trick as well).

3) ARTS information is fused with ASDE data downstream in the sensor fusion process. If ARTS information were provided directly to the ASDE processing, it could assist in such things as initial acquisition based on feature matching for a known aircraft type.

4) The aspect graph used currently for reacquisition is a dynamic aspect graph, i.e., it is calculated on the fly for a given aircraft. If an aircraft is lost in turn, the last-cell-seen aspect graph information will not be a good fit to the features of the turned aircraft. A library of aspect graphs of different aircraft would do much better in this respect. With ARTS, the correct aspect graph could be immediately accessed for arrivals. For departures, a fit to a sufficient number of cells could be used to match an aircraft to a library aspect graph.

5) The aspect graph boundaries are currently arbitrary, based on even heading divisions and even log range divisions. The boundaries of cells should be adaptive, depending on such things as the obscuration and illumination of scatters.

6) Currently the first bad drop list entry that is "close enough" to new target is matched to it. For isolated bad drops this is fine, but in crowded environments like the runup pad, best first should be implemented.

7) For more accurate fits, multiple features could be implemented for each cell of the aspect graph. Perimeter is available but its calculation takes too long for the current processor. Eventually, greyscale features should be used as well.

8) For the second sighting of an aircraft, since velocity information is not yet available, a large match radius is used. The number used is based on the maximum distance an object can move in a single scan. While this is a conservative assumption, it leads to many matches within the radius for which only the best fit is used. However, in certain areas of the surface, a much smaller radius should be used corresponding to lower maximum velocities.

9) While most multipath is a result of aircraft-to-aircraft (or ground vehicle) reflections, some involve reflections off of fixed targets like buildings. Mapping these multipath sources would allow us to quickly eliminate them.

7.8 SCIP Interface 7.8.1 Subsystem Architecture

As we mentioned in the System Overview, the SCIP interface consists of two parts. The first part, ADIDS-SCIP, executes on an IBM PC-compatible computer and extracts the information flowing across the ASR-9-SCIP-to-ARTS-IOP interface and sends it out to serial interface or modem. The second part, SCIP-receiver, executes on a UNIX workstation and receives the SCIP information and makes it available to other processes on the same machine or connected via a network.

ADIDS-SCIP has two execution threads. The first thread is interrupt driven. It pulls the data in from the ARTS interface hardware, checks parity and framing, applies the geometric and message-type filters, and for messages that pass the filer, it adds a 32-bit header and sends the message to the serial interface. The second thread receives the commands from the serial interface, detects loss of incoming data to allow automatic SCIP port switching, and updates the local display of message statistics.

ADIDS-SCIP receives the following four message types from the ARTS: beacon target messages, radar only target messages, sector messages, and alarm messages (which include a heartbeat message delivered once per scan). The format of these messages is discussed elsewhere. The messages can be filtered based on the following:
- message type (all messages),
- min/max range (beacon and radar only messages),
- start/end azimuth (beacon and radar only messages), and
- min/max altitude (beacon messages), The output message format is identical to the input except that a 32-bit header is added and the parity bits (bits 30 and 31) of the data are cleared. The header has the following format:
- bits 30 and 31 set (output framing marker),
- bit 29 set if input from SCIP port B, otherwise cleared,
- bits 22–28 are a 7-bit ASCII message type code —'B' for beach, 'R' for radar only, 'S' for sector, and 'A' for alarm, and
- bits 0–21 are a 22-bit integer time-stamp representing the number of DOS clock ticks since midnight (approximately 18.2 ticks per second).

The client of ADIDS-SCIP can issue commands to perform the following:
- set minimum or maximum range or altitude,
- set the start and end azimuth,
- set the time-stamp clock,
- set which of the four message types should be sent or suppressed,
- request which SCIP port to listen to,
- turn on data transmission (password protected), and
- stop data transmission (also occurs automatically when the connection is via a modem and the Data Carrier Detect, DCD, signal is lost).

The SCIP-receiver receives messages from ADIDS-SCIP via a modem connection, reformats the data, and acts as a server to make the data available to other processes. SCIP-receiver has four primary functional elements. The first element interacts with the modem to establish the connection to ADIDS-SCIP and sends a sequence of client commands to initialize the ADIDS-SCIP filtering parameters and the time-stamp clock. The second element performs framing and reads the first two 32-bit words of a message (the header word and the first word of data). Framing is based on the two marker bits of each words (bits 30 and 31), a valid message type, and any required set or cleared bits in the first word of ARTS data (second word of message). The second element also checks that the time-stamp is within 1.5 seconds of the master-clock time and sends ADIDS-SCIP a time command if it is not. The third element processes beacon messages. It reads the remaining two 32-bit words and, for messages with valid mode-A codes, it unpacks the range, azimuth, mode-A code, and altitude fields into standard floating point and integer representations and performs unit conversions. It then passes the re-formatted data on to the interprocess communication software for transmission. The fourth element is responsible for the actual reading of the data from the modem. It is designed to detect the loss of the modem Data Carrier Detect signal or the loss of incoming data. When the loss of the modem Data Carrier Detect signal is detected, the first element is involved to re-establish connection and re-send the client commands (including the transmit command). When the loss of data is detected, the sequence of client commands is re-sent to command ADIDS-SCIP to transmit. In both cases, the complete sequence of commands is sent in case ADIDS-SCIP has been re-started.

7.8.2 Output Data Description

Table 7.8.2 below shows the SCIP-receiver output message fields.

TABLE 7.8.2

SCIP-Receiver Output Message Fields

| Field | Comments |
|---|---|
| mode-A code | only targets with highest mode-A code confidence are passed on |
| range | meters (floating point), resolution is 1/64 nmi |
| azimuth | radians (floating point), resolution is 1/4096 of a circle, 0 azimuth is magnetic |
| altitude | feet (floating point), resolution is 100 feet |
| altitude valid flag | boolean, 0 = > false, non-zero = > true |
| time | seconds (floating point), based on the master-clock |

Range and azimuth are relative to the radar with zero azimuth typically aligned with Magnetic North. These messages are only sent when a beacon message is received and the message's mode-A code confidence is high.

7.9 MDBM Interface 7.9.1 Subsystem Architecture

The MDBM interface is structurally very similar to the SCIP interface. It consists of two parts. The first part, ADIDS-MDBM, executes on an IBM PC-compatible computer and extracts the information flowing across the ARTS-IOP-TO-MDBM interface and sends it out to a serial interface or modem. The second part, MDBM-receiver, executes on a UNIX workstation to receive the information and make it available to other processes on the same machine or connected via a network.

ADIDS-MDBM has two execution threads. The first thread is interrupt driven. It pulls the data in from the ARTS interface hardware and places it in a ring buffer. Command words and data words are received from the hardware separately, but are placed into the same internal buffer with an extra marker word included to flag IOP-MDBM commands words. This marker word is used to find the first command word when performing input data framing. The second thread is a continuous loop. It extracts the data from the ring buffer, and checks parity and framing. Because the data flowing from the IOP to the MDBM only represents MDBM memory updates, the main thread must emulate the internal memory of the MDBM and the MDBM memory-update process. After a section of emulated memory has been updated, the main thread applies the geometric and message-type filters to each updated message, and for messages that pass the filter, it adds a 32-bit header and sends the message to the serial interface. Between each memory update sequence, the main thread handles the receipt of commands from the serial interface and updates the local display of message statistics. The serial interface is also checked whenever the input ring buffer is empty because there is often a delay between the arrival of command words and the data words.

ADIDS-MDBM processes the following four message types from the IOP: full data block, altitude (limited) data block, MSAW data block, and single symbol data block. The format of these messages is discussed elsewhere. The messages can be filtered based on the following:

message type,
DBM number (all unsuppressed messages),
DBM number (full and MSAW data block, regardless of suppression),
min/max X coordinate, and
min/max Y coordinate.

The output message format is shown in Tables 4.2a–d except that a 32-bit header is added and the parity bits (bits 30 and 31) of the data are cleared. The header has the following format:

bits 30 and 31 set (output framing marker),
bit 29 set if input from MDBM port B, otherwise cleared,
bits 26–28 are an 8-bit integer representing the DBM number,
bits 22–25 are the low order 4-bits of an ASCII message type code—'F' for Full, 'A' for altitude, 'M' for MSAW, and 'S' for single symbol, and
bits 0–21 bit integer time-stamp representing the number of DOS clock ticks since midnight (approximately 18.2 ticks per second).

The client of ADIDS-MDBM can issue commands to perform the following:

set minimum or maximum X or Y coordinate,
set which of the four message types should be sent or suppressed,
set the time-stamp clock,
turn on data transmission (password protected), and
stop data transmission (also occurs automatically when the connection is via a modem and the Data Carrier Detect (DCD) signal is lost).

The MDBM-receiver receives messages from ADIDS-MDBM via a modem connection, reformats the data, and acts as a server to make the data available to other processes. MDBM-receiver has four primary functional elements. The first element interacts with the modem to establish the connection to ADIDS-MDBM and sends a sequence of client commands to initialize the ADIDS-MDBM filtering parameters and the time-stamp clock. The second element performs framing and reads the first two 32-bit words of a message (the header word and the first word of data). Framing is based on the two marker bits of each word (bits 30 and 31), a valid message type, and six required set bits in the first word of full, MSAW, and altitude data blocks. The second element also checks that the time-stamp is within 1.5 seconds of the master-clock time and sends ADIDS-MDBM a time command if it is not. The next element processes each message, For altitude, full, or MSAW data block messages, it reads in the remaining B word and C words and decodes the characters in the C words to from 1, 2 or 3 strings respectively that represent the 1 to 3 lines of text in a DEDS data tag. These strings are parsed to extract a heavy weight indicator and, for full and MSAW data blocks, flight id and aircraft type. Since the air craft type field is shared with controller-entered scratch pad information, the aircraft type is check for validity against a database of valid types. The coordinates in the B words are converted from their 1's complement representation to floating point and from 1/16 nmi to meters and the symbol TI code is converted to an ASCII character. The process message element then passed the re-formatted data on to the interprocess communication software for transmission. The fourth element is responsible for the actual reading of the data from the modem. It is designed to detect the loss of the modem Data Carrier Detect signal or the loss of incoming data. When the loss of the modem Data Carrier Detect signal is detected, the first element is invoked to re-establish connection and re-send the clients commands (including the transmit command). When the loss of data is detected, the sequence of client commands is re-sent to command ADIDS-MDBM to transmit. In both cases, the complete sequence of commands is sent in case ADIDS-MDBM has been re-stated.

7.9.2. Output Data Description

Table 7.9.2 shows the MDBM-receiver output message fields.

TABLE 7.9.2

MDBM-Receiver Output Message Fields

| Field | Comments |
|---|---|
| X and Y position | meters (floating point), resolution is 1/16 nmi, Y axis aligned with magnetic north (SCIP 0 azimuth) |
| flight id | UAL1234, N123AB, etc |
| flight id valid | boolean, 0 = > false, non-zero = > true |
| aircraft type | B727,DC9, etc. |
| aircraft type valid | boolean, 0 = > false, non-zero = > true |
| heavy weight class | boolean, 0 = > false, non-zero = > true |
| heavy weight valid | boolean, 0 = > false, non-zero = > true |
| control position | letter designating the control position for the target |
| ctl. pos. valid | boolean, 0 = > false, non-zero = > true |
| dbm number | 0–7, which dbm is showing this information |
| tag direction | NE, SE, SW, NW |
| tag line 0 | string for MSAW/CA line of ARTS data tag |
| tag line 1 | string for identification line of ARTS data tag |
| tag line 2 | string for altitude and speed/type/scratch pad line of ARTS data tag |
| time | seconds (floating point), based on the master-clock |

Most of the fields in the message have associated validity flags because not all message types provide each piece of information and because some pieces of information time-share the same position in an ARTS data tag.

7.9.3 Databases

The MDBM-receiver uses a database of valid aircraft type codes to assure that all aircraft types passed from the data block information are valid. This database is an ASCII file containing all the (currently 597) valid codes that are separated from each other by spaces, tabs, and/or carriage returns.

7.10 Sensor Fusion Software

First the command line arguments are processed. They consist of a list of all the configuration files that are to be used and the time offset. The time offset is the difference in the time between the ASDE radar and the ARTS radar. Then the airport file is read in. A description of the airport file can be found in the safety logic section. The only information that is used by the sensor fusion is the origin. Next all of the configuration files are red in. These files describe the different radars and their positions. They also describe the filters that are applied to the different kinds of reports. The information about filters is detailed in the filter section.

The rest of the process is event driven. There are two types of events, one is time based. According to a time input parameter, all the tracks are checked. If any are stale they are coasted. And if a coasted track is too old, it is deleted.

The other type of event is whenever a radar sub-track comes from one of three sources, the ASDE processor, the ARTS Radar SCIP tap or the ARTS Radar MDBM tap.

MDBM reports that do not have any valid fields are discarded. The ones with something valid are compared with all the un-fused SCIP reports. If any of them are within a certain distance (defined in a configuration file) the two reports are fused into an ARTS sub-track. If no match is found, the MDBM report is discarded.

When an ARTS sub-track is received, it is first checked for multi=path rejection. Each sub-track must fit in a specific time/range window with respect to the previous report. If it doesn't, then a determination of which report was the multi-path. If it was this report, then it will not be sent on. If it was the previous one, that report will be backed out. A report could also be determined to be multi-path because of its position in respect to the previous report, if it is too far away, then it is discarded.

If the ASDE sub-track that is received is a corrected report, the previous report is backed out.

Backing out a report consists of restoring the previous state of position estimate, velocity estimate and acceleration estimate. It also resets the validity flag for velocity and acceleration if necessary. And the track length is decremental.

All ARTS sub-tracks that aren't multi-path reports and ASDE sub-tracks then have an Alpha-Beta-Gamma filter applied to them. This projects the track's position, velocity and acceleration. Then any appropriate geographical pre-fusion filters are applied to the subtrack (e.g., ASDE filters to ASDE reports and ARTS filters to ARTS reports).

If the sub-track is already fused and the ARTS sub-track isn't too old, the code verifies that the sub-tracks should remain fused. This is done by computing the distance square and the acceleration squared between the two sub-tracks. If either one is too large or the acceleration squared is within parameters, but the distance squared is to large, they should be un-fused. Un-fusion consists of creating a new track and putting all the ARTS radar information onto one of the tracks and all of the ASDE radar information onto the other track.

If the sub-track (ASDE or ARTS) is not used and it is a new track (the track length is less than an input parameter) then the code checks all other tracks for fusion. If the sub-track is an older track, then the only other tracks that are checked are tracks the sub-track fused with in the past.

To check for fusion the current sub-track is checked against every un-fused sub-track from the other radar source. The distance squared between the two reports is computed. If it is less than an input parameter, it is tagged as a possible match. Then all targets on the coast list are also checked. If more than one other could be a match, no match is made. If only one possible match was found, the code makes a reverse check. It checks the report from the other radar source with everything from the current sub-track radar source. It must find only one possible match, and that match must be the current sub-track. If that isn't the case, no fusion is made.

Fusion checks that one track has a bus-track from the ARTS radar and the other track has a sub-track from the ASDE radar. The all the information from the shortest track is moved to the longest track. The velocity and acceleration are set depending on which track has the associated validity set to true. If one track is blessed, then the combined track is blessed. And finally the track that was the shortest is discarded.

After the fusion is made, the resulting track needs to have its acceleration and velocity set based on the value of the two sub-tracks. If the ASDE sub-track has a valid acceleration, then the ASDE sub-tracks acceleration and velocity will be transferred to the track. If the ASDE sub-track does not have a valid velocity, then use it, otherwise use the ARTS sub-tracks velocity. If the sub-track was un-fused earlier, then the post-fusion geographical filter is applied to the track. If the track was filtered out, and was previously sent to the safety logic, a suspend message is sent. Otherwise nothing was done.

If the track was not un-fused previously then if there is a recent ASDE report, then all the information from that sub-track is transferred to the track report. If there was a recent ARTS report information from that sub-track is transferred to the track report. If there was a recent ARTS report, then all the information from that sub-track is transferred to the track report. If there isn't a recent ARTS report and there is a possibility that there might have been a track swap, then all the ARTS data is cleared. Then the post-fusion geographical filter is applied to the track. If it was filtered out, and it was sent to the safety logic before, a track suspend message is sent. If it was not filtered out, the track is sent to the safety logic.

This is the data dictionary for the sensor fusion to safety logic interface.

Unique Track ID—(track_id_p) A unique identifier (for each scan) assigned to the target. The definition shall be able to differentiate a minimum of 256 targets. This will be typedfed to TrackID and will be an unsigned long.

Time of Measurement—(time_of_meas_p) The latest measurement time of any sensor used to derive this target estimate. Units:Seconds referenced to ASTA system time.

Track Initiation Flag—(initial_track_ind) Binary Indicator: TRUE if this target was acquired on current scan, FALSE if target was acquired on a previous scan.

Track Drop Flag—(track_drop_ind) Indicates that the previous tracker output for this target was the last, the tracks is being removed from the track list.

Suspend Flag—(track_suspend_ind) Binary Indicator: TRUE if this target is being suspended, but not dropped.

Surveillance Data Source—(surveillance_source) Indicates source of surveillance data. Initial possibilities include: ASDE-3 primary radar, ARTS/ASR primary surveillance, ARTS/secondary surveillance, Coast (no surveillance data).

Track Swap Possibility Flag—(track_swap_possibility_ind) Binary Flag set to TRUE if there is a possibility that the track could have been swapped with another track.

Heavy Weight Class Indicator—(heavy-weight_ind) A binary flag indicating whether the aircraft is designated "heavy" (gross takeoff weight exceeding 300,000 pounds), as reports by ARTS, if unavailable.

Is Simulated Flag—(is_simulated_ind) Indicates whether the target is a true or simulated target.

Real Target Reliability—(real_target_reliability_p) Probability that the current target is a target of interest. 1 if definitely a target of interest, 0 if definitely not.

Track Length—(track_length_p) The total number of surveillance measurements over a parameter track integrity confidence level which were assigned to this track.

Coast Length—(coast_length_p) The total number of surveillance measurements over time which the target is in coast mode. Reset to O every time the target is re-acquired.

Position—(position_p) North/East position in feet relative to the ARP.

Velocity—(velocity_p) North/East velocity estimate.

Velocity Valid Flag—(velocity_valid_p) A flag to indicate whether the velocity is valid or not.

Creep Velocity—(creep_velocity_p) North/East velocity estimate of the aircraft if it is below an input parameter.

Creep Velocity Valid Flag—(creep_velocity_valid_p) A flag to indicate whether the creep velocity is valid or not.

Acceleration—(acceleration_p) North/East acceleration estimate.

Acceleration Valid Flag—(accel_valid_p) A flag indicating whether the acceleration is valid or not.

Position Uncertainty—(position_uncertainty_p) An estimate of the deviation in position.

Velocity Uncertainty—(velocity_uncertainty_p) An estimate of the deviation in velocity.

Acceleration Uncertainty—(acceleration_uncertainty_p) An estimate of the deviation in the magnitude of the acceleration vector.

Track Source—(track_source_p) An enumerated type that indicates the kind of track, it can be either ASDE, ARTS, Firmly Fused, Tentatively Fused, or Coated.

Target Extent—(track_extent_p) Four numbers (Ahead, Behind, Left, Right) in feet centered on the centroid position and relative to the heading.

Centroid—(centroid_p) ASDE reported North/East position in feet relative to the ARP.

Heading—(heading_p) An estimate of the instantaneous target heading. Units: Radians Clockwise from true North.

Target Extent Uncertainty—(target_extent_uncertainty_p) The uncertainty of the target extent in each of the four directions.

Heading Uncertainty—(heading_uncertainty_p) Estimation of error in the heading, similar units as the heading.

ASDE Track ID—(ASDE_track_id_p) An unsigned long that is the ASDE Track ID as defined by the ASDE radar processing, if available.

Altitude—(altitude_p) Aircraft altitude as reported by on-board Mode C or Mode S transponders, if available.

Altitude Valid Flag—(altitude_valid_p) A flag that indicates whether the altitude is valid or not.

Mode A Squawk Code—(node a squawk_code_p) The current Mode A squawk code as reported by ARTS, if available.

Ground Speed—(ground_speed_p) The current ground speed as calculated and reported by ARTS. To be used by the BRITE.

Aircraft Identification—(aircraft_id_p) Flight ID as reported b y the ARTS, if available. A string of 8 characters, 7 data characters with a Null terminator.

Aircraft Type—(aircraft_type_p) The type of aircraft, if available. A strong of 5 characters, 4 data characters with a Null terminator.

Control Position Assignment—(control_position_assignment_p) Controller assigned to this target. A character.

7.11 The Surface Monitor Module 7.11.1 Introduction

This section describes the surface monitor, which is responsible for implementing the rules described earlier in the Safety Logic chapter. First, the surface monitor products will be described. These include status light commands, alert message, diagnostic aids, and approach messages. Next, the architecture will be detailed. As an object-oriented, event-driven system, the surface monitor does not easily lend itself to a classical description of sequential data transformation; to get a sense of the system the important relationships between high-level objects must be understood. The architecture description will begin with a very general outline of what happens when a target report is received from Sensor Fusion. After this context has been supplied, the high-level objects will be presented and described in some detail. Design decisions will be explained as necessary.

The two databases that give the surface monitor a large measure of site independence and configurability will then be described. The first one, the Surface database, will be briefly described while the second one, the Safety database, will be taken in greater detail since its specific function is to allow surface monitor configuration. The mechanisms for configuration-dependent parameter specification will be explained here.

At this point the current implementation will have been described in moderate detail. A discussion of the design goals will then be presented. The purpose of this discussion is twofold: first, it demonstrates how and to what degree the architecture supports those goals. Second, it will be useful for anyone considering implementing such a system to compare their goals to these. It may be that some of the goals would not be applicable in a different context, and in such cases a different approach may be warranted.

7.11.2 Surface Monitor Products

The surface monitor runs in a distributed client-server environment, and has roles as both a client and a server. This section will briefly describe its client role, and will then focus on detailing the services it provides other system process.

The surface monitor is a client of the sensor fusion process, which is the source of all received target data. Sensor fusion is essentially responsible for presenting seamless coverage of targets tracked by a variety of sensors. It merges the multiple data streams and performs parameter estimation, providing such target attributes as position, velocity, acceleration, heading, altitude, etc. The product of the sensor fusion module is a track report (encapsulated in an object called TrackReport), which contains all received and derived parameters for a target and represents a single sampling event in that target's history. For a full description of the track report see the Sensor Fusion chapter of this document.

The four separate servers operated by the surface monitor are used to drive displays, models, and audible devices. The clients of these servers include the ASDE display process, the Alert Monitor process, and the Light Governor process. Any combination of clients (including multiple instances of them) may be present when the surface monitor runs.

The simplest service is the status light service. This contains messages that indicate what state a given light on the airport surface should be in, and includes both Runway Entrance Lights and TakeoffHold Lights. The contents of the message are simply a light ID (as read from the safety logic database) and the current state of the light (ON or OFF).

The alert message service contains more information and is slightly more complex. It includes a runway name, an alert ID, up to two target IDs, a priority level, a time, and an operation field. The runway name is self-explanatory. The alert ID is obtained from the safety database and maps to a predetermined text message (e.g., "Warning: arrival conflict. Traffic stopped on runway"). The ID is simply a means of sending smaller messages over the network. The target IDs represent the target(s) involved in the alert. The priority level is not currently used by anyone, but could be used with a device that supported pre-emptive processing. The idea behind this is that a message warning of a relatively benign situation could be interrupted by a message signaling a need for immediate attention. The time is used to define the order the alerts were issued in, and the operation field indicates whether the alert is being added (a new alert) or removed (the situation was resolved).

The approach message service consists of messages about targets determined to be on approach to runways. This is used by the display program to maintain the approach bar, a display enhancement that displays the position of a target on approach relative to the outer marker and the runway threshold. The approach message contains the runway name, the target ID, the position of the target, a drop target indication, the runway status, and the distance of the target from the threshold. The runway name and target ID are as in the alert message. The target position is a point in meters north and east of the airport reference point. The drop indication, when set, indicates that the target is no longer considered as being "on approach." The runway status is one of the following: Primary, Secondary, or Unambiguous. This is determined by the surface monitor when it attempts to figure out which runway the target is approaching (this is not always obvious). If the target could be on approach to more than one runway it "ranks" the possible approaches and labels the most likely as the "primary" approach. Thus, Primary refers to an ambiguous projection on the most likely runway. Secondary refers to an ambiguous projection onto a runway other than the primary runway, and Unambiguous refers to a projection where only a single runway is involved. The distance from the runway threshold is measured along the target path. For targets on approach, this could be straight line, a curve with a single arc, or an S-curve. This determination is done by the surface monitor, which provides the length so the client can accurately display a distance from the threshold.

The final service provided by the surface monitor contains a target "snapshot." This was developed as a diagnostic tool and has proven to be very valuable in understanding and demonstrating the surface monitor operation. A target snapshot contains a summary of the surface monitor's prediction of target behavior. As will be described in detail below, the surface monitor estimates target state and performs prediction of where the target could be some t seconds into the future. Actually two predictions are made: one in response to the question "Where could the target be?" (the maximum possible path), and the other in response to "Where must the target be?" (the minimum possible path). The target snapshot contains the target state (e.g., STP, TAX, DEP, etc.) and two "trees" denoting the minimum and maximum possible paths. These are used by the display process to graphically depict what the surface monitor is doing.

7.11.3 Architecture Overview

The surface monitor is an object-oriented application. It consists of a main program and some 60 native classes, totaling approximately 28,000 lines of C++ code. The application currently runs on Apollo, HP, and Sun platforms; to date porting it has simply required compiling it on the target machine.

The surface monitor accepts target reports from the Sensor Fusion module and produces status light commands, alert messages, and approach bar messages. This is accomplished by the interaction of the software objects, which are abstractions of real-world objects and concepts. Examples of software objects are TakeoffHoldLight, Runway, and AlertMessage. In this document the generic real-world object will be lower case, while the software construct will be capitalized. For example, a reference to a target will mean some aircraft or vehicle operating on the airport surface, while a reference to a Target will mean the software construct and its associated state variables and methods. An effort has been made to name the objects meaningfully; often the abstraction they represent is obvious from the name.

In this section a brief, high-level description of the events that occur when a Track Report is received from the Sensor Fusion module is given. Up to a point these events are ordered and the invocation of certain functions is predictable. After this the events that occur do so as a result of the target's predicted behavior, and it is no longer possible to list them "in order of occurrence." Certain of the objects used by the surface monitor are named here with little or no explanation. A detailed description of each one will be presented in the next section.

The surface monitor maintains a table of Target objects, each one corresponding to a unique target track as determined by the Sensor Fusion module. Each time a Track Report is received, the Target is updated with the Track Report (if no Target exists for that Track ID a new one is created).

The Target first locates itself on the airport surface, determining in which PropagationCell(s) it resides. As will be explained, the airport movement area and approach area are blanketed with a grid of irregular polygons, each of which marks the boundaries of a PropagationCell. As part of its setup procedure, the surface monitor determines the connectivity of these cells by building a directed graph.) The locating is performed with the help of a CellLocator object, which contains rules about how the search of PropagationCells should be ordered.

After a target has located itself, it determines its current TargetState using a state machine embedded in the Target object. (A TargetState is one of eight specific operational conditions that any Target must be in: STP, TAX, DEP, etc. Refer to the Safety Logic chapter and appendix for a detailed description of the state transition rules.) Before entering the state machine, however, it must determine if any state transition thresholds will be locally overridden by a high-level object with an interest in the target. For example, the default speed value that must be exceeded for transition from TAX to DEP is 50 kts. This prevents many hi-speed vehicles from being declared "departures" all over the airport. On active runways, however, where departures are expected, the value is reset to 37 kts. This threshold is thus overridden by the active runway. (A priority scheme is assigned to all high-level objects that might seek to override thresholds, since at some points on the surface two or three contending objects will each attempt to do so.) The mechanism by which this is accomplished will be described below. The state machine is then invoked and the target TargetState is determined.

Using its new TargetState, the Target then loads a set of performance parameters that will be used in predicting its behavior. These TargetState-dependent values include acceleration and deceleration, velocity thresholds, and lookahead time to determine the prediction time horizon.

The target then inserts itself into the PropagationCell in which it is located. This causes the PropagationCell to initiate the prediction process, which proceeds in a breadth-first manner through the directed graph of cells until the edge of the graph is reached or the prediction lookahead time is exceeded. Briefly (the prediction process is described in detail below), each PropagationCell participating in the prediction process locally stores information concerning the Target's path through itself. It also asks the Target to add it to the list of cells that the Target is predicted to traverse (the TargetPath). When the prediction process is complete, control is returned to the Target object.

The Target then requests that each PropagationCell contained in its TargetPath notify any high-level client objects about the new prediction information. This notification could take the form of a "removal" message (i.e., the Target is not longer predicted through this cell and the cell is being removed from the TargetPath) or an "update" (indicates new or potentially altered prediction information is contained in the cell). There is a simple reason for waiting until prediction is complete to perform notification, rather than cell by cell as it progresses: a high-level object might be notified many times (by many different cells) of the target's presence. By waiting until prediction is finished, the entire TargetPath is placed at the disposal of the object, which can then perform its task on the first instance of notification and disregard any further notifications arising from that particular prediction.

The notification process is what causes the safety logic rules to be invoked, and the Target, TargetPath, and PropagationCells contain the information used by the rules. Currently, the following high-level objects register with the PropagationCells that they overlap for notification: Runways, TakeoffHoldLights (THLs), RunwayEntranceLights (RELs), and ArrivalAlerts.

The Runway object has special status among notification client objects in that it must be notified before any others. This is because the remaining objects may need to query the Runway about the status of the Target relative to that runway. For example, a THL may want to know if a Target "satisfies REL conditions" for a particular runway. This temporal dependency is not well documented—the Runways are guaranteed to be created and registered before any other objects because of the order in which the objects are initialized.

Each high-level "notifee" invokes its own set of logic rules. For example, a REL notified of a Target prediction will check if the target is along the runway it is monitoring. It will also use the TargetPath to compute when the Target is predicted to enter and exit its area of interest (its "ActivationArea"). Based on these and other checks, it decides what its state should be and sets itself appropriately. It then ignores subsequent notification events generated by the Target for that Track Report. Similar action is performed by the THL's ArrivalAlerts, and Runways.

The high-level objects themselves are not completely independent of each other. For example, Runways may unconditionally set the state of a REL to "ON" when certain conditions are met (i.e., the Whole Runway Switch is on—see Safety Logic chapter). To handle these interdependencies some objects will register with each other. In fact, it is usually true that objects overlapping runways will register with the Runway as well as the PropagationCells from which notification if desired. There is another reason for this: Runways provide a convenient and natural way to set airport-configuration dependent parameter values. For example, under VFR conditions some constraints may be relaxed on active runways. Setting these parameters "for the entire runway" is easier and more intuitive than doing so for each individual object.

7.11.4 Surface Monitor Objects
7.11.4.1 High-Level Objects

There are approximately 60 classes of objects defined and used by the surface monitor. Perhaps another 100 or so "utility" classes are present as well, making a complete class diagram an unwieldy document to decipher. Fortunately, to gain an adequate understanding of how the surface monitor operates less than a dozen of these classes need to be examined in any detail. Most of these classes have been mentioned in the above operational summary; a full list appears here. Each of these classes will be described in some detail in this section. The high-level object classes used by the surface monitor are as follows:

| | | |
|---|---|---|
| RunwayEntranceLight | TakeoffHoldLight | Runway |
| Target | PropagationCell | SurfaceGraph |
| ExitPoint | CellLocator | ArrivalAlert |

The collection of objects that performs target path prediction and notification is sometimes referred to as the Prediction Engine. This collection includes PropagationCells, ExitPoints, the CellLocator, and the SurfaceGraph. The Prediction Engine generates the events that cause the higher-level objects to invoke the safety logic. Additionally, these "clients" of the Prediction Engine can query the PropagationCells to obtain further information about the target's predicted path should they require it.

7.11.4.2 Target

The Target is an abstraction of targets seen in the airport surface environment. One Target object is maintained for each unique track monitored by the Sensor Fusion module. A Target is created upon receipt a new Track Report and subsequent Track Reports are used to update the Target.

The Target interacts with many other objects and exports a variety of methods to give client objects access to its internal state and to modify that state. Each Target object maintains a list of internal attributes that define its state. This list includes the following:

1. All estimated parametric values supplied by Sensor Fusion (e.g. acceleration, velocity, position, altitude, valid altitude flag, valid velocity flag, etc.).
2. A number of attributes describing its location including a list of PropagationCells, whether it is unambiguously located (Targets may occupy more than one approach zone PropagationCell simultaneously), whether it is inside the airport region, whether it is "along" a runway, and others. These are derived and sometimes set by external objects via exported Target methods.
3. A number of attributes pertaining to TargetState, including current and previous TargetState, whether it has landed, whether it is dropped or suspended, its initial acquired TargetState, and a list of MarkTags maintained as a convenience for client objects. These tags are used when a client desires to "mark" the particular target for any reason, and remain set until the TargetState transitions from its current value. For an example of this see the TakeoffHoldLight object description. One simple but important state variable is the Target iteration stamp. This is an integer that is initially set to 0 and incremented on receipt of each subsequent Track Report. Client objects use this stamp to determine if the prediction they are being notified of is a new one or one that has already been processed.
4. A list of PropagationCells that form the Target's current predicted path.
5. A TargetPath object containing PathSamplePoints defining the Targets current predicted path. This is only created from item 4 if a TargetSnapShot is requested. A PathSamplePoint is a tuple containing <position, velocity, acceleration, timestamp> information, and a TargetSnapShot is a list of segments defining the target's path (currently exported to the display module to observe the dynamic performance of the system).
6. An optional TargetTrace object. A TargetTrace is a packed summary of the Target's internal state that is recorded to a disk file on each update. If recording is enabled, the most recent TargetTrace is retained to help build the next one. The TargetTrace records differences in Target state from one update to the next, so the current one is always retained.
7. A TransitionValueBlock, which contains and manages the state transition values for each Target. These are initially loaded from the Safety database. There are currently 13 state transition threshold values specified by the Safety Logic. The TransitionValueBlock manages each of these as a 2-item stack, where a stack entry consists of a transition value and a transition priority. Initially the stack is loaded with the default value and priority. Any client object wishing to override a transition value must present a higher priority than the current value. If this happens, and the current value is the default value, then the default is pushed onto the stack and the new value/priority pair becomes the current value. If more than one client object attempts to override the value, the one with the higher priority wins and the loser is discarded. If more than one client with equal priorities attempts to write the same value, the first one wins. (Note that this implicitly favors the Runway object since, as in notification, it will always be the first one solicited.) The stack for each value is reset at entry to the state machine on each update, just before override solicitation. Currently Runways and TakeoffHoldLights will sometimes attempt to override transition values.

The transition override is initiated as follows: when a high-level object that might want to override a transition value is created, it registers for transition override consideration with each PropagationCell intersecting the area it is interested in. When a Target request overrides from a PropagationCell, the cell in turn passes the request off to each object that has registered with it. Note that not every registered object will attempt to override the value each time it is asked. Consider a PropagationCell lying on a runway. In this case it will have at least two client objects registered for transition override-one runway in each direction. When a Target traveling along a runway solicits overrides, it will be ignored by the runway going in the opposite direction. Only the runway it is traveling along will respond with an override attempt if it has one.

8. A PerformanceValueBlock containing one entry per TargetState. Each entry contains values for acceleration, deceleration, velocity threshold, and prediction lookahead time. The Target loads the appropriate values after computing its state and before requesting insertion from a PropagationCell. The PropagationCells access these values via exported methods in the Target class, 9. A CellLocator object used to generate a list of PropagationCells in which the Target is located. Although currently cells on the surface of the airport may not overlap, approach area cells may overlap each other and ground cells. The CellLocator contains logic to optimize the search for occupied PropagationCells.

The Target is primarily responsible for locating itself, computing its TargetState, maintaining its path list, and making relevant state information available to requesting client objects. Additionally, it maintains a "marking" service for client objects. The marking service allows an external object to place a state-dependent tag on the target, which is guaranteed to be cleared when the target transitions out of its current state. This service is used by RunwayEntranceLights, TakeoffHoldLights, Runways, and ArrivalAlerts for various reasons. The Target itself is a client of the CellLocator.

The Target state machine is part of the Target object. This is a finite state machine that implements the state transitions described in the Safety Logic chapter. Hysteresis is accomplished by applying different state transition rules to enter and exit a state. The transition thresholds and transition rules will not be described here. The state machine includes a simple cycle check (based on a transition count), and if a cycle is detected the state does not change. It is believed that cycles have been prevented by transition threshold checks, but this has not been formally shown. This is problematical because several client objects will override transition thresholds. The dependencies between transition thresholds are enforced whenever appropriate. For example, if a client lowers the threshold governing transition from STP to TAX (vstop+) the threshold from TAX to STP will be forced to a value less than this. These constraints are automatically enforced in the TransitionValueBlock class, which manages the transition threshold values for the Target.

7.11.4.3 SurfaceGraph

The RSLS safety logic relies on an interconnected network of autonomous PropagationCells to perform target projection. In addition to projection, these cells are responsible for retaining local information about the projection, coordinating state transition threshold overrides, and generating the events that result in status light operations. The network of cells is organized into a directed graph covering the airport movement area and the approach areas. The edges of the graph are represented by ExitPoints.

This section will describe three high-level objects that are closely interrelated: the SurfaceGraph, the PropagationCells, and the ExitPoints. This will be followed by a discussion of how a target projection is propagated through the graph. Next the internal structure of the cells will be examined and the role of this structure in target projection will be explained. Finally the dynamic behavior of the cell, including target projection initiation and event generation, will be described. A simplified version of a runway area will be used for an example.

7.11.4.3.1 SurfaceGraph

The directed graph of propagation cells is constructed by first creating each cell that will form a node of the graph. This is done by overlaying cell boundary definitions in the form of polygons on top of a graph of the runway and taxiway centerlines. The runway and taxiway definitions reside in the airport surface database, and the cell polygons in the safety logic database.

The intersection points and directions of the intersection of each centerline with all polygons are found. These points form the "edges" of the directed graph that connect the individual cells. Each one will become an ExitPoint. Note that each surface cell is connected to its neighbors by two edges (one in each direction), while the cell representing the approach area is connected only by a single edge. An approach area is simply a PropagationCell covering the area that a target will pass through while on approach to a runway. The direction of an edge determines the flow of target projection, so this indicates that target projections can travel in either direction on the surface, but targets can only be projected out of an approach cell. Note also that the surface cells do not overlap. While the surface cells are not allowed to overlap, approach-area cells may overlap surface cells and each other. Both the target location process (which is closely coupled to the surface graph) and the target projection mechanism take this into account, and this is why a target may be considered "on approach" to more than one runway simultaneously.

Each PropagationCell (node) in the graph is completely independent of its neighbors. They share no information, and the only knowledge any cell possesses about any neighbor is that it exists. Target projection can be initiated by any node in the graph.

When the projection starts, the cell creates a "token" containing target performance data derived from the state-based performance model. The cell then determines which of its neighbors the target could reach, and for each of these reachable neighbors it makes a copy of the target token, updates it to reflect state changes incurred during propagation through itself, and hands it off to the neighbor. Cells receiving a target token repeat this process and pass on tokens to their neighbors. This continues until propagation is no longer possible, which typically occurs when either the propagation lookahead time is exceeded or the edge of the graph is reached. The propagation is done in a straightforward breadth-first manner, and no attempt is currently made to order the propagation successor nodes according to earliest handoff time.

7.11.4.3.2 PropagationCells and ExitPoints

To see how each cell performs propagation it is necessary to examine the internal cell structure. Recall that, for each cell, a list of (intersection point, direction) pairs was computed based on the runway and taxiway centerline intersections with the cell boundary. These pairs are referred to as ExitPoints. For each of its ExitPoints, the cell computes and stores a path to every other ExitPoint. If possible, the path is a straight line. If not, the path is an arc of largest possible radius (subject to some constraints, such as staying within the cell and not getting too close to any vertex).

These pre-computed paths are used by the cell to propagate targets (actually target tokens) through themselves and on to neighboring cells. When a cell receives a token for propagation, that token will be associated with one of the cell's ExitPoints (i.e., it will enter the cell through that ExitPoint). The cell then propagates the token along each of the paths from that ExitPoint to its other ExitPoints. For each of the paths that the token would exit (i.e., propagation is not finished) the associated neighboring cell is loaded into a queue. The cell stops processing when it has propagated along all of its paths, and the propagation process stops when the queue of cells is empty.

Propagation along individual paths is straightforward; the token contains values to be used for start time, lookahead time left, velocity, acceleration, and various other target performance characteristics. The initial velocity value contained in the token is the target's current estimated velocity. The other values (lookahead time, acceleration, deceleration, etc.) are taken from the target state-based performance model described earlier. These later values are taken from safety logic database. As propagation proceeds and new copies of the token are generated, token values are updated accordingly by each propagation cell for each path it projects along. These are used to compute how far along the path the target would move, and if the target would reach the ExitPoint, the token is updated to be passed to the neighboring cell.

For straight-line paths the computation is basic Newtonian mechanics. for curved paths the target is first checked to determine if it is going too fast to make the turn, based on the target's allowable transverse acceleration (a target parameter in the safety logic database). For a target to negotiate the turn, it must satisfy the constraint:

$$\text{max speed} \leftarrow \text{sqrt}(\text{transverse\_accel} * \text{arc\_radius})$$

If the target is traveling too fast, its remaining propagation time is checked to see if it has time to slow down enough to make the turn (it must have a deceleration specified in its performance model). If it can slow down, its speed is set to "max speed" and its lookahead time is docked by the amount of time it would take to slow down. The target is projected "around" the curve at a constant velocity and is otherwise handled exactly like its straight-line counterpart.

There are two important loose ends to clear up. First, how does the propagation process start? Since the target cannot be expected to start from an ExitPoint, there must be a way to initiate the process from some arbitrary position within the cell. Second, approach-area cells, because they cover much greater area, must have path models that allow for greater freedom of movement than can be provided by a straight-line and a single-arc curve.

The solution for propagation initiation turns out to be very simple. When told to begin propagation, the cell treats the target position and heading as an ExitPoint and constructs paths to all other ExitPoints. It then creates a new target token and propagates exactly as if it had received the target token from one of its neighbors.

Since an approach-area cell will never receive a token from a neighboring cell (recall that propagation is not allowed into these cells), it will always be a site for propagation initiation. In addition to straight-line and single-arc curves, the approach area cell also allows S-curve paths from arbitrary positions within itself to its ExitPoint. The S-curve is constructed by constraining the first curve to be tangent to the target position with a radius equal to the minimum turning radius. This again is dependent on the maximum allowable transverse acceleration (airborne and surface transverse acceleration are independently specified in the target model), and so the radius is given by:

$$\text{min\_radius} = |\text{speed}**2/\text{transverse\_accel}|$$

The second curve of the S-curve is constrained to be tangent to the ExitPoint and the first curve. The second curve is computed and if its radius is at least that of the minimum turning curve, then the curve is valid and can be used for propagation. The rest of the details are similar to those of the surface cells.

The propagation cell maintains a record of each target path that it generates. It keeps a sequence of path "sample points" that contain projected position, velocity, acceleration and timestamp information for both the minimum and maximum path projections. A small summary is additionally kept tracking the targets earliest and latest arrival and exit projections for each cell. Note that this information is not gathered centrally anywhere; it remains distributed over the surface graph in the individual cells.

If a higher-level logic client (e.g., a runway-status light) requests it, the summary information kept in each cell will be gathered into a single data structure and presented to the logic. An example of this is the target "snapshot" service described in the "Surface Monitor Products" section. The resulting display shows two trees, rooted at the target position and spreading out over the movement area along taxiways and runways. One tree represents those paths and distances that the target could take in the prediction time using the acceleration model subject to the constraints imposed by the performance model for that target's state. The second tree is made up of paths and distances the target must travel in the prediction time using the braking model. One of the paths from the root to a leaf must be traversed by the target in that time (again, according to the target's initial state and its performance model). The higher-level logic has been designed to pose its questions in terms of these paths (where and how far could it travel and where and how far must it travel) rather than in terms of where will it be.

7.11.4.3.3 Client Notification and Event Generation

A major responsibility of the PropagationCells is to notify selected client objects whenever a target path is created, updated, or destroyed. These clients are typically the runways, takeoff-hold lights, and runway-status lights. Recall that the cell boundaries were overlaid on the airport surface map to form the surface graph. The clients "register" with PropagationCells in a similar manner. Areas of interest to clients are described as polygons in the safety database. These polygons are overlaid on top of the surface graph, and the client registers with each cell whose boundary falls under the area of the polygon.

An example of such a client might be a runway-status light. Using a polygon, it defines to the surface graph which area it is interested in (i.e., it wants to know about any targets in or projected to be in the specified area). It will register itself with each Propagation Cell overlapping its polygon.

Whenever a projected target path is updated within a cell, the cell "notifies" all of its clients of this event and provides them information regarding the target. In this manner the clients get information about all targets in or projected to be in their area of interest. They also have access to the local information kept by the cells they have registered with so they are able to derive accurate local information about the projection for their own means.

7.11.4.3.4 Summary of Target Projection

The projection scheme can be summarized as follows: a target is determined to be in a particular PropagationCell, which creates paths from that position to its existing ExitPoints and propagates it to them if possible. The tokens are then delivered to each neighboring cell, which in turn propagate them further. Finally, each cell whose internal state has changed as result of the propagation notifies any clients that have registered with it, causing higher-level light or alert logic to be invoked then.

7.11.4.4 RunwayEntranceLight (REL)

The RunwayEntranceLight (REL) is an abstraction of a runway-entrance light. To the surface monitor, RELs are specified in the safety database by a polygon that defines the area to be monitored, and a parameter block specifying settings for various safety logic options. (this Polygon is known as the REL ActivationArea.) The portion of the runway defined by the intersection of the polygon with the centerline will be monitored by the light. Note that there is no description of where the light is located physically, or even how many lights there are for a single activation area; although this information is contained in the safety database, it is of no concern to the surface monitor. Also stored in the database are the runways that the REL monitors, and its default suppressed state. The suppressed state indicates whether the light will actually be used. For example, in most configurations RELs at runway-runway intersections are suppressed. Occasionally this may be overridden when, in certain configurations, a runway facing a light will routinely be used as a taxiway.

Each REL monitors a portion of physical pavement belonging to two runways (one in each direction, such as 4R and 22L at Logan Airport). When the REL is created, it searches the SurfaceGraph for all PropagationCells that it overlaps. It registers for notification with each one, and registers itself with each Runway it is monitoring.

Operationally, each REL maintains two lists of ActivatingTargets. If either of the lists is non-empty the light puts itself in the "ON" state; it is off only if both lists are empty. The first list manages targets whose projected paths pierce the REL ActivationArea. Whenever a target's path is predicted to intersect a PropagationCell with which an REL has registered, the REL is notified by the cell. The REL then computes the times at which the path is predicted to enter and exit its ActivationArea (if any). Using these "earliest entry" and "latest departure" times it applies the appropriate rules for that Target's TargetState. An ActivationTarget is added or removed from the first list at this point as the outcome of the tests dictates.

The contents of the second list are managed by the Runway object (this is one reason the REL registers with the Runway). In some cases the Runway will determine that the REL should be activated even though a predicted target path doesn't come near the REL's ActivationArea, for example when the "whole-runway switch" is set and a high-speed operation is in progress. The Runway will instruct the REL to add the Target to its activation list using a method exported by the REL; similarly the Runway must remove the Target when it no longer feels the light should be activated.

Whenever an operation is performed on either of the REL's activation lists the light state is updated. Note that more than one notification may result from a single target path prediction if a REL registers with multiple PropagationCells along a runway. Each time the REL encounters a new Target iteration, it sets a "CurrentProcessedTarget" internal variable to that Target. The first such notification invokes the logic. Subsequent notifications are ignored. These scheme is used by all notification clients to reduce processing overhead.

The REL uses the Target marking service to tag targets to be ignored when they exceed an altitude threshold (only if this option is enabled). This allows the REL to check quickly if the notifying Target is a candidate for activation. Note that altitude is ignored after the condition is met once - since it is volatile and not always available, this represents a severe form of hysteresis. A target that is marked must transition out of the DEP state before it again becomes a candidate for activation. Like the Target, the REL has trace recording and cross-reference recording options available.

7.11.4.5 TakeoffHoldLight (THL)

Like the REL, the TakeoffHoldLight (THL) class is an abstraction of the takeoff-hold lights on the airport runways. Since the THL state is driven by two-target interactions, it is slightly more complex than the REL. Each THL is defined in the safety logic parameter database as a parameter block similar to the one for the REL, and two polygons. The polygons are used to define two regions monitored by the THL, the ActivationArea and the ArmingArea. Two lists are maintained by the THL—one for each area. The light is in the "ON" state only if both lists are non-empty.

The ArmingArea class monitors the region in which targets are expected to hold in position for takeoff. It registers with all PropagationCells that it overlaps, and upon notification of Target activity in these cells it applies logic to determine if the Target belongs on the arming list.

The ActivationArea class manages the activation list in a similar fashion. It defines an area that must be clear of Targets (or must be anticipated to be clear of Targets), and registers with all PropagationCells overlapping this area. Whenever notification is received, it uses its rules to determine if the Target should be placed on the activation list.

The ActivationArea uses special logic for crossing runways, since high-speed crossing targets on runways demand special logic for assumed separation. When the ActivationArea is created, it checks the surface database to find all intersecting runways. For each runway it creates a XrwyMonitor (crossing runway monitor) object whose responsibility it is to decide if high-speed crossing targets belong on the activation list. This logic is described in the Safety Logic outline, and is invoked by using a feature of the notification mechanism that allows objects registering for notification to supply a local object that will also be delivered with that notification. Effectively, this means that when the ActivationArea registers for notification with the PropagationCells that also overlap crossing runways, it supplies the XrwyMonitor as such a local object. Whenever the ActivationArea receives notification from these PropagationCells, the XrwyMonitor is returned as well. In this manner the ActivationArea knows when to invoke the "crossing runway" logic—it does not do so for all notifications.

THLs also make use of the "marking" service provided by the Target class, which was described earlier. This is used in VFR conditions to cause a Target to remain off the activation list when certain conditions are met. Basically, when this option is in use (VFR), and the Target is reported in the DEP state and has reached a certain altitude, it will no longer be considered an activating target (i.e., the THL will be turned off if this was the only target currently on the activation list). Since altitude coverage is undependable and volatile, this condition might be met and not met on subsequent update iterations. The marking service provides a quick and efficient way to deal with this. The THL "marks" the Target with its own identifier. On subsequent iterations, it checks to see if it has previously marked the Target—if it has then the Target is ignored. The "mark" is guaranteed to be cleared by the Target when it changes state. Thus, after the target has been marked, as long as it remains in the DEP state it will not activate the light. Should it transition to DBT or UNK the mark would be cleared, and on that iteration the THL logic would again be invoked to determine if it should be considered an activating target.

The THL also registers for transition-threshold-override consideration if this option is enabled in the database or one of the configuration-dependent overlay files. When this is in effect, it will normally compete with the Runway to override the threshold values that govern the TAX to DEP transition. The default "priority" associated with the THL override has a value of 2, which gives it precedence over the Runway priority (which is 1). The intuitive reasoning behind this scheme is that 1) setting high threshold values in general will inhibit false declarations of departures, and 2) the active runways are likely to be clear of incidental traffic, and 3) in arming regions on active runways departures are especially likely to occur, so we would like the transition to be particularly sensitive in these regions.

The THL also registers with the Runway it is monitoring. It does this primarily to allow the Runway to set any configuration-dependent default parameters that are present.

7.11.4.6 ArrivalAlert

The ArrivalAlert class is intended to manage all types of alerts involving Targets in the arrival, landing, and landing-abort states. currently, the only alert implemented is for a target stopped on a runway when another target is arriving or landing. Additionally, all alerts are two-target alerts. There are no alerts defined for groups of three or more targets.

The ArrivalAlert is defined by an activation region that is monitored for stopped targets, a parameter block containing thresholds and options, and a runway designation indicating which runway the ArrivalAlert services. The ArrivalAlert registers with each PropagationCell overlapping its activation region, and with the PropagationCell covering the approach zone of the monitored runway. It also registers with the Runway object, but this is only to allow the Runway to set run-time options such as whether to issue an alert if the arriving target is projected onto more than one runway (i.e., it is ambiguously projected). The ambiguous projection option allows alerts to be suppressed if the target on approach is projected onto more than one runway (i.e., it occupies and is projectable in more than one approach PropagationCell).

The ArrivalAlert maintains two lists of targets: one contains targets in the arrival, landing, or landing-abort state. The second list contains all other monitored targets, which is defined as any target that is interacting with the activation region and satisfies some state-dependent monitoring criteria. For example, since the current implementation only supports monitoring targets in the stopped state, the current criteria are as follows: 1) the target must be in the activation region, 2) the target must be stopped. All other targets in the activation region are ignored (as far as this list goes— they will still be contained in the first list if they are somewhere in the landing process).

A list of current Alerts is maintained to allow the ArrivalAlert to determine which alerts it has issued messages for, and to know when the alert condition no longer exists. When for one reason or another the alert condition is resolved, the ArrivalAlert sends a message to the AlertGovernor process and removes the alert from the active alert list.

Two mutually exclusive alert models are currently supported—the "threshold" model and the "target" model. The threshold model seeks to issue an alert when an arrival target is within some t-second range of crossing the runway threshold and there is some stopped target in the activation area. In this model, it does not matter where in the activation region the monitored target is, only that it is inside and stopped. The same lists of "arrival" targets and monitored targets are maintained, and the "time-to-threshold" computation is updated for each arrival target whenever a TrackReport is received. The ArrivalAlert queries the Runway when it is created to get the displaced threshold distance, if any (this can be configuration dependent).

The "target" model process causes alerts to be issued if the separation in time between an arrival target and a monitored target descends below some threshold. In this model, for example, it would be possible for a target to be stopped at the far end of runway and no alert would be issued. As opposed to the threshold model, the target model maintains separations between individual pairs of arrival targets and monitored targets. The t-second thresholds are position dependent, and are specified as part of the ArrivalAlert data block in the safety logic database. This allows specification of a variable threshold profile to fit operational needs. For example, it may be desirable to have a long threshold at intersections where takeoffs are typically performed, and a shorter one at intersections where crossings predominate. When an update is received for a monitored target in this model, its new threshold time is determined and stored with the target. When an arrival target update is received, the ArrivalAlert computes its estimated separation (in time) between it and each monitored target. For each monitored target, an alert is issued if the estimated separation is less than the threshold.

Both processes take into account the possibility that targets on approach often have curved paths. For this reason, theArrivalAlert queries the approach PropagationCell directly to get the target's estimated time to the cell boundary. This automatically uses whatever path the cell generated when it performed the target traversal computation; as described above this could be a straight line, a single arc, or an S-curve. From the approach cell boundary to the target on the runway a straight-line path is assumed and a constant velocity prediction model is used.

7.11.4.7 Runway

Like the status lights and alerts, the Runway is a client of the Prediction Engine. It differs from other clients, however, in that it has clients of its own. The RELs, THLs, and ArrivalAlerts all query the Runway for status information regarding targets as part of their logic. The need to service these requests puts the Runway in a position somewhere between the Prediction Engine and the client objects in the surface monitor architecture.

Since high-speed operations on the airport surface normally are associated with runways, it is natural that the Runway object plays a central role in coordinating information dispensed to other objects. Status lights, alert, and approach bars have an intuitive relation with runways. Indeed, when discussing individual lights, alerts, or even operations, it is natural to describe them in the context of "what runway is involved." These relationships are reflected in the many responsibilities and associations that the Runway maintains.

The Runway's activities can be partitioned into three loose areas: its role in the setup and initialization of the surface monitor, its dynamic interaction with Targets it is notified of, and its dynamic interaction with other client objects.

Since the Runway is naturally associated with sets of client objects, it is intuitive that some operational parameters be set using the Runway as opposed to individually setting them for client objects. Examples of these include the VFR switch (controlling whether Visual Flight Rules are in effect), the ambiguous projection switch (controlling whether status lights will be activated for approach targets projected onto more than one runway). The Runway maintains knowledge of the following high-level objects:

(1) A list of RELs,
(2) A list of THLs,
(3) A list of PropagationCells,
(4) The PropagationCell representing the approach area, and
(5) An ArrivalAlert servicing that runway.

The Runway maintains a target record for each Target it monitors. This record contains derived information describing the state of the target relative to the runway. For example, whether the target is one approach to the runway, how far the target is from the runway threshold, whether the target is currently activating any status lights, and the direction of the target relative to the runway (along, opposite, crossing) are all included in this record. This record is updated when the Runway receives notification from a PropagationCell about a target path, and is used to answer subsequent queries from other client objects.

Prior to any prediction and notification, Runways interact with Targets through the state transition override process. Runways may override thresholds governing transitions from taxi to departure and from landing to landing abort. The taxi to departure threshold is constant for the runway and can be set in the safety logic database. For the landing abort threshold, the runway maintains a landing velocity profile from which it selects a position-dependent value.

At this point (transition threshold override) a circular dependency in the safety logic is addressed. When notified of target activity, the Runway determines whether a Target is traveling "along" it (see the Safety Logic Appendix for the exact definition of "along"). This information is used by other prediction engine clients, who will query the runway to find the targets "Runway status." A problem arises because certain state transitions are effected by whether a target is "along" a runway, and state determination is performed before any prediction and notification (hence, Runway "along" determination). To get around this, the Runway will advise the Target if it is "along" the Runway at the same time it is attempting to set state transition parameters, not waiting until prediction is performed.

Runways are also the source of ApproachMessages, the contents of which were described in the section on Surface Monitor Products. The approach message logic is invoked whenever a target notification is received from the approach PropagationCell and the target satisfies the approach bar conditions as described in the Safety Logic Outline.

Runways interact with RELs in a direct way. The surface monitor supports a "whole runway switch" option that, when invoked, allows all the RELs along a runway to be illuminated for departing targets and arriving targets once the target crosses the threshold. This is done regardless of the target's predicted path, and is strictly a procedural rule. This rule is in effect until the target reaches a "landing rollout" state (another state computed and maintained locally by the Runway—the Target has no such state in its own state machine), at which point the RELs are again controlled strictly by the Target's predicted path.

The whole runway switch logic makes use of the REL feature that allows an external object to unconditionally add a target to one of its activation lists. (Recall that the REL maintains two lists—one that it controls and one controlled externally that it monitors.) When notification is received about a target in a landing or arrival state, the Runway determines which RELs along it should be illuminated by the whole runway switch rules. For each such REL, the target is added to that REL's external activation list. This may result in duplicate entries for that particular REL and target, but that makes no difference to the REL. When the target is determined to be under control, the target is removed from all RELs who currently maintain it on their external list, leaving only those RELs continuing to maintain it on their internal list by virtue of its predicted path.

Under VFR conditions, the whole runway switch can also be deactivated when a departing target attains a certain altitude. To support this the Runway makes use of the Target marking service described earlier.

The RELs, THLs, and ArrivalAlerts are all clients of the Runway; they are all interested in whether a given target "satisfies the REL conditions" for that runway. These conditions are defined in the Safety Logic chapter and appendix, and are used by these objects to help determine if the target qualifies to be on an activation list or not.

7.11.5 Surface Monitor Databases

7.11.5.1 Overview

As part of its initialization procedure, the surface monitor uses information from two airport-specific databases: the airport surface database and the safety-logic parameter database. The airport surface database essentially contains a graph of the runway and taxiway centerlines and details their interconnections. The safety logic parameter database is used to define and configure the software constructs used by the RSLS surface monitor (the safety logic process). The contents of these two databases are used to construct the directed graph that is used for target propagation and event generation and to create and initialize the higher-level objects such as Runway Status lights and Takeoff-Hold Lights.

7.11.5.2 The Airport Surface Database

The Airport Surface database contains the positions of the centerlines of runways and taxiways, and the airport origin. All coordinates are given in latitude/longitude. The connectivity of these constructs is also represented in the database, so segments and points common to more than one runway or taxiway were represented in one place.

The application interface to the surface database allows client programs to load the database and access runways and taxiways either by name or by iteration. A special application, used for both the surface database and the safety logic database, is the surface editor. This is a graphical editor that allows fast and easy (click and drag) manipulation of the contents of both databases (among others). Unfortunately, this application currently does not run in the X Windows environment and must be run on an Apollo platform.

7.11.5.3 The Safety Logic Parameter Database

For each type of safety logic object (e.g., Runway), default values for each of its parameters are explicitly specified in the database. These represent "reasonable" choices for the values in the absence of any airport-specific requirements.

A default parameter-specification block exists for most types of high-level surface monitor objects. These include Target, Runway, REL, THL, and ArrivalAlert. Note that there is no such block for the PropagationCell or any other component of the SurfaceGraph.

The definitions of the safety logic objects typically are composed of two parts. The first part is a spatial component, for example the polygons representing the arming region and activation region for a given takeoff-hold light. The second part is a list of parameters whose value for that particular object differs from the default value.

As an example, consider the "alarm-angle" associated with the arming region of a takeoff-hold light. This parameter defines the angular tolerance relative to the runway heading that a target in the arming region must satisfy to arm the light. The default value of this parameter is 65 degrees, so a target must be heading within ±/-65 degrees of the runway heading to be considered as an "arming" target. Due to the geometry of the airport surface, almost every takeoff-hold light defined for Logan overrides this value. At some places (e.g., departure ends of runways with no crossing taxiways) the angle can be considerably widened. At other places (e.g., some intersection-takeoff arming regions) the angle is narrowed so as not to turn on lights due to heading noise reported from crossing targets.

This combination of default values and object-specific overrides provides the mechanism for "customizing" the safety logic for a particular airport. The default values are selected for general reasonableness and the overrides are only used for specific objects (usually in those cases where airport geometry requires it). Such a parameter set would now be customized for an airport, but not for any particular operational configuration. This is still inadequate for our purposes, since no single set of values can be used for all configurations and operational conditions for a given airport.

To achieve configuration-specific customization, additional parameter-override files called Configuration Overlays are used. A Configuration Overlay file contains parameter values that are used to override either object-specific parameter values or default parameter values (or both), as desired for a particular set of operational conditions. For example, configuration overlays are defined for each of the commonly run configurations at Logan.

As an example, consider one of the state machine parameters that is used to determine when a target has transitioned form taxi to departure. This value is nominally set at 50 kts to avoid declaring fast-moving surface vehicles as departures. Using configuration overlays, this value is overridden on active runways to 35 kts.

7.11.6 Design Goals: Problems and Solutions

The primary initial requirements were these:

1. The architecture should be flexible in the way it responds to requirements changes. The surface monitor needed to be used as a means of testing different ideas, not implementing already well-tested processes. The architecture needed to be able to respond quickly and easily to such changes.

2. The architecture should be site-independent. Site independence was important for a number of reasons. First, site-independent processes would be much more applicable, hence valuable, than a scheme that was custom designed for one particular airport. Practically, it would be very difficult to support any system that does not have a high degree of site independence built into it.

2a. The site independence should be automated where possible. This requirement is extremely important to anyone considering building and fielding a production version of this system. Simply put, wherever possible system attributes should be derived from the geometry of the site and not specified by independent parameters. Where parameters need to be specified, they should have some intuitive relation to real-word objects (e.g., a speed threshold for a particular state). The importance of this is apparent to someone who has tried to validate a system—too many independent parameters render such validation efforts intractable.

3. The architecture should be extensible. It was anticipated that new features would be incorporated into the requirements, and the architecture should be able to accommodate these without revision. Examples of anticipated extensions are as follows: (1) individual target performance models, when exact target type becomes known, and (2) full alert logic in addition to lights.

In addition to these requirements, the following problems were anticipated:

1. Target comparison (for 2 target conflicts especially) is inherently a problem of $O(n**2)$ complexity. A natural way around this needed to be devised.
2. the parameters would need to be changed from operational configuration to configuration. It was not desirable to maintain separate databases for each configuration.

The adoption of the Prediction Engine approach, in particular the PropagationCell aspect of the Prediction Engine, fundamentally addressed several requirements and problems.

Initially this model was created to solve the $O(n**2)$ problem. Consider a target on approach to a runway. How does one determine which lights should invoke logic to check their activation status? How does one determine which targets need to be checked for potential conflict. Equally important, which targets may safely be ignored?

One solution to this type of questions is: let each client object concern itself only with the set of targets that could possibly affect it. Since each client object defines itself in terms of an extent on the airport surface, it would be interested only in those targets in or predicted to be in its extent. By registering with the PropagationCells contained in the extent, the object is notified only when there is a change affecting a target that may interact with it. For example, a TakeoffHoldlight monitors a specific area of the airport surface for two-target conflicts. When a target enters or is predicted to enter the activation region of the TakeoffHoldLight, the object is notified and it already knows the exact set of targets that must be examined to determine if a potential conflict exists (these are taken from the set of targets that have previously notified the light). No other targets are even considered, and if another target is updated and is not predicted to intersect the light's activation region, the light is never even notified.

The prediction engine provided additional design benefits as well. First, issues of target projection were separated from the safety logic rules. Once a viable model of target prediction was settled on, the logic could (and did) go through many iterations and not impact the prediction part of the system. Also, the computation of target path prediction is made much easier since it is based only on local physical rules and not at all on airport context.

The PropagationCell connectivity and the internal structure of the cells are directly derivable from the airport geometry and the airport map—no human direction is necessary once the cells are drawn. The cell boundaries themselves do not need to be precise. This practically enforces a large degree of site independence, since it is not possible to tailor a process for a particular geometric anomaly without generalizing it to work in the context of an arbitrary PropagationCell.

The PropagationCells also facilitate communication between other high-level objects. This was used to solve the problem of specifying location-dependent parameters in a way that was natural and intuitive. It did not make sense to allow the cells themselves to override global default parameter values directly since as abstract constructs the cells do not correspond to any real-world entity. Instead, the cells provide the mechanism for connecting groups of client objects that do interact but have no other reason to be aware of each other. As an example, consider the target-state-transition threshold values again. The Target object does not need to know whom to solicit the override values from. Originally, the Runway was the only object that overrode these values. When the decision was made to allow the TakeoffHoldLight to also override some values (some in direct competition ith the Runway), no change at all was necessary in the Target object. The new overriding client (the THL) simply had to add its request to be solicited to the cell. When the Target goes to solicit local values, it simply asks the cell if it has anyone on its list.

Extensibility is further enhanced by the generic nature of the client-object notification structure. A general callback architecture is implemented with a Notifier class, a base class that exports a well-defined interface to the notification mechanism. A macro provides a "template" that allows client objects to easily create type-specific class "notifiers," essentially a single object containing the callback entries for the particular client object. The callbacks actually contain the "safety logic" that is germane to the specific high-level object. The process of registering for notification with a PropagationCell consists of providing the cell with an instance of the notifier, which the cell places into a list of Notifier objects. Notification is then simply the invocation of virtual callback functions for each object in the list.

Two separate Notifier classes are maintained. The first supports notification for events caused by target path propagation, and the second supports the state transition threshold override function. The mechanism of Notifier classes makes the addition of new client objects (and the functionality they represent) a relatively painless process.

7.11.7 Suggested Improvements

No serious attention was paid to efficiency. While efficiency regarding the $O(n**2)$ problem was a major consideration, attention to details such as memory allocation were ignored. For example, the surface monitor could a significantly reduce overhead if its classes supported overloaded new and delete operators. These could remove and return memory from and to an already allocated pool, eliminating the need to perform many small allocations that are done during path prediction. In a similar manner, more efficient search logic could be implemented in the CellLocator. Currently the CellLocator searches PropagationCells in the order of previously predicted target path. This seems to work fine except on the initial hit, where a linear search is performed. One of the original design plans was to perform a quadtree search, but since surface monitor performance was never a bottleneck other tasks took higher priority.

The surface monitor as it is implemented is not a real-time system. The change to a time-interrupt-based system is recommended and could be accomplished without affecting the basic architecture in any major way. This change would allow finer accuracy in predictions as well, since a feedback loop could be implemented where in the surface monitor requests that Sensor Fusion increase the sampling rate for targets of interest (i.e., on active runways).

Moving to a time-based system would also allow removal of one of the remaining blind spots of the current logic: if a target is dropped and not removed from some client's activation list, it will remain on the list indefinitely. (This is, of course, a logic bug and should never happen, but it has infrequently occurred when a PropagationCell coverage gap existed inside some activation region.) Setting limits on the length of time an object may exist without update is an easy solution to this problem.

If necessary, the prediction engine could be parallelized. The critical sections of code (those modifying the internal data structures) are isolated, and the parallelization could be extended to all the objects. This would be something that could be looked into in the event of a rewrite.

The design goals and the developmental emphasis cause the coupling between classes to be higher than would be necessary for production system. A version of the surface monitor that is intended to be fielded and maintained in a production would greatly benefit from a simplification and rewrite. The basic architecture and class definitions are viable and extensible. From a software engineering standpoint, the implementation should be redone to emphasize validity, robustness, efficiency, and maintainability.

7.12 Voice Generator Software

During initialization, the alert text file is processed. The file contains a listing of the message and number associated with it. Each entry in the file is put into a hash table hashed on the message number.

While the program is running, the safety logic sends alert messages to the voice generator. If the message is to be added, it is put into a sorted list, based on its priority. If the message is to be deleted, if it hasn't already been sent to the voice generator, it is removed form the list. If the device is not busy, the highest priority message on the list is sent to the device. the DEC Talk Voice Generator finishes speaking the message it was sent, it returns a message indicating it is idle. If there are more messages on the list, the highest priority message is sent.

When a message is sent to the device, the text from the alert text file is combined with the correct pronunciation of the runway. This text string is what is sent to the device.

7.13 Light Governor Software

During initialization, the Airport file is read in and processed. It describes the lighting situation on the airport surface. Tokens are used to determine what needs to be done. The first thing must be the Channel token. It is followed by a listing of number pairs. The first number is the channel numbers used by the ModelBoard to identify each light (or set of lights). These numbers must be between 1 and 4096. The second number is an identifying number used by the safety logic to identify all of the safety lights. This file is required for running the light governor. During processing each light is added to two hash tables, the first is hashed on the ModelBoard light identifier, the second is hashed on the safety logic light identifier. The other type of token in the airport file is the Group token. It is used to define groups of lights that are turned off and on as a group.

When a group is added, each channel is checked to make sure it is in the hash table, then it is added to a list of the channels for that group.

The config file is also read in and processed. It describes the current state of the lights on the airport surface. It turns on any non-safety lights being used, i.e., the wig-wag lights Cat2 lights, etc. Data also comes as input from the keyboard. This is to inquire as to the status of a light, to set or unset a light, to define or clear a group, to set or unset a group, to clear or set the entire ModelBoard. These commands are processed by s__process__command. It determines the type of command, and then process it by calling send__lm__command and-/or update.

While the program is running, light message are received form the safety logic. The validity of the light identification is checked, if it is valid and the actual status of the light is different than the requested status then the instruction is sent to the mode board to change the light. It waits for <> seconds for a reply, then returns a value indicating the success of failure of the light change. If the light change was successful, the class value for the light is changed to the requested state and a message is sent to the ASDE display to illuminate the light.

While this invention has been particularly shown and described with reference to embodiments thereof, it will be understood by those skilled in the art that various changes in form and detail may be made therein without departing from the spirit and scope of the invention as defined by the appended claims.

We claim:

1. A surveillance system, comprising:
   a radar data interface for receiving radar data from a radar source at a first data rate and for outputting radar data at a second data rate less than the first data rate; and
   a radar target processor coupled to the radar data interface, comprising:
   a clutter rejecter for generating a clutter map of the clutter signals in the radar data, and for substantially removing the clutter signals from the radar data using the clutter map, the clutter rejecter further determining a threshold level for each radar pixel from the clutter map, comparing the radar data returned from a transmitted pulse to the threshold level for each corresponding radar pixel along a radial direction, and recording the pixel positions both where the radar data first exceeds the threshold and where the radar data first drops below the threshold to define a run;
   a morphological processor to receive runs from the clutter rejecter and for associating a plurality pixels of runs together to define a component by performing a morphological opening operation on the runs to eliminate small components and then forming a chain code of the outline of clustered adjacent runs, and for associating one or more components to define a target object; and
   a target tracker for receiving target objects from the morphological processor, for tracking paths of target objects, and for detecting and identifying in the radar data false tracks resulting from multipath radar reflections and other sources.

* * * * *